US012717713B2

(12) United States Patent
Colgrove et al.

(10) Patent No.: US 12,717,713 B2
(45) **Date of Patent: *Aug. 25, 2026**

(54) ACCELERATING STORAGE I/O OPERATIONS USING CACHED DATA QUERYING

(71) Applicant: PURE STORAGE, INC., Santa Clara, CA (US)

(72) Inventors: John Colgrove, Los Altos, CA (US); John Hayes, Mountain View, CA (US); Ethan Miller, Santa Cruz, CA (US); Feng Wang, Los Altos, CA (US)

(73) Assignee: EVERPURE, INC., Santa Clara, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/931,859

(22) Filed: Oct. 30, 2024

(65) Prior Publication Data

US 2025/0053510 A1 Feb. 13, 2025

Related U.S. Application Data

(63) Continuation of application No. 18/306,205, filed on Apr. 24, 2023, now Pat. No. 12,141,058, which is a (Continued)

(51) Int. Cl.

| | |
|---|---|
| ***G06F 12/02*** | (2006.01) |
| ***G06F 3/06*** | (2006.01) |

(Continued)

(52) U.S. Cl.

CPC ........ *G06F 12/0246* (2013.01); *G06F 3/0608* (2013.01); *G06F 3/061* (2013.01);

(Continued)

(58) Field of Classification Search

CPC ............ G06F 12/0246; G06F 12/0802; G06F 12/1009; G06F 2212/50; G06F 2212/7201;

(Continued)

(56) References Cited

U.S. PATENT DOCUMENTS

| | | |
|---|---|---|
| 5,758,146 A | 5/1998 | Schiefer et al. |
| 6,519,592 B1 | 2/2003 | Getchius et al. |

(Continued)

FOREIGN PATENT DOCUMENTS

| | | |
|---|---|---|
| WO | WO-0213033 A1 | 2/2002 |
| WO | WO-2008103569 A1 | 8/2008 |

OTHER PUBLICATIONS

Frakes Dan, "Up close with Mountain Lion: Power Nap (Frakes, Dan, Working Mac—Up close with Mountain Lion: Power Nap, Macworld.com, " Aug. 1, 2012, pp. 1-6.

(Continued)

*Primary Examiner* — Than Nguyen

(57) ABSTRACT

Methods, computer systems, and computer readable medium are described for low latency reads using cached deduplicated data, including: receiving a request to read data from a storage system; query, using a generated hash value associated with the request to read data, one or more deduplication tables that corresponds to the hash value; and responsive to determining that the one or more deduplication tables includes an entry that corresponds to the hash value, using a mapping contained in the entry to perform the requested to read data, wherein the mapping includes a pointer to a physical location where at least a portion of the data is stored.

20 Claims, 31 Drawing Sheets

Related U.S. Application Data continuation of application No. 17/360,791, filed on Jun. 28, 2021, now Pat. No. 11,636,031, which is a continuation-in-part of application No. 15/255,726, filed on Sep. 2, 2016, now abandoned, which is a continuation of application No. 14/477,470, filed on Sep. 4, 2014, now Pat. No. 9,454,477, and a continuation of application No. 14/312,088, filed on Jun. 23, 2014, now Pat. No. 9,454,476, said application No. 14/477,470 is a continuation of application No. 14/160,137, filed on Jan. 21, 2014, now Pat. No. 8,856,489, which is a continuation of application No. 13/289,765, filed on Nov. 4, 2011, now Pat. No. 8,645,664, said application No. 14/312,088 is a continuation of application No. 13/208,094, filed on Aug. 11, 2011, now Pat. No. 8,788,788, said application No. 13/289,765 is a continuation of application No. 13/208,094, filed on Aug. 11, 2011, now Pat. No. 8,788,788.

(51) Int. Cl.
*G06F 12/0802* (2016.01)
*G06F 12/1009* (2016.01)

(52) U.S. Cl.
CPC .......... *G06F 3/0638* (2013.01); *G06F 3/0665* (2013.01); *G06F 3/067* (2013.01); *G06F 12/0802* (2013.01); *G06F 12/1009* (2013.01); *G06F 2212/50* (2013.01); *G06F 2212/7201* (2013.01)

(58) Field of Classification Search
CPC ...... G06F 3/0608; G06F 3/061; G06F 3/0638; G06F 3/0665; G06F 3/067; G06F 12/0888; G06F 3/0641
USPC .................................................. 711/118, 202
See application file for complete search history.

(56) References Cited

U.S. PATENT DOCUMENTS 6,789,162 B1 * 9/2004 Talagala ................ G06F 3/0676 711/170
6,826,557 B1 11/2004 Carter et al.
7,110,997 B1 9/2006 Turkel et al.
7,139,973 B1 11/2006 Kirkwood et al.
7,191,170 B2 3/2007 Ganguly et al.
7,499,909 B2 3/2009 Liu et al.
7,634,465 B2 12/2009 Sareen et al.
7,797,298 B2 9/2010 Sareen et al.
7,836,044 B2 11/2010 Kamvar et al.
7,840,557 B1 11/2010 Smith et al.
8,706,914 B2 4/2014 Duchesneau
8,918,478 B2 12/2014 Ozzie et al.
9,275,063 B1 3/2016 Natanzon
9,910,742 B1 3/2018 Faibish et al.
10,185,495 B2 1/2019 Katsuki
11,403,011 B1 * 8/2022 Gunda .................. G06F 3/0679
11,636,031 B2 * 4/2023 Colgrove .............. G06F 3/0638 711/206
12,141,058 B2 * 11/2024 Colgrove ............ G06F 12/0888
2002/0087544 A1 * 7/2002 Selkirk ................... G06F 3/067
2003/0200194 A1 10/2003 Arnold et al.
2005/0283468 A1 12/2005 Kamvar et al.
2006/0004850 A1 1/2006 Chowdhury
2008/0005093 A1 1/2008 Liu et al.
2011/0264650 A1 10/2011 Tobin et al.
2013/0054584 A1 2/2013 Kalra et al.
2015/0100746 A1 4/2015 Rychlik et al.
2016/0142485 A1 5/2016 Mitkar et al.
2017/0155713 A1 6/2017 Powell et al.
2018/0074748 A1 3/2018 Makin et al.
2022/0156114 A1 5/2022 Nagpal et al.
2023/0259454 A1 8/2023 Colgrove et al.
2023/0394042 A1 12/2023 Periyathambi et al.

OTHER PUBLICATIONS

Kim J-K., et al., "Data Access Frequency Based Data Replication Method Using Erasure Codes in Cloud Storage System," Journal of The Institute of Electronics and Information Engineers, Feb. 2014, vol. 51, No. 2, pp. 85-91.
Schmid P., "RAID Scaling Charts, Part 3: 4-128 kB Stripes Compared," Tom's Hardware, Nov. 27, 2007, 24 Pages, XP055363126, Retrieved from URL: http://www.tomshardware.com/reviews/RAID-SCALING-CHARTS.1735-4.html.
Wong T.M., et al., "Verifiable Secret Redistribution for Archive Systems," Proceedings on First International IEEE Security in Storage Workshop (SISW'02), IEEE Xplore, Dec. 2002, 12 pages, DOI: 10.1109/SISW.2002.1183515.

* cited by examiner

ACCELERATING STORAGE I/O OPERATIONS USING CACHED DATA QUERYING

CROSS-REFERENCE TO RELATED APPLICATIONS

This is a continuation application for patent entitled to a filing date and claiming the benefit of earlier-filed U.S. Pat. No. 12,141,058, issued Nov. 12, 2024, herein incorporated by reference in its entirety, which is a continuation of U.S. Pat. No. 11,636,031, issued Apr. 25, 2023, which is a continuation in-part of U.S. patent application Ser. No. 15/255,726, filed Sep. 2, 2016, which is a continuation of U.S. Pat. No. 9,454,477, issued Sep. 27, 2016, which is a continuation of U.S. Pat. No. 8,856,489, issued Oct. 7, 2014, which is a continuation of U.S. Pat. No. 8,645,664, issued Feb. 4, 2014, which is a continuation of U.S. Pat. No. 8,788,788, issued Jul. 22, 2014; U.S. patent application Ser. No. 15/255,726, filed Sep. 2, 2016, is also a continuation of U.S. Pat. No. 9,454,476, issued Sep. 27, 2016, which is a continuation of U.S. Pat. No. 8,788,788, issued Jul. 22, 2014.

Figure 1:
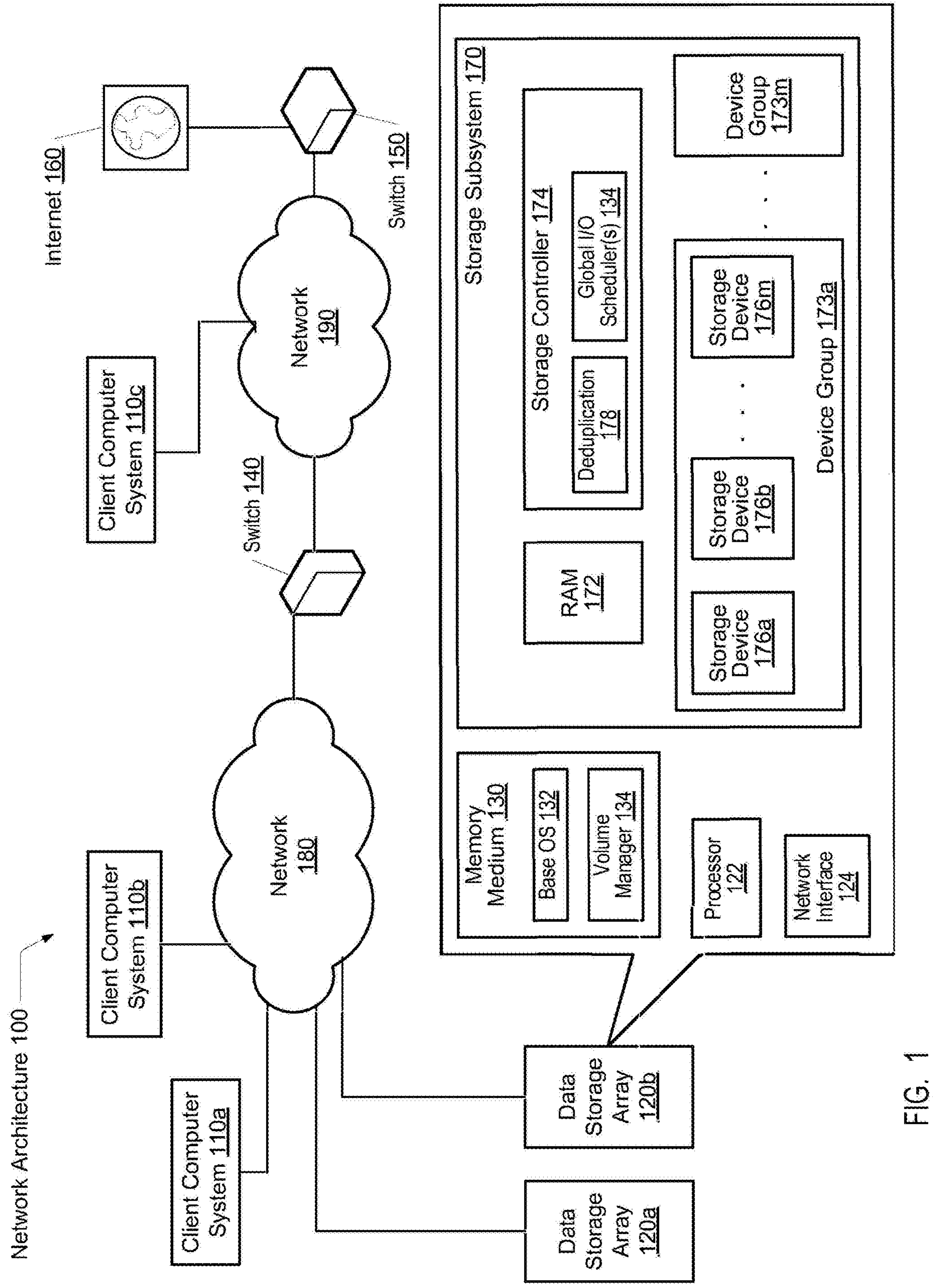
FIG. 1 is a generalized block diagram illustrating one embodiment of network architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1, a generalized block diagram of one embodiment of a network architecture 100 is shown. As described further herein, one embodiment of network architecture 100 includes client computer systems 110*a*-110*b* interconnected to one another through a network 180 and to data storage arrays 120*a*-120*b*. Network 180 may be coupled to a second network 190 through a switch 140. Client computer system 110*c* is coupled to client computer systems 110*a*-110*b* and data storage arrays 120*a*-120*b* via network 190. In addition, network 190 may be coupled to the Internet 160 or otherwise outside network through switch 150.

It is noted that in alternative embodiments, the number and type of client computers and servers, switches, networks, data storage arrays, and data storage devices is not limited to those shown in FIG. 1. At various times one or more clients may operate offline. In addition, during operation, individual client computer connection types may change as users connect, disconnect, and reconnect to network architecture 100. Further, while the present description generally discusses network attached storage, the systems and methods described herein may also be applied to directly attached storage systems and may include a host operating system configured to perform one or more aspects of the described methods. Numerous such alternatives are possible and are contemplated. A further description of each of the components shown in FIG. 1 is provided shortly. First, an overview of some of the features provided by the data storage arrays 120*a*-120*b* is described.

In the network architecture 100, each of the data storage arrays 120*a*-120*b* may be used for the sharing of data among different servers and computers, such as client computer systems 110*a*-110*c*. In addition, the data storage arrays 120*a*-120*b* may be used for disk mirroring, backup and restore, archival and retrieval of archived data, and data migration from one storage device to another. In an alternate embodiment, one or more client computer systems 110*a*-110*c* may be linked to one another through fast local area networks (LANs) in order to form a cluster. Such clients may share a storage resource, such as a cluster shared volume residing within one of data storage arrays 120*a*-120*b*.

Each of the data storage arrays 120*a*-120*b* includes a storage subsystem 170 for data storage. Storage subsystem 170 may comprise a plurality of storage devices 176*a*-176*m*. These storage devices 176*a*-176*m* may provide data storage services to client computer systems 110*a*-110*c*. Each of the storage devices 176*a*-176*m* uses a particular technology and mechanism for performing data storage. The type of technology and mechanism used within each of the storage devices 176*a*-176*m* may at least in part be used to determine the algorithms used for controlling and scheduling read and write operations to and from each of the storage devices 176*a*-176*m*. For example, the algorithms may locate particular physical locations corresponding to the operations. In addition, the algorithms may perform input/output (I/O) redirection for the operations, removal of duplicate data in the storage subsystem 170, and support one or more mapping tables used for address redirection and deduplication.

The logic used in the above algorithms may be included in one or more of a base operating system (OS) 132, a volume manager 134, within a storage subsystem controller 174, control logic within each of the storage devices 176*a*-176*m*, or otherwise. Additionally, the logic, algorithms, and control mechanisms described herein may comprise hardware and/or software.

Each of the storage devices 176*a*-176*m* may be configured to receive read and write requests and comprise a plurality of data storage locations, each data storage location being addressable as rows and columns in an array. In one embodiment, the data storage locations within the storage devices 176*a*-176*m* may be arranged into logical, redundant storage containers or RAID arrays (redundant arrays of inexpensive/independent disks).

In some embodiments, each of the storage devices 176*a*-176*m* may utilize technology for data storage that is different from a conventional hard disk drive (HDD). For example, one or more of the storage devices 176*a*-176*m* may include or be further coupled to storage consisting of solid-state memory to store persistent data. In other embodiments, one or more of the storage devices 176*a*-176*m* may include or be further coupled to storage using other technologies such as spin torque transfer technique, magnetoresistive random access memory (MRAM) technique, shingled disks, memristors, phase change memory, or other storage technologies. These different storage techniques and technologies may lead to differing I/O characteristics between storage devices.

In one embodiment, the included solid-state memory comprises solid-state drive (SSD) technology. The differences in technology and mechanisms between HDD technology and SDD technology may lead to differences in input/output (I/O) characteristics of the data storage devices 176*a*-176*m*. A Solid-State Disk (SSD) may also be referred to as a Solid-State Drive. Without moving parts or mechanical delays, an SSD may have a lower read access time and latency than a HDD. However, the write performance of SSDs is generally slower than the read performance and may be significantly impacted by the availability of free, programmable blocks within the SSD.

Storage array efficiency may be improved by creating a storage virtualization layer between user storage and physical locations within storage devices 176*a*-176*m*. In one embodiment, a virtual layer of a volume manager is placed in a device-driver stack of an operating system (OS), rather than within storage devices or in a network. Many storage arrays perform storage virtualization at a coarse-grained level to allow storing of virtual-to-physical mapping tables entirely in memory. However, such storage arrays are unable to integrate features such as data compression, deduplication, and copy-on-modify operations. Many file systems support fine-grained virtual-to-physical mapping tables, but they do not support large storage arrays, such as device groups 173*a*-173*m*. Rather, a volume manager or a disk array manager is used to support device groups 173*a*-173*m*.

In one embodiment, one or more mapping tables may be stored in the storage devices 176*a*-176*m*, rather than memory, such as RAM 172, memory medium 130 or a cache within processor 122. The storage devices 176*a*-176 may be SSDs utilizing Flash memory. The low read access and latency times for SSDs may allow a small number of dependent read operations to occur while servicing a storage access request from a client computer. The dependent read operations may be used to access one or more indexes, one or more mapping tables, and user data during the servicing of the storage access request.

In one example, I/O redirection may be performed by the dependent read operations. In another example, inline deduplication may be performed by the dependent read operations. In yet another example, bulk array tasks, such as a large copy, move, or zeroing operation, may be performed entirely within a mapping table rather than accessing storage locations holding user data. Such a direct map manipulation may greatly reduce I/O traffic and data movement within the storage devices 176*a*-176*m*. The combined time for both servicing the storage access request and performing the dependent read operations from SSDs may be less than servicing a storage access request from a spinning HDD.

In addition, the information within a mapping table may be compressed. A particular compression algorithm may be chosen to allow identification of individual components, such as a key within a record among multiple records. Therefore, a search for a given key among multiple compressed records may occur. If a match is found, only the matching record may be decompressed. Compressing the tuples within records of a mapping table may further enable fine-grained level mapping. This fine-grained level mapping may allow direct map manipulation as an alternative to common bulk array tasks. Further details concerning efficient storage virtualization will be discussed herein.

Again, as shown, network architecture 100 includes client computer systems 110*a*-110*c* interconnected through networks 180 and 190 to one another and to data storage arrays

120a-120b. Networks 180 and 190 may include a variety of techniques including wireless connection, direct local area network (LAN) connections, wide area network (WAN) connections such as the Internet, a router, storage area network, Ethernet, and others. Networks 180 and 190 may comprise one or more LANs that may also be wireless. Networks 180 and 190 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCOE), ISCSI, and so forth may be used in networks 180 and 190. Switch 140 may utilize a protocol associated with both networks 180 and 190. The network 190 may interface with a set of communications protocols used for the Internet 160 such as the Transmission Control Protocol (TCP) and the Internet Protocol (IP), or TCP/IP. Switch 150 may be a TCP/IP switch.

Client computer systems 110a-110c are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 110a-110c include one or more processors comprising one or more processor cores. Each processor core includes circuitry for executing instructions according to a predefined general-purpose instruction set. For example, the x86 instruction set architecture may be selected. Alternatively, the Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Each processor core and memory hierarchy within a client computer system may be connected to a network interface. In addition to hardware components, each of the client computer systems 110a-110c may include a base operating system (OS) stored within the memory hierarchy. The base OS may be representative of any of a variety of operating systems, such as, for example, MS-DOS®, MS-WINDOWS®, OS/2®, UNIX®, Linux®, Solaris®, AIX®, DART, or otherwise. As such, the base OS may be operable to provide various services to the end-user and provide a software framework operable to support the execution of various programs. Additionally, each of the client computer systems 110a-110c may include a hypervisor used to support virtual machines (VMs). As is well known to those skilled in the art, virtualization may be used in desktops and servers to fully or partially decouple software, such as an OS, from a system's hardware. Virtualization may provide an end-user with an illusion of multiple OSes running on a same machine each having its own resources and access to logical storage entities (e.g., LUNs) built upon the storage devices 176a-176m within each of the data storage arrays 120a-120b.

Each of the data storage arrays 120a-120b may be used for the sharing of data among different servers, such as the client computer systems 110a-110c. Each of the data storage arrays 120a-120b includes a storage subsystem 170 for data storage. Storage subsystem 170 may comprise a plurality of storage devices 176a-176m. Each of these storage devices 176a-176m may be an SSD. A controller 174 may comprise logic for handling received read/write requests. A random-access memory (RAM) 172 may be used to batch operations, such as received write requests. In various embodiments, when batching write operations (or other operations) non-volatile storage (e.g., NVRAM) may be used.

The base OS 132, the volume manager 134 (or disk array manager 134), any OS drivers (not shown) and other software stored in memory medium 130 may provide functionality providing access to files and the management of these functionalities. The base OS 132 may be a storage operating system such as NetApp Data ONTAP® or otherwise. The base OS 132 and the OS drivers may comprise program instructions stored on the memory medium 130 and executable by processor 122 to perform one or more memory access operations in storage subsystem 170 that correspond to received requests. The system shown in FIG. 1 may generally include one or more file servers and/or block servers.

Each of the data storage arrays 120a-120b may use a network interface 124 to connect to network 180. Similar to client computer systems 110a-110c, in one embodiment, the functionality of network interface 124 may be included on a network adapter card. The functionality of network interface 124 may be implemented using both hardware and software. Both a random-access memory (RAM) and a read-only memory (ROM) may be included on a network card implementation of network interface 124. One or more application specific integrated circuits (ASICs) may be used to provide the functionality of network interface 124.

In addition to the above, each of the storage controllers 174 within the data storage arrays 120a-120b may support storage array functions such as snapshots, replication, and high availability. In addition, each of the storage controllers 174 may support a virtual machine environment that comprises a plurality of volumes with each volume including a plurality of snapshots. In one example, a storage controller 174 may support hundreds of thousands of volumes, wherein each volume includes thousands of snapshots. In one embodiment, a volume may be mapped in fixed-size sectors, such as a 4-kilobyte (KB) page within storage devices 176a-176m. In another embodiment, a volume may be mapped in variable-size sectors such as for write requests. A volume ID, a snapshot ID, and a sector number may be used to identify a given volume.

An address translation table may comprise a plurality of entries, wherein each entry holds a virtual-to-physical mapping for a corresponding data component. This mapping table may be used to map logical read/write requests from each of the client computer systems 110a-110c to physical locations in storage devices 176a-176m. A "physical" pointer value may be read from the mapping table during a lookup operation corresponding to a received read/write request. This physical pointer value may then be used to locate a physical location within the storage devices 176a-176m. It is noted that the physical pointer value may be used to access another mapping table within a given storage device of the storage devices 176a-176m. Consequently, one or more levels of indirection may exist between the physical pointer value and a target storage location.

In another embodiment, the mapping table may comprise information used to deduplicate data (deduplication table related information). The information stored in the deduplication table may include mappings between one or more calculated hash values for a given data component and a physical pointer to a physical location in one of the storage devices 176a-176m holding the given data component. In addition, a length of the given data component and status information for a corresponding entry may be stored in the deduplication table.

Figure 2:
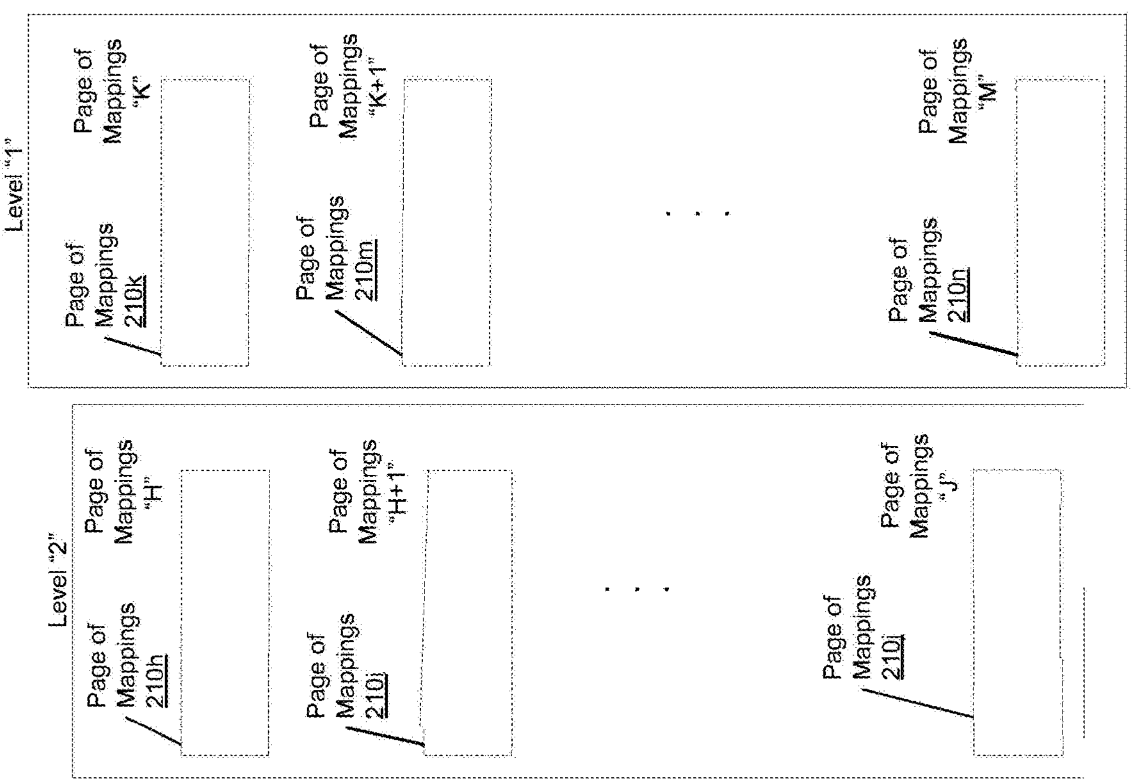
FIG. 2 is a generalized block diagram of one embodiment of a mapping table.
Figure 2:
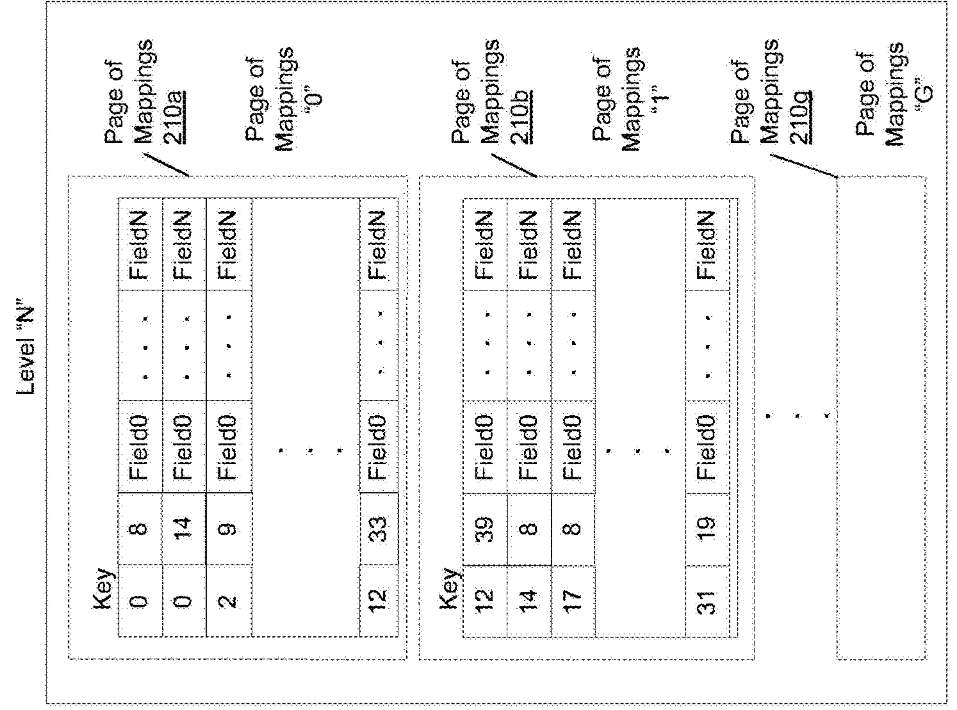

Turning now to FIG. 2, a generalized block diagram of one embodiment of a mapping table is shown. As discussed earlier, one or more mapping tables may be used for I/O redirection or translation, deduplication of duplicate copies of user data, volume snapshot mappings, and so forth. Mapping tables may be stored in the storage devices 176*a*-176*m*. The diagram shown in FIG. 2 represents a logical representation of one embodiment of the organization and storage of the mapping table. Each level shown may include mapping table entries corresponding to a different period of time. For example, level "1" may include information older than information stored in level "2". Similarly, level "2" may include information older than information stored in level "3". The information stored in the records, pages and levels shown in FIG. 2 may be stored in a random-access manner within the storage devices 176*a*-176*m*. Additionally, copies of portions or all of a given mapping table entries may be stored in RAM 172, in buffers within controller 174, in memory medium 130, and in one or more caches within or coupled to processor 122. In various embodiments, a corresponding index may be included in each level for mappings which are part of the level (as depicted later in FIG. 4). Such an index may include an identification of mapping table entries and where they are stored (e.g., an identification of the page) within the level. In other embodiments, the index associated with mapping table entries may be a distinct entity, or entities, which are not logically part of the levels themselves.

Generally speaking, each mapping table comprises a set of rows and columns. A single record may be stored in a mapping table as a row. A record may also be referred to as an entry. In one embodiment, a record stores at least one tuple including a key. Tuples may (or may not) also include data fields including data such as a pointer used to identify or locate data components stored in storage subsystem 170. It is noted that in various embodiments, the storage subsystem may include storage devices (e.g., SSDs) which have internal mapping mechanisms. In such embodiments, the pointer in the tuple may not be an actual physical address per se. Rather, the pointer may be a logical address which the storage device maps to a physical location within the device. Over time, this internal mapping between logical address and physical location may change. In other embodiments, records in the mapping table may only contain key fields with no additional associated data fields. Attributes associated with a data component corresponding to a given record may be stored in columns, or fields, in the table. Status information, such as a valid indicator, a data age, a data size, and so forth, may be stored in fields, such as Field0 to FieldN shown in FIG. 2. In various embodiments, each column stores information corresponding to a given type. In some embodiments, compression techniques may be utilized for selected fields which in some cases may result in fields whose compressed representation is zero bits in length.

A key is an entity in a mapping table that may distinguish one row of data from another row. Each row may also be referred to as an entry or a record. A key may be a single column, or it may consist of a group of columns used to identify a record. In one example, an address translation mapping table may utilize a key comprising a volume identifier (ID), a logical or virtual address, a snapshot ID, a sector number, and so forth. A given received read/write storage access request may identify a particular volume, sector, and length. A sector may be a logical block of data stored in a volume. Sectors may have different sizes on different volumes. The address translation mapping table may map a volume in sector-size units.

A volume identifier (ID) may be used to access a volume table that conveys a volume ID and a corresponding current snapshot ID. This information along with the received sector number may be used to access the address translation mapping table. Therefore, in such an embodiment, the key value for accessing the address translation mapping table is the combination of the volume ID, snapshot ID, and the received sector number. In one embodiment, the records within the address translation mapping table are sorted by volume ID, followed by the sector number and then by the snapshot ID. This ordering may group together different versions of data components in different snapshots. Therefore, during a lookup for a storage access read request, a corresponding data component may be found with fewer read operations to the storage devices 176*a*-176*m*.

The address translation mapping table may convey a physical pointer value that indicates a location within the data storage subsystem 170 storing a data component corresponding to the received data storage access request. The key value may be compared to one or more key values stored in the mapping table. In the illustrated example, simpler key values, such as "0", "2", "12" and so forth, are shown for ease of illustration. The physical pointer value may be stored in one or more of the fields in a corresponding record.

The physical pointer value may include a segment identifier (ID) and a physical address identifying the location of storage. A segment may be a basic unit of allocation in each of the storage devices 176*a*-176*m*. A segment may have a redundant array of independent device (RAID) level and a data type. During allocation, a segment may have one or more of the storage devices 176*a*-176*m* selected for corresponding storage. In one embodiment, a segment may be allocated an equal amount of storage space on each of the one or more selected storage devices of the storage devices 176*a*-176*m*. The data storage access request may correspond to multiple sectors, which may result in multiple parallel lookups. A write request may be placed in an NVRAM buffer, such as RAM 172, and a write completion acknowledgment may be sent to a corresponding client computer of the client computers 110*a*-110*c*. At a later time, an asynchronous process may flush the buffered write requests to the storage devices 176*a*-176*m*.

In another example, the mapping table shown in FIG. 2 may be a deduplication table. A deduplication table may utilize a key comprising a hash value determined from a data component associated with a storage access request. The initial steps of a deduplication operation may be performed concurrently with other operations, such as a read/write request, a garbage collection operation, a trim operation, and so forth. For a given write request, the data sent from one of the client computer systems 110*a*-110*c* may be a data stream, such as a byte stream. As is well known to those skilled in the art, a data stream may be divided into a sequence of fixed-length or variable-length chunks. A chunking algorithm may perform the dividing of the data stream into discrete data components which may be referred to as "chunks". A chunk may be a sub-file content-addressable unit of data. In various embodiments, a table or other structure may be used to determine a particular chunking algorithm to use for a given file type or type of data. A file's type may be determined by referring to its file name extension, separate identifying information, the content of the data itself, or otherwise. The resulting chunks may then be stored in one of the data storage arrays 120*a*-120*b* to allow for sharing of the chunks. Such chunks may be stored separately or grouped together in various ways.

In various embodiments, the chunks may be represented by a data structure that allows reconstruction of a larger data component from its chunks (e.g., a particular file may be reconstructed based on one or more smaller chunks of stored data). A corresponding data structure may record its corresponding chunks including an associated calculated hash value, a pointer (physical and/or logical) to its location in one of the data storage arrays 120*a*-120*b*, and its length. For each data component, a deduplication application may be used to calculate a corresponding hash value. For example, a hash function, such as Message-Digest algorithm 5 (MD5), Secure Hash Algorithm (SHA), or otherwise, may be used to calculate a corresponding hash value. In order to know if a given data component corresponding to a received write request is already stored in one of the data storage arrays 120*a*-120*b*, bits of the calculated hash value (or a subset of bits of the hash value) for the given data component may be compared to bits in the hash values of data components stored in one or more of the data storage arrays 120*a*-120*b*.

A mapping table may comprise one or more levels as shown in FIG. 2. A mapping table may comprise 16 to 64 levels, although another number of levels supported within a mapping table is possible and contemplated. In FIG. 2, three levels labeled Level "1", Level "2" and Level "N" are shown for ease of illustration. Each level within a mapping table may include one or more partitions. In one embodiment, each partition is a 4 kilo-byte (KB) page. For example, Level "N" is shown to comprise pages 210*a*-210*g*, Level "2" comprises pages 210*h*-210*j* and Level "1" comprises pages 210*k*-210*n*. It is possible and contemplated that other partition sizes may also be chosen for each of the levels within a mapping table. In addition, it is possible one or more levels have a single partition, which is the level itself.

In one embodiment, multiple levels within a mapping table are sorted by time. For example, in FIG. 2, Level "1" may be older than Level "2". Similarly, Level "2" may be older than Level "N". In one embodiment, when a condition for inserting one or more new records in the mapping table is detected, a new level may be created. In various embodiments, when a new level is created the number/designation given to the new level is greater than numbers given to levels that preceded the new level in time. For example, if the most recent level created is assigned the value 8, then a newly created level may be assigned the value 9. In this manner a temporal relationship between the levels may be established or determined. As may be appreciated, numerical values need not be strictly sequential. Additionally, alternative embodiments may reverse the numbering scheme such that newer levels have smaller numerical designations. Further, other embodiments may utilize non-numerical designations to distinguish between levels. Numerous such embodiments are possible and are contemplated. Each next older level has a label decremented by one from a label integer value of a previous younger level. A separate table not shown may be used to logically describe the mapping table. For example, each entry of the separate table may include a given level ID and a list of the page IDs stored within the given level ID.

By creating a new highest level for an insertion of new records, the mapping table is updated by appending the new records. In one embodiment, a single level is created as a new highest level and each of the new records is inserted into the single level. In another embodiment, the new records may be searched for duplicate keys prior to insertion into the mapping table. A single level may be created as a new highest level. When a given record storing a duplicate key is found, each of the records buffered ahead of the given record may be inserted into the single level. The new records may be buffered in a manner to preserve memory ordering, such as in-order completion of requests. Then another single level may be created and the remainder of the new records may be inserted into this other single level unless another record storing a duplicate key is found. If such a record is found, then the steps are repeated. Existing records within the mapping table storing a same key value as one of the new records are not edited or overwritten in-place by the insertion of the new records.

Although the sizes of the levels are illustrated as increasing with lower levels being larger than newer levels, the higher levels may alternate between being larger or smaller than neighboring levels. The number of newer records to insert into the mapping table may vary over time and create the fluctuating level sizes. The lower levels may be larger than newer levels due to flattening of the lower levels. Two or more lower levels may be flattened into a single level when particular conditions are detected. Further details are provided later.

With no edits in-place for the records stored in the mapping table, newer records placed in higher levels may override records storing a same key value located in the lower levels. For example, when the mapping table is accessed by a given key value, one or more levels may be found to store a record holding a key value matching the given key value. In such a case, the highest level of the one or more levels may be chosen to provide the information stored in its corresponding record as a result of the access. Further details are provided later. In addition, further details about the detected conditions for inserting one or more new records into the mapping table and the storage of information are provided later.

In one embodiment, entries within a given page may be sorted by key. For example, the entries may be sorted in ascending order according to a key included in the entry. Additionally, in various embodiments, the pages within a level may be sorted according to any desired sort order. In various embodiments, the pages within a level may also be sorted (e.g., according to key values or otherwise). In the example of FIG. 2, page 210*a* of Level N includes records sorted according to key value in ascending order. In various embodiments, one or more columns may be used to store key values. In the example of FIG. 2, two columns or fields are shown in each tuple for storing key values. Utilizing such key values, the records then may be sorted in a desired order. Sorting may be performed based on any of the key values for a records, or any combination of key values for the record. In the example shown, the first record stores a key value including 0 and 8 stored in two columns, and the last record stores a key value including 12 and 33. In this illustrated example, each sorted record in page 210*a* between the first and the last record stores a key value between 0 and 12 in the first column and the records are arranged in a manner to store key values based (at least in part) on the first column in an ascending order from 0 to 12. Similarly, page 210*b* includes sorted records, wherein the first record stores key values of 12 and 39 and the last record stores key values of 31 and 19. In this illustrated example, each sorted record in page 210*b* between the first and the last record stores a key value between 12 and 31 in the first column and the records are arranged in a manner to store key values in an ascending order from 12 to 31.

In addition to the above, the pages within Level N are sorted according to a desired order. In various embodiments, pages within a level may be sorted in a manner that reflects the order in which entries within a page are sorted. For example, pages within a level may be sorted according to key values in ascending order. As the first key value in page 210*b* is greater than the last key value in page 210*a*, page 210*b* follows page 210*a* in the sort order. Page 210*g* would then include entries whose key values are greater than those included in pages 210*a*-210*f* (not shown). In this manner, all entries within a level are sorted according to a common scheme. The entries are simply subdivided into page, or other, size units. As may be appreciated, other sorting schemes may be used as desired.

Figure 3A:
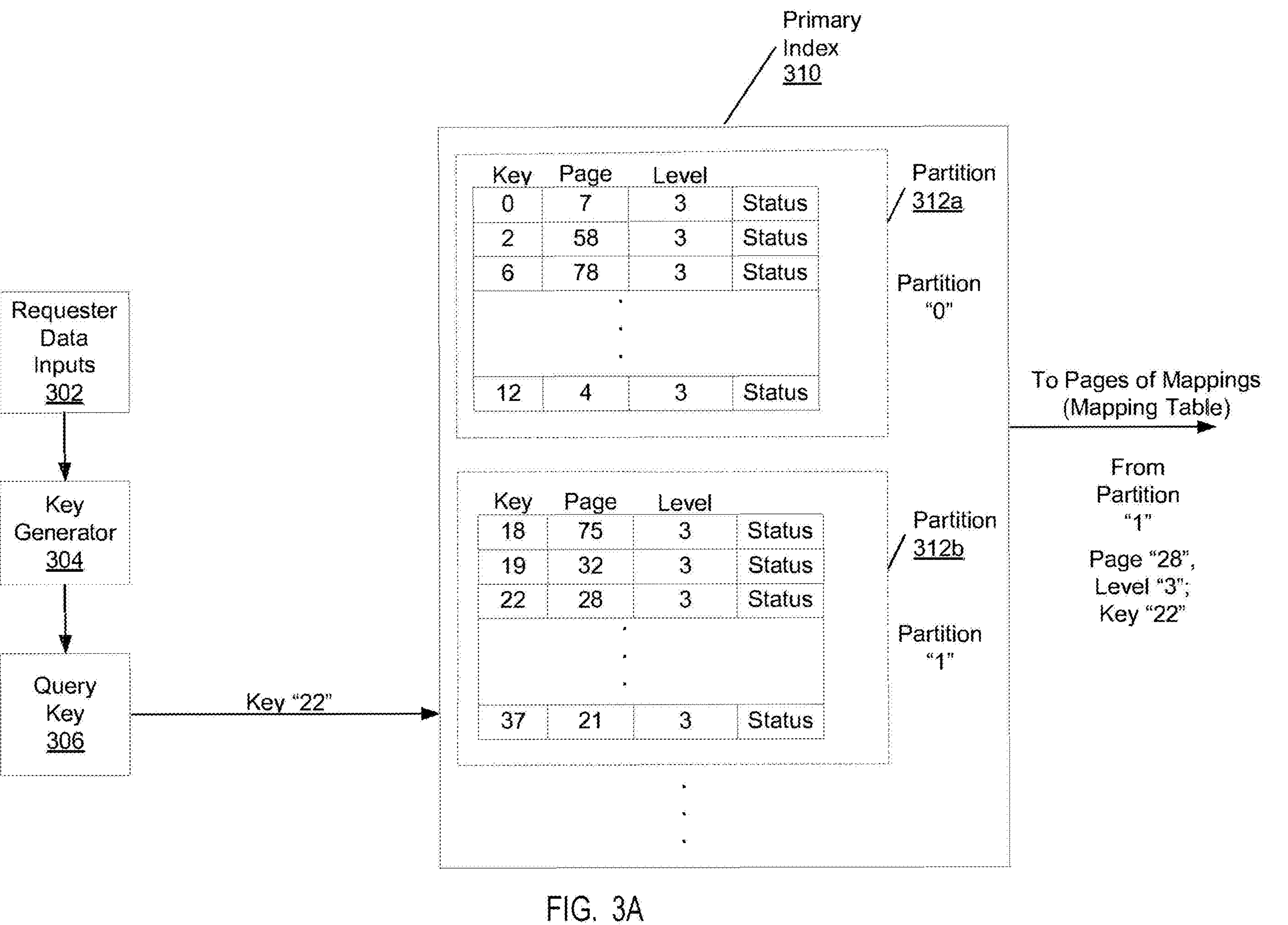
FIG. 3A is a generalized block diagram of one embodiment of a primary index used to access a mapping table.

Referring now to FIG. 3A, a generalized block diagram of one embodiment of a primary index used to access a mapping table is shown. A key generator 304 may receive one or more requester data inputs 302. In one embodiment, a mapping table is an address translation directory table. A given received read/write request may identify a particular volume, sector, and length. The key generator 304 may produce a query key value 306 that includes a volume identifier (ID), a logical or virtual address, a snapshot ID, and a sector number. Other combinations are possible and other or additional values may be utilized as well. Different portions of the query key value 306 may be compared to values stored in columns that may or may not be contiguous within the mapping table. In the shown example, a key value of "22" is used for case of illustration.

As described earlier, both a chunking algorithm and/or a segmenting algorithm associated with the key generator 304 may receive data 302 corresponding to a storage access request. These algorithms may produce one or more data components and select a hash function to calculate a corresponding hash value, or query key value 306, for each data component. The resulting hash value may be used to index the deduplication table.

A primary index 310, as shown in FIG. 3A, may provide location identifying information for data stored in the storage devices 176*a*-176*m*. For example, referring again to FIG. 2, a corresponding primary index 310 (or portion thereof) may be logically included in each of level "1", level "2" and level "N". Again, each level and each corresponding primary index may be physically stored in a random-access manner within the storage devices 176*a*-176*m*.

In one embodiment, the primary index 310 may be divided into partitions, such as partitions 312*a*-312*b*. In one embodiment, the size of the partitions may range from a 4 kilobyte (KB) page to 256 KB, though other sizes are possible and are contemplated. Each entry of the primary index 310 may store a key value. In addition, each entry may store a corresponding unique virtual page identifier (ID) and a level ID corresponding to the key value. Each entry may store corresponding status information such as validity information. When the primary index 310 is accessed with a query key value, the entries within the index 310 may be searched for one or more entries which match, or otherwise correspond to, the key value. Information from the matching entry may then be used to locate and retrieve a mapping which identifies a storage location which is the target of a received read or write request. In other words, the index 310 identifies the locations of mappings. In one embodiment, a hit in the index provides a corresponding page ID identifying a page within the storage devices 176*a*-176*m* storing both the key value and a corresponding physical pointer value. The page identified by the corresponding page ID may be searched with the key value to find the physical pointer value.

In the example of FIG. 3A, a received request corresponds to a key "22". This key is then used to access index 310. A search of the index 310 results on a hit to an entry within partition 312*b*. The matching entry in this case includes information such as—page 28, and level 3. Based upon this result, the desired mapping for the request is found in a page identified as page 28 within level 3 of the mapping tables. Using this information, an access may then be made to the mapping tables to retrieve the desired mapping. If an access to the primary index 310 requires an access to storage, then at least two storage accesses would be required in order to obtain a desired mapping. Therefore, in various embodiments as described herein, portions of the primary index are cached, or otherwise stored in a relatively fast access memory, in order to eliminate one access to the storage devices. In various embodiments, the entire primary index for the mapping tables is cached. In some embodiments, where the primary index has become too large to cache in its entirety, or is otherwise larger than desired, secondary, tertiary, or other index portions may be used in the cache to reduce its size. Secondary type indices are discussed herein. In addition to the above, in various embodiments mapping pages corresponding to recent hits are also cached for at least some period of time. In this manner, processes which exhibit accesses with temporal locality can be serviced more rapidly (i.e., recently accessed locations will have their mappings cached and readily available).

Figure 3B:
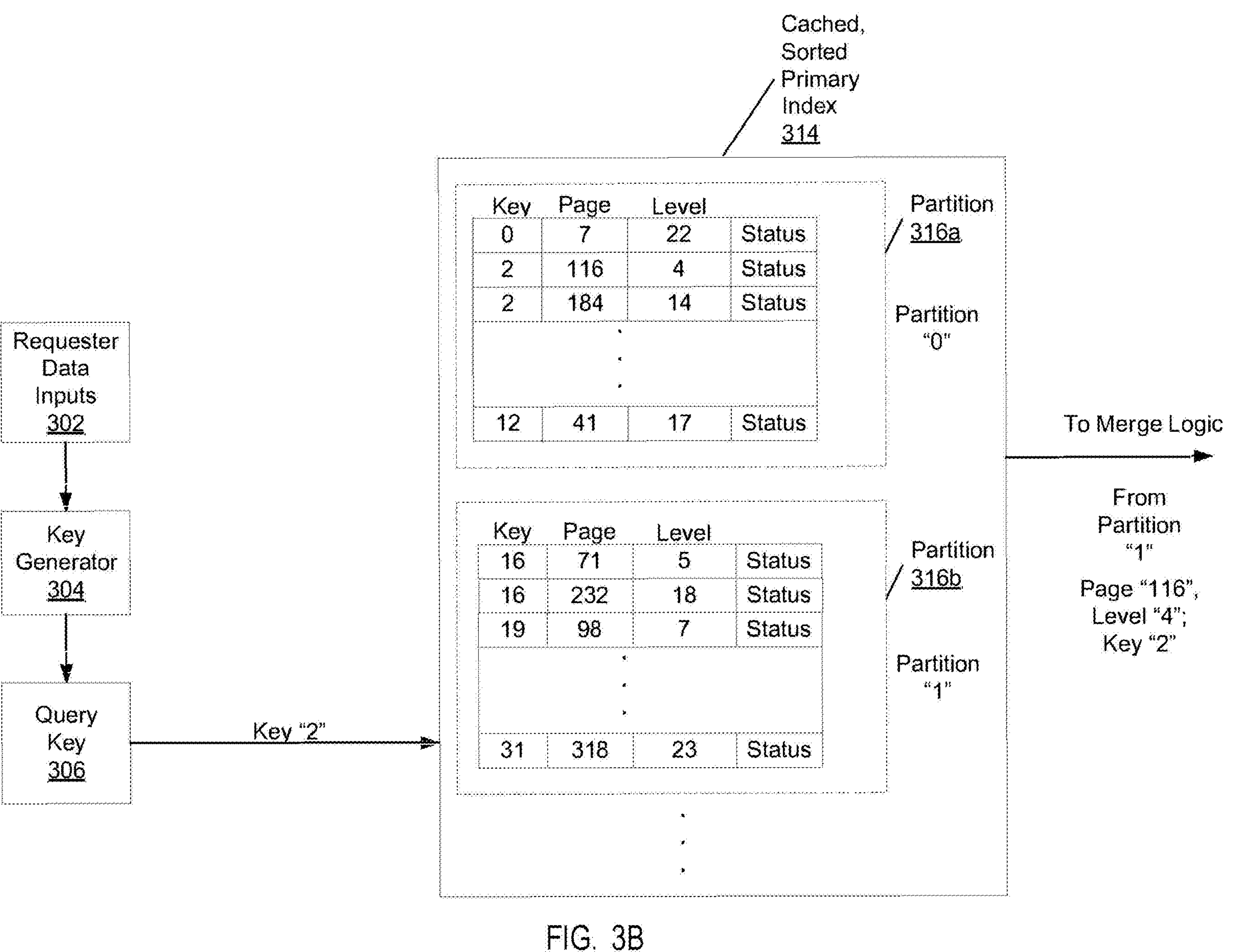
FIG. 3B is a generalized block diagram of another embodiment of a primary index used to access a mapping table.

Referring now to FIG. 3B, a generalized block diagram of one embodiment of a cached primary index used to access a mapping table is shown. Circuit and logic portions corresponding to those of FIG. 3A are numbered identically. The cached primary index 314 may include copies of information stored in each of the primary indexes 310 for the multiple levels in a mapping table. The primary index 314 may be stored in one or more of RAM 172, buffers within controller 174, memory medium 130 and caches within processor 122. In one embodiment, the primary index 314 may be sorted by key value, though sorting otherwise is possible. The primary index 314 may also be divided into partitions, such as partitions 316*a*-316*b*. In one embodiment, the size of the partitions 316*a*-316*b* may be a same size as the partitions 312*a*-312*b* within the primary index 310.

Similar to the primary index 310, each entry of the primary index 314 may store one or more of a key value, a corresponding unique virtual page identifier (ID), a level ID corresponding to the key value, and status information such as valid information. When the primary index 314 is accessed with a query key value 306, it may convey a corresponding page ID identifying a page within the storage devices 176*a*-176*m* storing both the key value and a corresponding pointer value. The page identified by the corresponding page ID may be searched with the key value to find the pointer value. As shown, the primary index 314 may have multiple records storing a same key value. Therefore, multiple hits may result from the search for a given key value. In one embodiment, a hit with a highest value of a level ID (or whatever indicator is used to identify a youngest level or most recent entry) may be chosen. This selection of one hit from multiple hits may be performed by merge logic not shown here. A further description of the merge logic is provided later.

Figure 4:
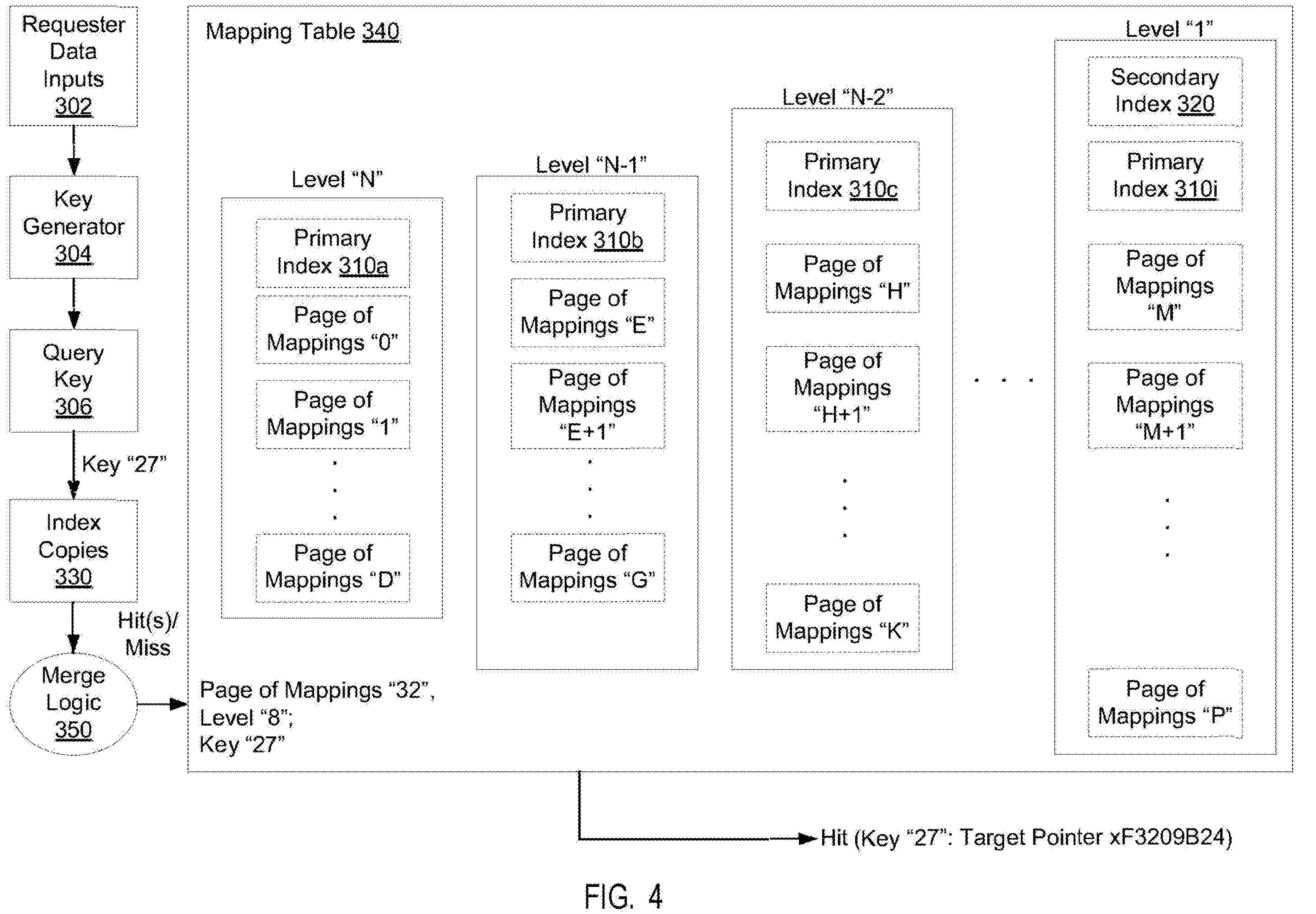
FIG. 4 is a generalized block diagram of another embodiment of a primary index and mapping table.

Turning now to FIG. 4, a generalized block diagram of another embodiment of a mapping table and primary index used to access the mapping table is shown. Circuit and logic portions corresponding to those of FIG. 3A are numbered identically. Mapping table 340 may have a similar structure as the mapping table shown in FIG. 2. However, storage of a corresponding primary index 310 for each level is now shown. A copy of one or more of the primary index portions 310*a*-310*i* may be included in index copies 330 (e.g., cached copies). Copies 330 may generally correspond to the cached index depicted in FIG. 3B. The information in index copies 330 may be stored in RAM 172, buffers within controller 174, memory medium 130, and caches within processor 122. In the embodiment shown, the information in primary indexes 310*a*-310*i* may be stored with the pages of mappings in storage devices 176*a*-176*m*. Also shown is a secondary index 320 which may be used to access a primary index, such as primary index 310*i* shown in the diagram. Similarly, accessing and updating the mapping table 340 may occur as described earlier.

Mapping table 340 comprises multiple levels, such as Level "1" to Level "N". In the illustrated example, each of the levels includes multiple pages. Level "N" is shown to include pages "0" to "D", Level N−1 includes pages "E" to "G", and so forth. Again, the levels within the mapping table 310 may be sorted by time. Level "N" may be younger than Level "N−1" and so forth. Mapping table 340 may be accessed by at least a key value. In the illustrated example, mapping table 340 is accessed by a key value "27" and a page ID "32". For example, in one embodiment, a level ID "8" may be used to identify a particular level (or "subtable") of the mapping table 340 to search. Having identified the desired subtable, the page ID may then be used to identify the desired page within the subtable. Finally, the key may be used to identify the desired entry within the desired page.

As discussed above, an access to the cached index 330 may result in multiple hits. In one embodiment, the results of these multiple hits are provided to merge logic 350 which identifies which hit is used to access the mapping table 340. Merge logic 350 may represent hardware and/or software which is included within a storage controller. In one embodiment, merge logic 350 is configured to identify a hit which corresponds to a most recent (newest) mapping. Such an identification could be based upon an identification of a corresponding level for an entry, or otherwise. In the example shown, a query corresponding to level 8, page 32, key 27 is received. Responsive to the query, page 32 of level 8 is accessed. If the key 27 is found within page 32 (a hit), then a corresponding result is returned (e.g., pointer xF3209B24 in the example shown). If the key 27 is not found within page 32, then a miss indication is returned. This physical pointer value may be output from the mapping table 340 to service a storage access request corresponding to the key value "27".

In one embodiment, the mapping table 340 supports inline mappings. For example, a mapping detected to have a sufficiently small target may be represented without an actual physical sector storing user data within the storage devices 176*a*-176*m*. One example may be a repeating pattern within the user data. Rather than actually store multiple copies of a repeated pattern (e.g., a series of zeroes) as user data within the storage devices 176*a*-176*m*, a corresponding mapping may have an indication marked in the status information, such as within one of the fields of field0 to fieldN in the mapping table, that indicates what data value is to be returned for a read request. However, there is no actual storage of this user data at a target location within the storage devices 176*a*-176*m*. Additionally, an indication may be stored within the status information of the primary index 310 and any additional indexes that may be used (not shown here).

In addition to the above, in various embodiments the storage system may simultaneously support multiple versions of the data organization, storage schemes, and so on. For example, as the system hardware and software evolve, new features may be incorporated or otherwise provided. Data, indexes, and mappings (for example) which are newer may take advantage of these new features. In the example of FIG. 4, new level N may correspond to one version of the system, while older level N−1 may correspond to a prior version. In order to accommodate these different versions, metadata may be stored in association with each of the levels which indicates which version, which features, compression schemes, and so on, are used by that level. This metadata could be stored as part of the index, the pages themselves, or both. When accesses are made, this metadata then indicates how the data is to be handled properly. Additionally, new schemes and features can be applied dynamically without the need to quiesce the system. In this manner, upgrading of the system is more flexible and a rebuild of older data to reflect newer schemes and approaches is not necessary.

Figure 5A:
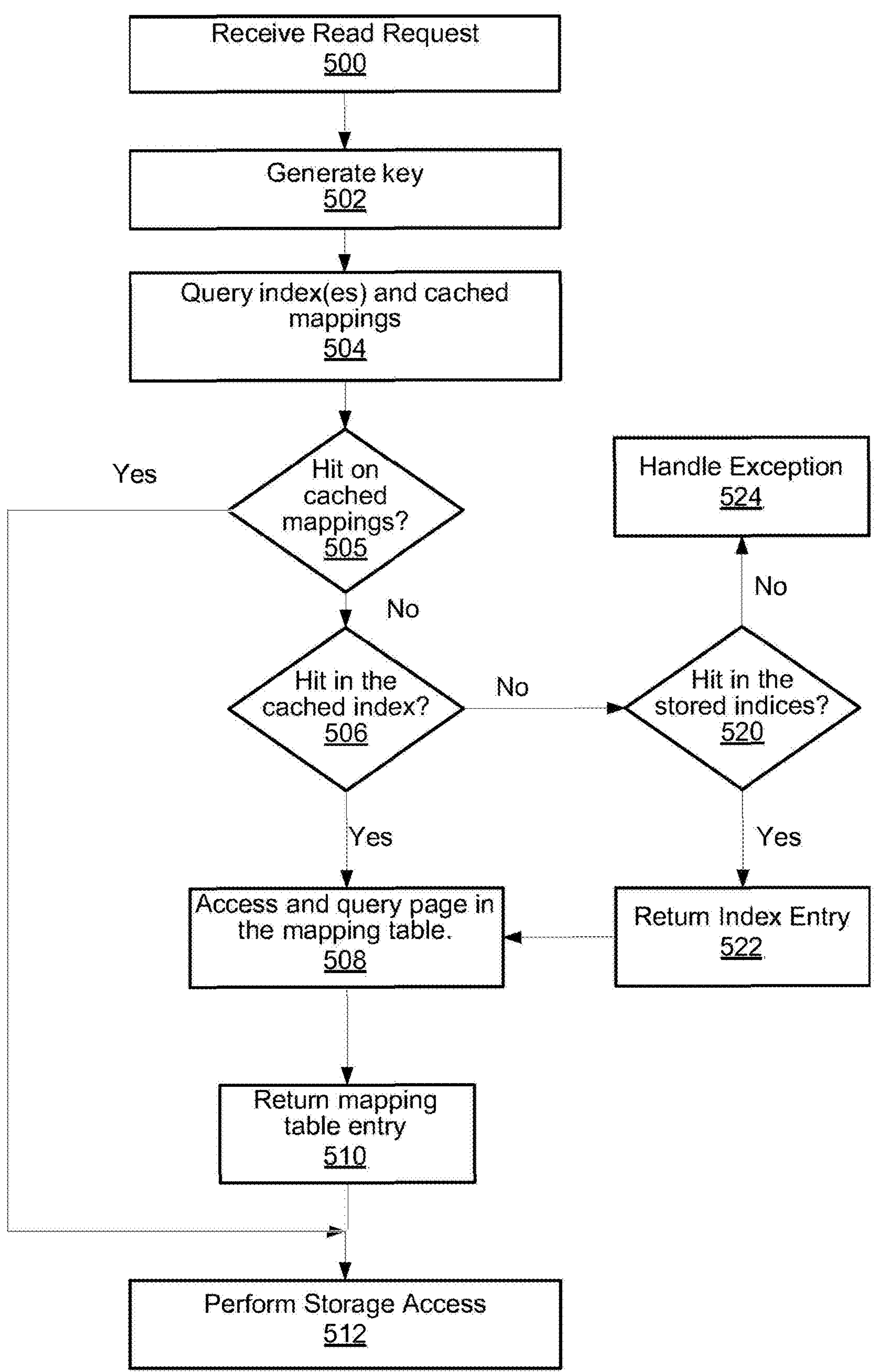
FIG. 5A is a generalized flow diagram illustrating one embodiment of a method for performing a read access.

Turning now to FIG. 5A, one embodiment of a method for servicing a read access is shown. The components embodied in the network architecture 100 and mapping table 340 described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

Read and store (write) requests may be conveyed from one of the clients 110*a*-110*c* to one of the data storage arrays 120*a*-120*b*. In the example shown, a read request 500 is received, and in block 502 a corresponding query key value may be generated. In some embodiments, the request itself may include the key which is used to access the index and a "generation" of the key 502 is not required. As described earlier, the query key value may be a virtual address index comprising a volume ID, a logical address or virtual address associated with a received request, a snapshot ID, a sector number, and so forth. In embodiments which are used for deduplication, the query key value may be generated using a hash function or other function. Other values are possible and contemplated for the query key value, which is used to access a mapping table.

In block 504, the query key value may be used to access one or more cached indexes to identify one or more portions of a mapping table that may store a mapping that corresponds to the key value. Additionally, recently used mappings which have been cached may be searched as well. If a hit on the cached mappings is detected (block 505), the cached mapping may be used to perform the requested access (block 512). If there is no hit on the cached mappings, a determination may be made as to whether or not there is a hit on the cached index (block 506). If so, a result corresponding to the hit is used to identify and access the mapping table (block 508). For example, with the primary index 310, an entry storing the query key value also may store a unique virtual page ID that identifies a single particular page within the mapping table. This single particular page may store both the query key value and an associated physical pointer value. In block 508, the identified portion of the mapping table may be accessed and a search performed using the query key value. The mapping table result may then be returned (block 510) and used to perform a storage access (block 512) that corresponds to the target location of the original read request.

In some embodiments, an index query responsive to a read request may result in a miss. Such a miss could be due to only a portion of the index being cached or an error condition (e.g., a read access to a non-existent location, address corruption, etc.). In such a case, an access to the stored index may be performed. If the access to the stored index results in a hit (block 520), then a result may be returned (block 522) which is used to access the mapping tables (block 508). On the other hand, if the access to the stored index results in a miss, then an error condition may be detected. Handling of the error condition may be done in any of a variety of desired ways. In one embodiment, an exception may be generated (block 524) which is then handled as desired. In one embodiment, a portion of the mapping table is returned in block 510. In various embodiments, this portion is a page which may be a 4 KB page, or otherwise. As previously discussed, the records within a page may be sorted to facilitate faster searches of the content included therein.

In one embodiment, the mapping table utilizes traditional database systems methods for information storage in each page. For example, each record (or row or entry) within the mapping table is stored one right after the other. This approach may be used in row-oriented or row-store databases and additionally with correlation databases. These types of databases utilize a value-based storage structure. A value-based storage (VBS) architecture stores a unique data value only once and an auto-generated indexing system maintains the context for all values. In various embodiments, data may be stored by row and compression may be used on the columns (fields) within a row. In some embodiments, the techniques used may include storing a base value and having a smaller field size for the offset and/or having a set of base values, with a column in a row consisting of a base selector and an offset from that base. In both cases, the compression information may be stored within (e.g., at the start) of the partition.

In some embodiments, the mapping table utilizes a column-oriented database system (column-store) method for information storage in each page. Column-stores store each database table column separately. In addition, attribute values belonging to a same column may be stored contiguously, compressed, and densely packed. Accordingly, reading a subset of a table's columns, such as within a page, may be performed relatively quickly. Column data may be of uniform type and may allow storage size optimizations to be used that may not be available in row-oriented data. Some compression schemes, such as Lempel-Ziv-Welch (LZ) and run-length encoding (RLE), take advantage of a detected similarity of adjacent data to compress. A compression algorithm may be chosen that allows individual records within the page to be identified and indexed. Compressing the records within the mapping table may enable fine-grained mapping. In various embodiments, the type of compression used for a particular portion of data may be stored in association with the data. For example, the type of compression could be stored in an index, as part of a same page as the compressed data (e.g., in a header of some type), or otherwise. In this manner, multiple compression techniques and algorithms may be used side by side within the storage system. In addition, in various embodiments the type of compression used for storing page data may be determined dynamically at the time the data is stored. In one embodiment, one of a variety of compression techniques may be chosen based at least in part on the nature and type of data being compressed. In some embodiments, multiple compression techniques will be performed and the one exhibiting the best compression will then be selected for use in compressing the data. Numerous such approaches are possible and are contemplated.

If there is a match of the query key value 306 found in any of the levels of the mapping table (block 508), then in block 510, one or more indications of a hit may be conveyed to the merge logic 350. For example, one or more hit indications may be conveyed from levels "1" to "J" as shown in FIG. 4. The merge logic 350 may choose the highest level, which may also be the youngest level, of the levels "1" to "J" conveying a hit indication. The chosen level may provide information stored in a corresponding record as a result of the access.

In block 512, one or more corresponding fields within a matching record of a chosen page may be read to process a corresponding request. In one embodiment, when the data within the page is stored in a compressed format, the page is decompressed and a corresponding physical pointer value is read out. In another embodiment, only the matching record is decompressed and a corresponding physical pointer value is read out. In one embodiment, a full physical pointer value may be split between the mapping table and a corresponding target physical location. Therefore, multiple physical locations storing user data may be accessed to complete a data storage access request.

Figure 5B:
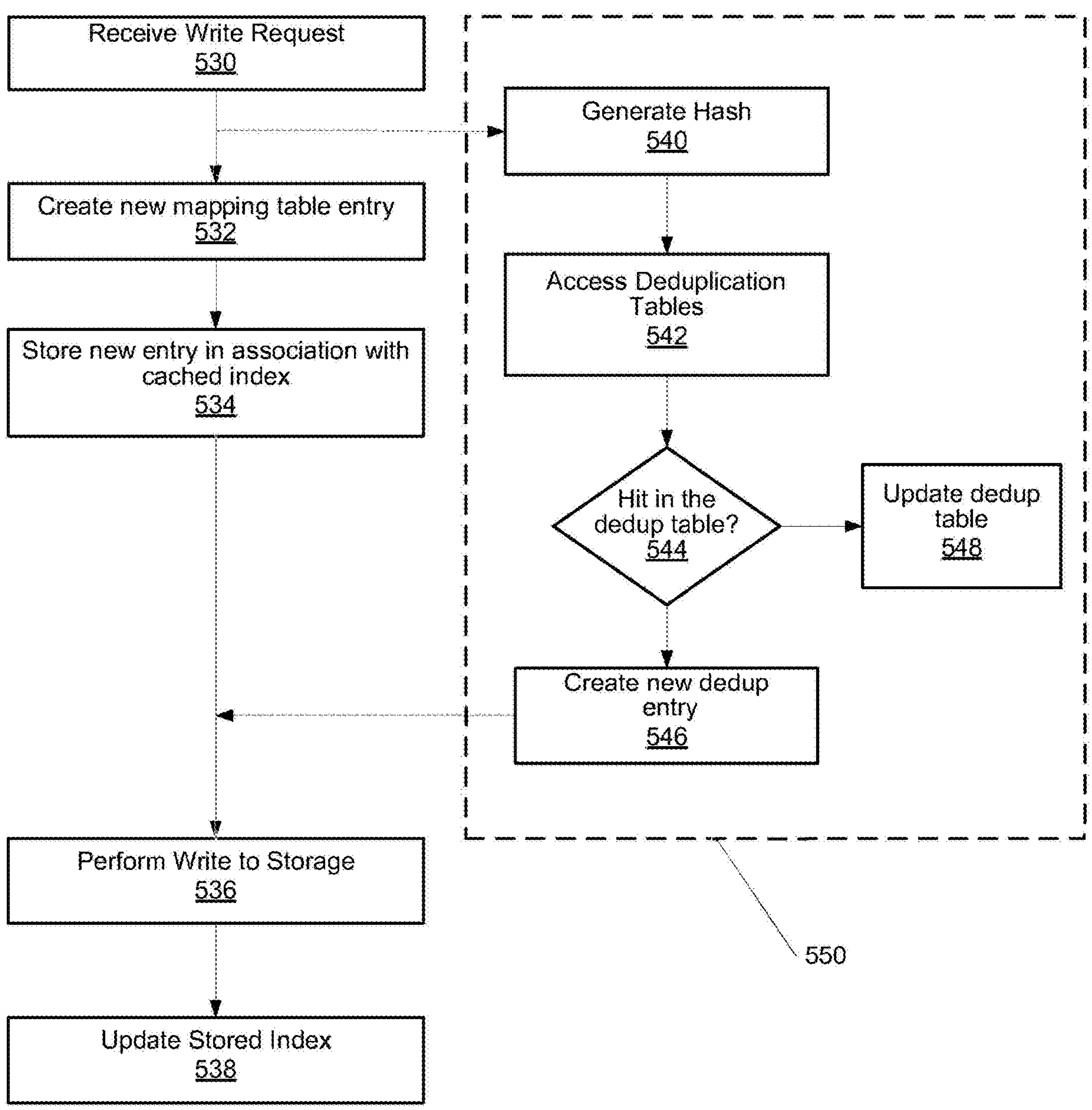
FIG. 5B is a generalized flow diagram illustrating one embodiment of a method for performing a write operation.

Turning now to FIG. 5B, one embodiment of a method corresponding to a received write request is shown. Responsive to a received write request (block 530), a new mapping table entry corresponding to the request may be created (block 532). In one embodiment, a new virtual-to-physical address mapping may be added (block 534) to the mapping table that pairs the virtual address of the write request with the physical location storing the corresponding data component. In various embodiments, the new mapping may be cached with other new mappings and added to a new highest level of the mapping table entries. The write operation to persistent storage (block 536) may then be performed. In various embodiments, writing the new mapping table entry to the mapping tables in persistent storage may not be performed until a later point in time (block 538) which is deemed more efficient. As previously discussed, in a storage system using solid state storage devices, writes to storage are much slower than reads from storage. Accordingly, writes to storage are scheduled in such a way that they minimize impact on overall system performance. In some embodiments, the insertion of new records into the mapping table may be combined with other larger data updates. Combining the updates in this manner may provide for more efficient write operations. It is noted that in the method of 5B, as with each of the methods described herein, operations are described as occurring in a particular order for case of discussion. However, the operations may in fact occur in a different order, and in some cases various ones of the operations may occur simultaneously. All such embodiments are contemplated.

In addition to the above, deduplication mechanisms may be used in some embodiments. FIG. 5B depicts operations 550 which may generally correspond to deduplication systems and methods. In the example shown, a hash corresponding to a received write request may be generated (block 540) which is used to access deduplication tables (block 542). If there is a hit (block 544) in the deduplication tables (i.e., a copy of the data already exists within the system), then a new entry may be added to the deduplication tables (block 548) to reflect the new write. In such a case, there is no need to write the data itself to storage and the received write data may be discarded. Alternatively, if there is a miss in the deduplication table, then a new entry for the new data is created and stored in the deduplication tables (block 546). Additionally, a write of the data to storage is performed (block 536). Further, a new entry may be created in the index to reflect the new data (block 538). In some embodiments, if a miss occurs during an inline deduplication operation, no insertion in the deduplication tables is performed at that time. Rather, during an inline deduplication operation, a query with a hash value may occur for only a portion of the entire deduplication table (e.g., a cached portion of the deduplication table). If a miss occurs, a new entry may be created and stored in the cache. Subsequently, during a post-processing deduplication operation, such as an operation occurring during garbage collection, a query with a hash value may occur for the entire deduplication table. A miss may indicate the hash value is a unique hash value. Therefore, a new entry such as a hash-to-physical-pointer mapping may be inserted into the deduplication table. Alternatively, if a hit is detected during post-processing deduplication (i.e., a duplicate is detected), deduplication may be performed to eliminate one or more of the detected copies.

Figure 6:
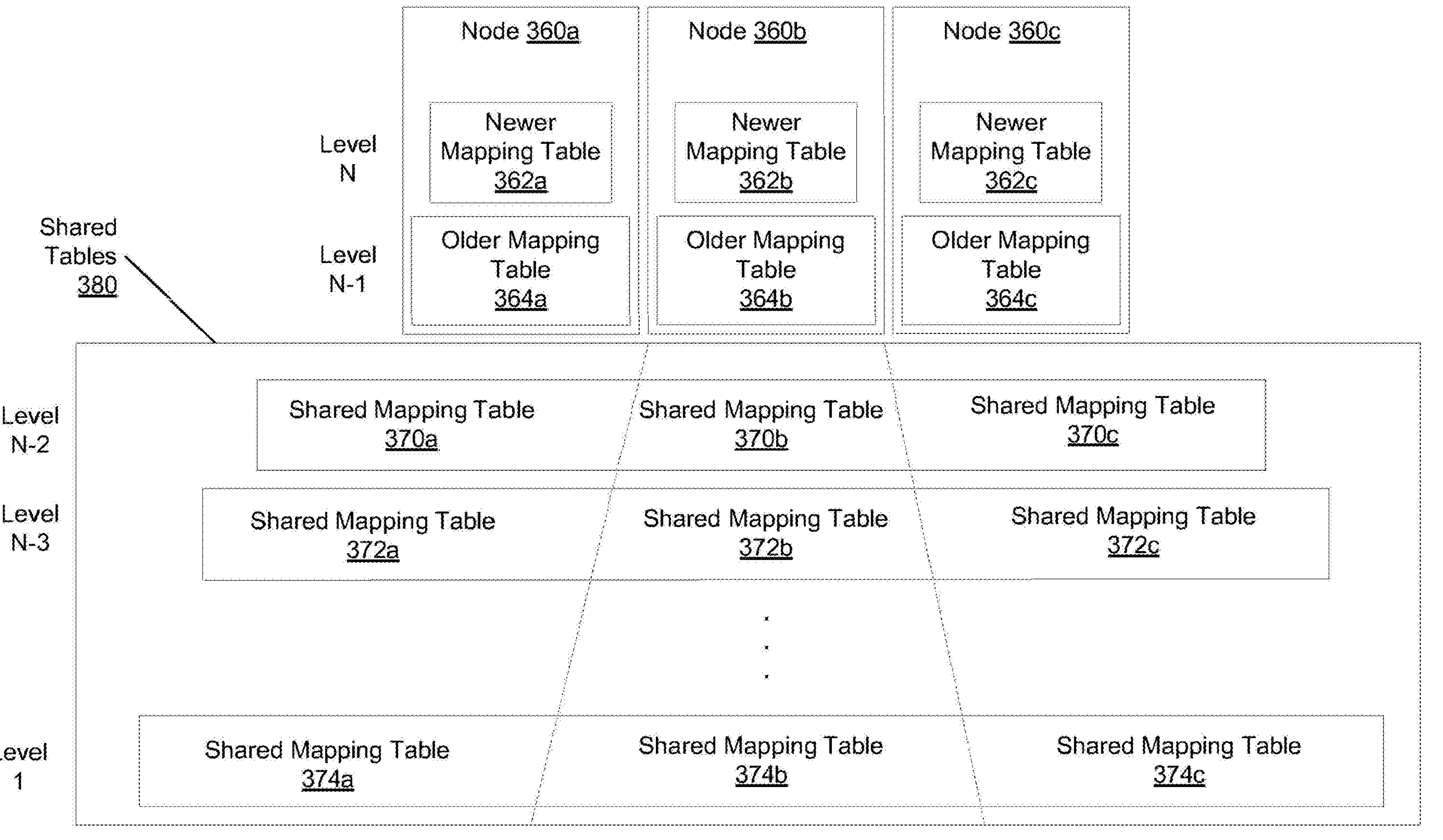
FIG. 6 is a generalized block diagram of one embodiment of a multi-node network with shared mapping tables.

Referring now to FIG. 6, a generalized block diagram of one embodiment of a multi-node network with shared mapping tables is shown. In the example shown, three nodes 360*a*-360*c* are used to form a cluster of mapping nodes. In one embodiment, each of the nodes 360*a*-360*c* may be responsible for one or more logical unit numbers (LUNs). In the depicted embodiment, a number of mapping table levels, level 1-N, are shown. Level 1 may correspond to the oldest level, while level N may correspond to the newest level. For mapping table entries of LUNs managed by a particular node, that particular node may itself have newer entries stored on the node itself. For example, node 360*a* is shown to store mapping subtables 362*a* and 364*a*. These subtables 362*a* and 362*b* may correspond to LUNs for which node 360*a* is generally responsible. Similarly, node 360*b* includes subtables 362*b* and 364*b* which may correspond to LUNs managed by that node, while node 360*c* includes subtables 362*c* and 364*c* which may correspond to LUNs managed by that node. In such an embodiment, these "newer" level mapping table entries are maintained only by their corresponding managing nodes and are generally not found on other nodes.

In contrast to the above discussed relatively newer levels, older levels (i.e., levels N−2 down to level 1) represent mapping table entries which may be shared by all nodes 360*a*-360*c* in the sense that any of the nodes may be storing a copy of those entries. In the example shown, these older levels 370, 372, and 374 are collectively identified as shared tables 380.

Additionally, as previously discussed, in various embodiments these older levels are static-apart from merging or similar operations which are discussed later. Generally speaking, a static layer is one which is not subject to modification (i.e., it is "fixed"). Given that such levels are fixed in this sense, an access to any copy of these lower levels may be made without concern for whether another of the copies has been, or is being, modified. Consequently, any of the nodes may safely store a copy of the shared tables 380 and service a request to those tables with confidence the request can be properly serviced. Having copies of the shared tables 380 stored on multiple nodes 360 may allow use of various load balancing schemes when performing lookups and otherwise servicing requests.

In addition to the above, in various embodiments, the levels 380 which may be shared may be organized in a manner which reflects the nodes 360 themselves. For example, node 360*a* may be responsible for LUNs 1 and 2, node 360*b* may be responsible for LUNs 3 and 4, and node 360*c* may be responsible for LUNs 5 and 6. In various embodiments, the mapping table entries may include tuples which themselves identify a corresponding LUN. In such an embodiment, the shared mapping tables 380 may be sorted according to key value, absolute width or amount of storage space, or otherwise. If a sort of mapping table entries in the levels 380 is based in part on LUN, then entries 370*a* may correspond to LUNs 1 and 2, entries 370*b* may correspond to LUNs 3 and 4, and entries 370*c* may correspond to LUNs 5 and 6. Such an organization may speed lookups by a given node for a request targeted to a particular LUN by effectively reducing the amount of data that needs to be searched, allowing a coordinator to directly select the node responsible for a particular LUN as the target of a request. These and other organization and sort schemes are possible and are contemplated. In addition, if it is desired to move responsibility for a LUN from one node to another, the original node mappings for that node may be flushed to the shared levels (e.g., and merged). Responsibility for the LUN is then transferred to the new node which then begins servicing that LUN.

Figure 7:
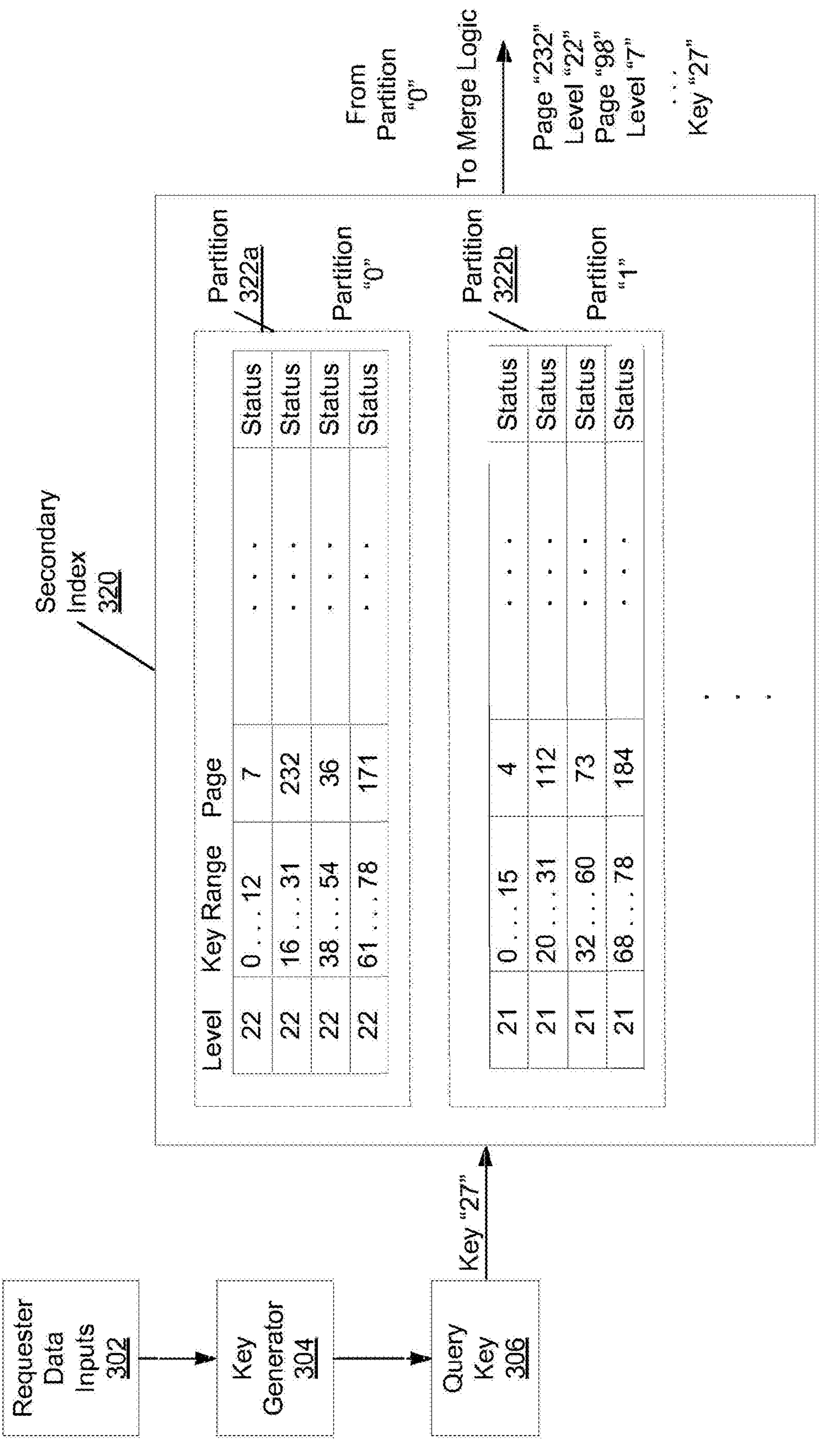
FIG. 7 is a generalized block diagram of one embodiment of a secondary index used to access a mapping table.

Referring now to FIG. 7, a generalized block diagram of one embodiment of a secondary index used to access a mapping table is shown. As described earlier, requester data inputs 302 may be received by a key generator 304, which produces a query key value 306. The query key value 306 is used to access a mapping table. In some embodiments, the primary index 310 shown in FIG. 3 may be too large (or larger than desired) to store in RAM 172 or memory medium 130. For example, older levels of the index may grow very large due to merging and flattening operations described later in FIG. 10 and FIG. 11. Therefore, a secondary index 320 may be cached for at least a portion of the primary index instead of the corresponding portion of the primary index 310. The secondary index 320 may provide a coarser level of granularity of location identification of data stored in the storage devices 176*a*-176*m*. Therefore, the secondary index 320 may be smaller than the portion of the primary index 310 to which it corresponds. Accordingly, the secondary index 320 may be stored in RAM 172 or in memory medium 130.

In one embodiment, the secondary index 320 is divided into partitions, such as partitions 322*a*-322*b*. Additionally, the secondary index may be organized according to level with the more recent levels appearing first. In one embodiment, older levels have lower numbers and younger levels have higher numbers (e.g., a level ID may be incremented with each new level). Each entry of the secondary index 320 may identify a range of key values. For example, the first entry shown in the example may identify a range of key values from 0 to 12 in level 22. These key values may correspond to key values associated with a first record and a last record within a given page of the primary index 310. In other words, the entry in the secondary index may simply store an identification of key 0 and an identification of key 12 to indicate the corresponding page includes entries within that range. Referring again to FIG. 3A, partition 312*a* may be a page and the key values of its first record and its last record are 0 and 12, respectively. Therefore, an entry within the secondary index 320 stores the range 0 to 12 as shown in FIG. 7. Since remappings are maintained in the levels within the mapping table, a range of key values may correspond to multiple pages and associated levels. The fields within the secondary index 320 may store this information as shown in FIG. 7. Each entry may store one or more corresponding unique virtual page identifiers (IDs) and associated level IDs corresponding to the range of key values. Each entry may also store corresponding status information such as validity information. The list of maintained page IDs and associated level IDs may indicate where a given query key value might be stored, but not confirm that the key value is present in that page and level. The secondary index 320 is smaller than the primary index 310, but also has a coarse-level of granularity of location identification of data stored in the storage devices 176*a*-176*m*. The secondary index 320 may be sufficiently small to store in RAM 172 or in memory medium 130.

When the secondary index 320 is accessed with a query key value 306, it may convey one or more corresponding page IDs and associated level IDs. These results are then used to access and retrieve portions of the stored primary index. The one or more identified pages may then be searched with the query key value to find a physical pointer value. In one embodiment, the level IDs may be used to determine a youngest level of the identified one or more levels that also store the query key value 306. A record within a corresponding page may then be retrieved and a physical pointer value may be read for processing a storage access request. In the illustrated example, the query key value 27 is within the range of keys 16 to 31. The page IDs and level IDs stored in the corresponding entry are conveyed with the query key value to the mapping table.

Figure 8:
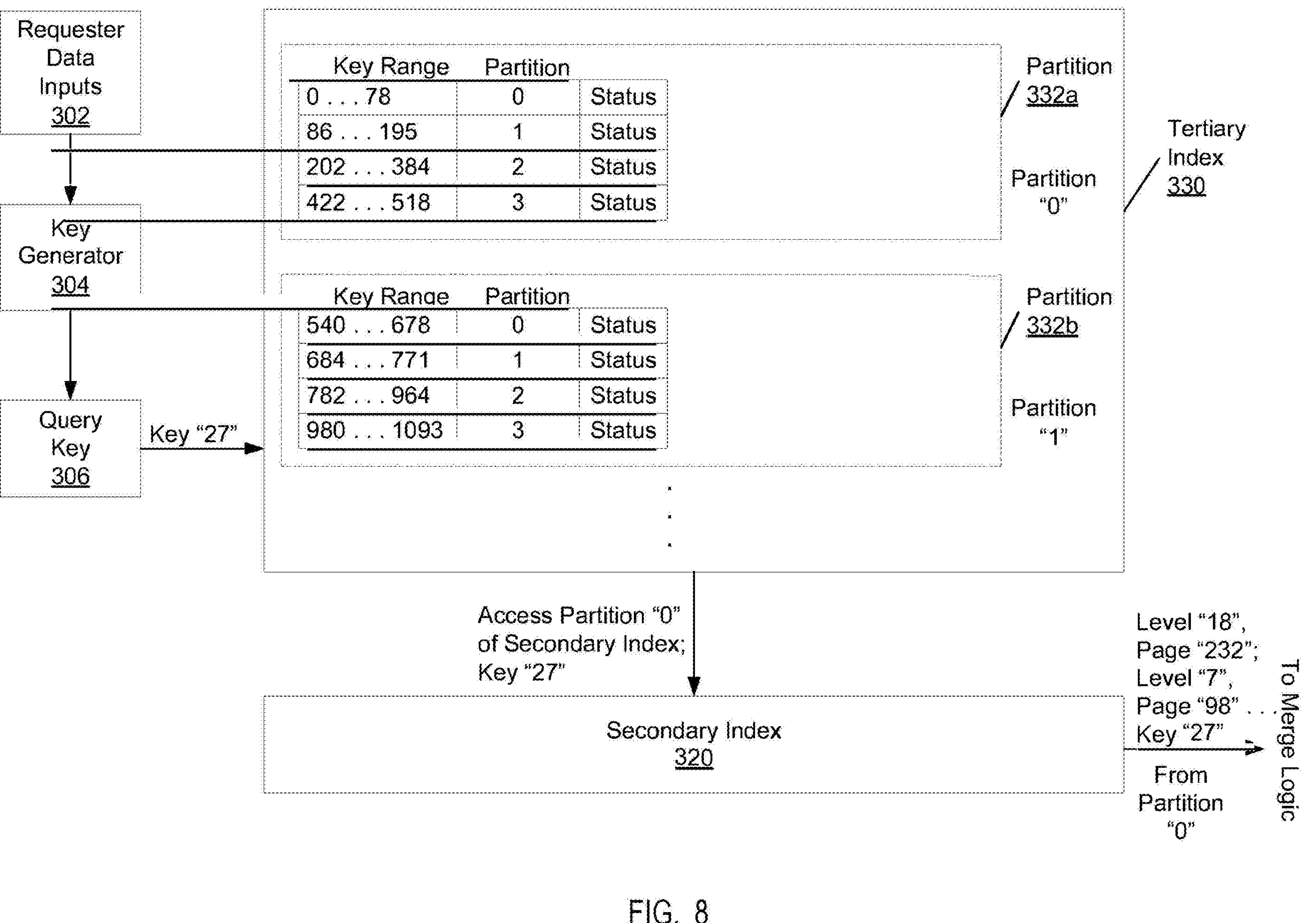
FIG. 8 is a generalized block diagram of one embodiment of a tertiary index accessing a mapping table.

Referring now to FIG. 8, a generalized block diagram of one embodiment of a tertiary index used to access a mapping table is shown. Circuit and logic portions corresponding to those of FIG. 4 are numbered identically. As described earlier, the primary index 310 shown in FIG. 3 may be too large to store in RAM 172 or memory medium 130. In addition, as the mapping table 340 grows, the secondary index 320 may also become too large to store in these memories. Therefore, a tertiary index 330 may be accessed prior to the secondary index 320, which may still be faster than accessing the primary index 310.

The tertiary index 330 may provide a coarser level of granularity than the secondary index 320 of location identification of data stored in the storage devices 176*a*-176*m*. Therefore, the tertiary index 330 may be smaller than the portion of the secondary index 320 to which it corresponds. It is noted that each of the primary index 310, the secondary index 320, the tertiary index 330, and so forth, may be stored in a compressed format. The compressed format chosen may be a same compressed format used to store information within the mapping table 340.

In one embodiment, the tertiary index 330 may include multiple partitions, such as partitions 332*a*, 332*b* and so forth. The tertiary index 330 may be accessed with a query key value 306. In the illustrated example, a query key value 306 of "27" is found to be between a range of key values from 0 to 78. A first entry in the tertiary index 330 corresponds to this key value range. A column in the tertiary index 330 may indicate which partition to access within the secondary index 320. In the illustrated example, a key value range of 0 to 78 corresponds to partition 0 within the secondary index 320.

It is also noted that a filter (not shown) may be accessed to determine if a query key value is not within any one of the indexes 310-330. This filter may be a probabilistic data structure that determines whether an element is a member of a set. False positives may be possible, but false negatives may not be possible. One example of such a filter is a Bloom filter. If an access of such a filter determines a particular value is not in the full index 142, then no query is sent to the storage. If an access of the filter determines the query key value is in a corresponding index, then it may be unknown whether a corresponding physical pointer value is stored in the storage devices 176*a*-176*m*.

In addition to the above, in various embodiments one or more overlay tables may be used to modify or elide tuples provided by the mapping table in response to a query. Such overlay tables may be used to apply filtering conditions for use in responding to accesses to the mapping table or during flattening operations when a new level is created. In various embodiments, other hardware and/or software may be used to apply filtering conditions. In some embodiments, the overlay table may be organized as time ordered levels in a manner similar to the mapping table described above. In other embodiments, they can be organized differently. Keys for the overlay table need not match the keys for the underlying mapping table. For example, an overlay table may contain a single entry stating that a particular volume has been deleted or is otherwise inaccessible (e.g., there is no natural access path to query this tuple), and that a response to a query corresponding to a tuple that refers to that volume identifier is instead invalid. In another example, an entry in the overlay table may indicate that a storage location has been freed, and that any tuple that refers to that storage location is invalid, thus invalidating the result of the lookup rather than the key used by the mapping table. In some embodiments, the overlay table may modify fields in response to queries to the underlying mapping table. In some embodiments, a key range (range of key values) may be used to efficiently identify multiple values to which the same operation (eliding or modification) is applied. In this manner, tuples may (effectively) be "deleted" from the mapping table by creating an "elide" entry in the overlay table and without modifying the mapping table. In this case, the overlay table may include keys with no associated non-key data fields.

Figure 9:
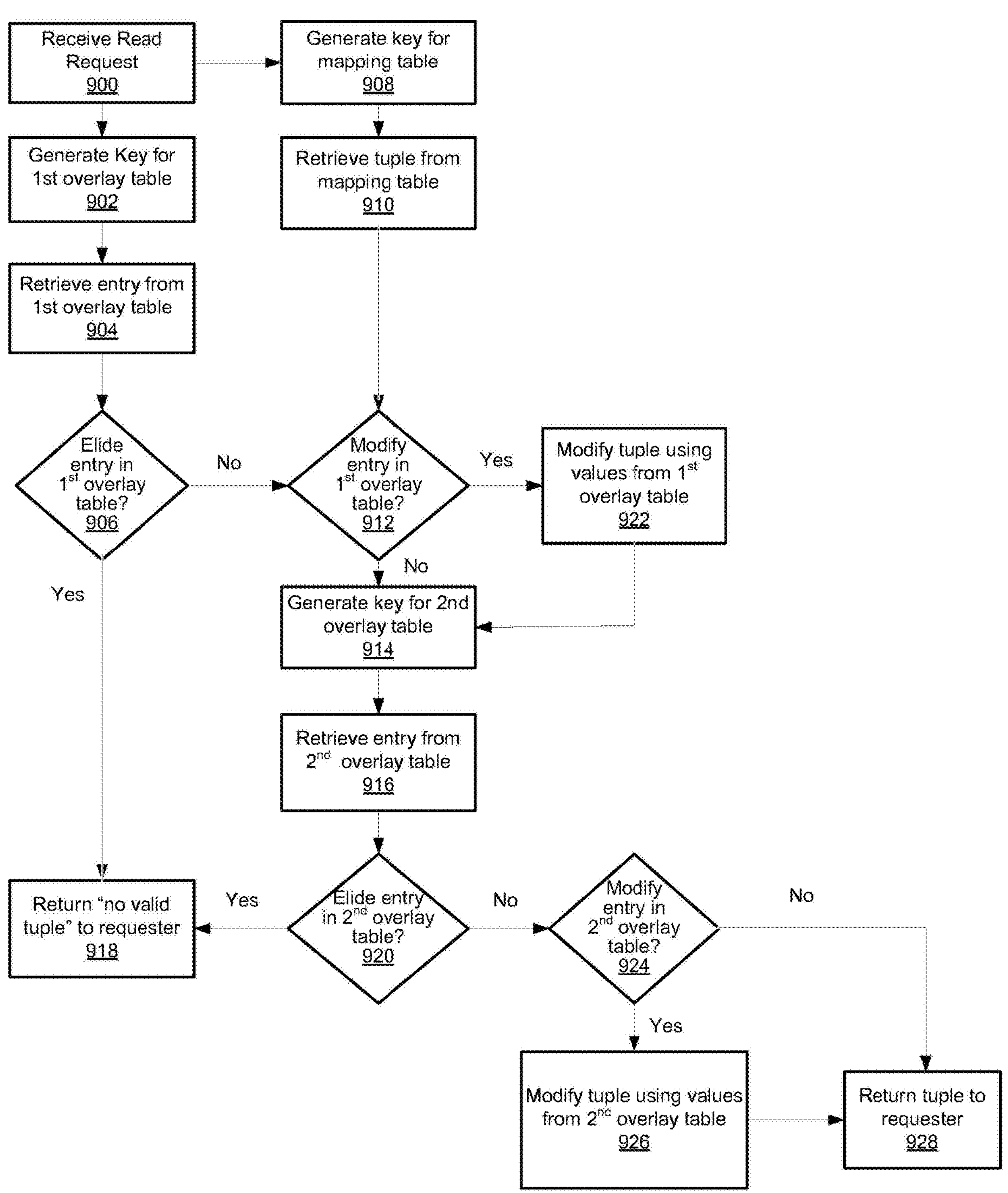
FIG. 9 illustrates one embodiment of a method that utilizes overlay tables.

Turning now to FIG. 9, one embodiment of a method for processing a read request in a system including mapping and overlay tables is shown. Responsive to a read request being received (block 900), a mapping table key (block 908) and first overlay table key (block 902) corresponding to the request are generated. In this example, access to the overlay and mapping tables is shown as occurring concurrently. However, in other embodiments, accesses to the tables may be performed non-concurrently (e.g., sequentially or otherwise separate in time) in any desired order. Using the key generated for the mapping table, a corresponding tuple may be retrieved from the mapping table (block 910). If the first overlay table contains an "elide" entry corresponding to the overlay table key (conditional block 906), any tuple found in the mapping table is deemed invalid and an indication to this effect may be returned to the requester. On the other hand, if the overlay table contains a "modify" entry corresponding to the overlay table key (conditional block 912), the values in the first overlay table entry may be used to modify one or more fields in the tuple retrieved from the mapping table (block 922). Once this process is done, a second overlay table key is generated (block 914) based on the tuple from the mapping table (whether modified or not) and a second lookup is done in a second overlay table (block 916) which may or may not be the same table as the first overlay table. If an "elide" entry is found in the second overlay table (conditional block 920), the tuple from the mapping table is deemed invalid (block 918). If a "modify" entry is found in the second overlay table (conditional block 924), one or more fields of the tuple from the mapping table may be modified (block 926). Such modification may include dropping a tuple, normalizing a tuple, or otherwise. The modified tuple may then be returned to the requester. If the second overlay table does not contain a modify entry (conditional block 924), the tuple may be returned to the requester unmodified. In some embodiments, at least some portions of the overlay table(s) may be cached to provide faster access to their contents. In various embodiments, a detected elide entry in the first overlay table may serve to short circuit any other corresponding lookups (e.g., blocks 914, 916, etc.). In other embodiments, accesses may be performed in parallel and "raced." Numerous such embodiments are possible and are contemplated.

Figure 10:
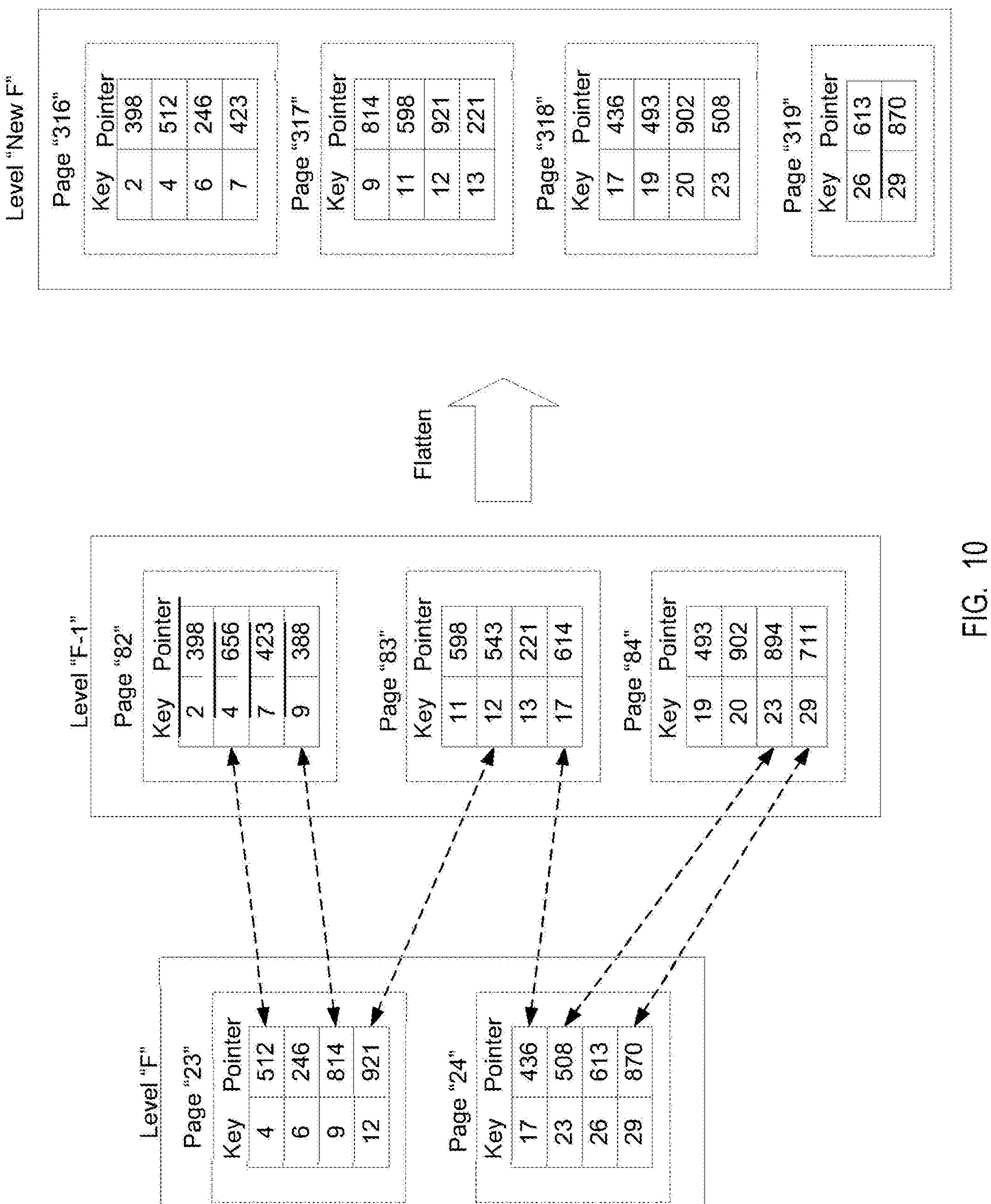
FIG. 10 is a generalized block diagram of one embodiment of a flattening operation for levels within a mapping table.

Turning now to FIG. 10, a generalized block diagram of one embodiment of a flattening operation for levels within a mapping table is shown. In various embodiments, a flattening operation may be performed in response to detecting one or more conditions. For example, over time as the mapping table 340 grows and accumulates levels due to insertions of new records, the cost of searching more levels for a query key value may become undesirably high. In order to constrain the number of levels to search, multiple levels may be flattened into a single new level. For example, two or more levels which are logically adjacent or contiguous in time order may be chosen for a flattening operation. Where two or more records correspond to a same key value, the youngest record may be retained while the others are not included in the new "flattened" level. In such an embodiment, the newly flattened level will return a same result for a search for a given key value as would be provided by a search of the corresponding multiple levels. Since the results of searches in the new flattened level do not change as compared to the two or more levels it replaces, the flattening operation need not be synchronized with update operations to the mapping table. In other words, flattening operations on a table may be performed asynchronously with respect to updates to the table.

As previously noted, older levels are fixed in the sense that their mappings are not modified (i.e., a mapping from A to B remains unchanged). Consequently, modifications to the levels being flattened are not being made (e.g., due to user writes) and synchronization locks of the levels are not required. Additionally, in a node-based cluster environment where each node may store a copy of older levels of the index (e.g., as discussed in relation to FIG. 6), flattening operations may be undertaken on one node without the need to lock corresponding levels in other nodes. Consequently, processing may continue in all nodes while flattening takes place in an asynchronous manner on any of the nodes. At a later point in time, other nodes may flatten levels, or use an already flattened level. In one embodiment, the two or more levels which have been used to form a flattened level may be retained for error recovery, mirroring, or other purposes. In addition to the above, in various embodiments, records that have been elided may not be reinserted in to the new level. The above described flattening may, for example, be performed responsive to detecting the number of levels in the mapping table has reached a given threshold. Alternatively, the flattening may be performed responsive to detecting the size of one or more levels has exceeded a threshold. Yet another condition that may be considered is the load on the system. The decision of whether to flatten the levels may consider combinations of these conditions in addition to considering them individually. The decision of whether to flatten may also consider both the present value for the condition as well as a predicted value for the condition in the future. Other conditions for which flattening may be performed are possible and are contemplated.

In the illustrated example, the records are shown simply as key and pointer pairs. The pages are shown to include four records for ease of illustration. A level "F" and its next contiguous logical neighbor, level "F−1" may be considered for a flattening operation. Level "F" may be younger than Level "F−1". Although two levels are shown to be flattened here, it is possible and contemplated that three or more levels may be chosen for flattening. In the example shown, Level "F−1" may have records storing a same key value found in Level "F". Bidirectional arrows are used to identify the records storing a same key value across the two contiguous levels.

The new Level "New F" includes a key corresponding to the duplicate key values found in Level "F" and Level "F−1". In addition, the new Level "New F" includes a pointer value corresponding to the youngest (or younger in this case) record of the records storing the duplicate key value. For example, each of Level "F" and Level "F−1" includes a record storing the key value 4. The younger record is in Level "F" and this record also stores the pointer value 512. Accordingly, the Level "F−1" includes a record storing the key value 4 and also the pointer value 512, rather than the pointer value 656 found in the older Level "F−1". Additionally, the new Level "New F" includes records with unique key values found between Level "F" and Level "F−1". For example, the Level "F−1" includes records with the key and pointer pair of 6 and 246 found in Level "F" and the key and pointer pair of 2 and 398 found in Level "F−1". As shown, each of the pages within the levels is sorted by key value.

As noted above, in various embodiments an overlay table may be used to modify or elide tuples corresponding to key values in the underlying mapping table. Such an overlay table(s) may be managed in a manner similar to that of the mapping tables. For example, an overlay table may be flattened and adjacent entries merged together to save space. Alternatively, an overlay table may be managed in a manner different from that used to manage mapping tables. In some embodiments, an overlay table may contain a single entry that refers to a range of overlay table keys. In this way, the size of the overlay table can be limited. For example, if the mapping table contains k valid entries, the overlay table (after flattening) need contain no more than k+1 entries marking ranges as invalid, corresponding to the gaps between valid entries in the mapping table. Accordingly, the overlay table may be used to identify tuples that may be dropped from the mapping table in a relatively efficient manner. In addition to the above, while the previous discussion describes using overlay table to elide or modify responses to requests from the mapping table(s), overlay tables may also be used to elide or modify values during flattening operations of the mapping tables. Accordingly, when a new level is created during a flattening operation of a mapping table, a key value that might otherwise be inserted into the new level may be elided. Alternatively, a value may be modified before insertion in the new level. Such modifications may result in a single record corresponding to a given range of key values in the mapping table being replaced (in the new level) with multiple records—each corresponding to a subrange of the original record. Additionally, a record may be replaced with a new record that corresponds to a smaller range, or multiple records could be replaced by a single record whose range covers all ranges of the original records. All such embodiments are contemplated.

Figure 11:
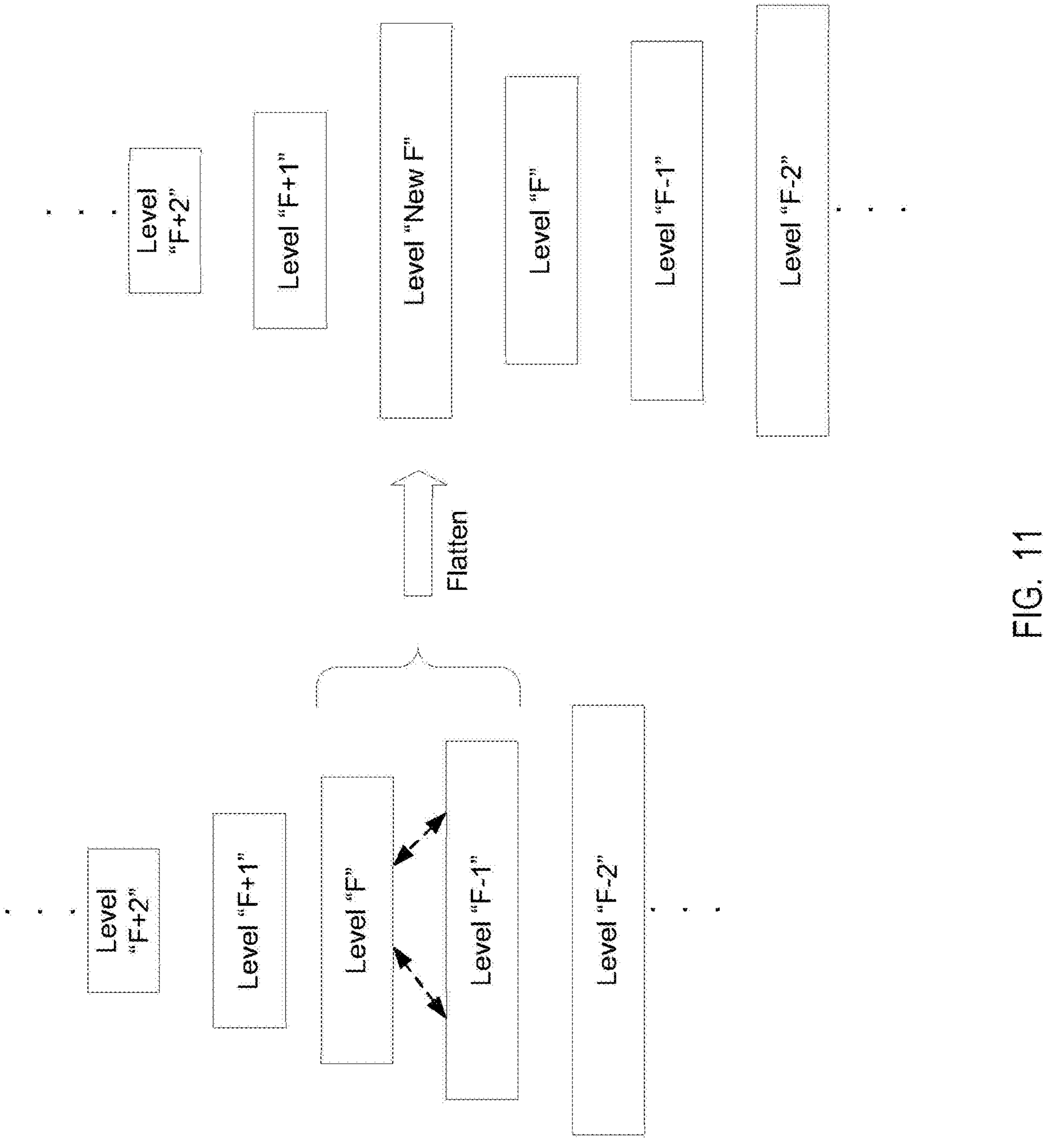
FIG. 11 is a generalized block diagram of another embodiment of a flattening operation for levels within a mapping table.

Referring now to FIG. 11, a generalized block diagram of an embodiment of a flattening operation for levels within a mapping table is shown. As previously discussed, levels may be time ordered. In the illustrated example, a Level "F" comprising one or more indexes and corresponding mappings is logically located above older Level "F−1". Also, Level "F" is located logically below younger Level "F+1". Similarly, Level "F−2" is logically located above younger Level "F−1" and Level "F+2" is logically located below older Level "F+1". In one example, levels "F" and "F−1" may be considered for a flattening operation. Bidirectional arrows are used to illustrate that there are records storing same key values across the two contiguous levels.

As described earlier, a new Level "New F" includes key values corresponding to the duplicate key values found in Level "F" and Level "F−1". In addition, the new Level "New F" includes a pointer value corresponding to the youngest (or younger in this case) record of the records storing the duplicate key value. Upon completion of the flattening operation, the Level "F" and the Level "F−1" may not yet be removed from the mapping table. Again, in a node-based cluster, each node may verify it is ready to utilize the new single level, such as Level "New F", and no longer use the two or more levels it replaces (such as Level "F" and Level "F−1"). This verification may be performed prior to the new level becoming the replacement. In one embodiment, the two or more replaced levels, such as Level "F" and Level "F−1", may be kept in storage for error recovery, mirroring, or other purposes. In order to maintain the time ordering of the levels and their mappings, the new flattened level F is logically placed below younger levels (e.g., level F+1) and above the original levels that it replaces (e.g., level F and level F−1).

Figure 12:
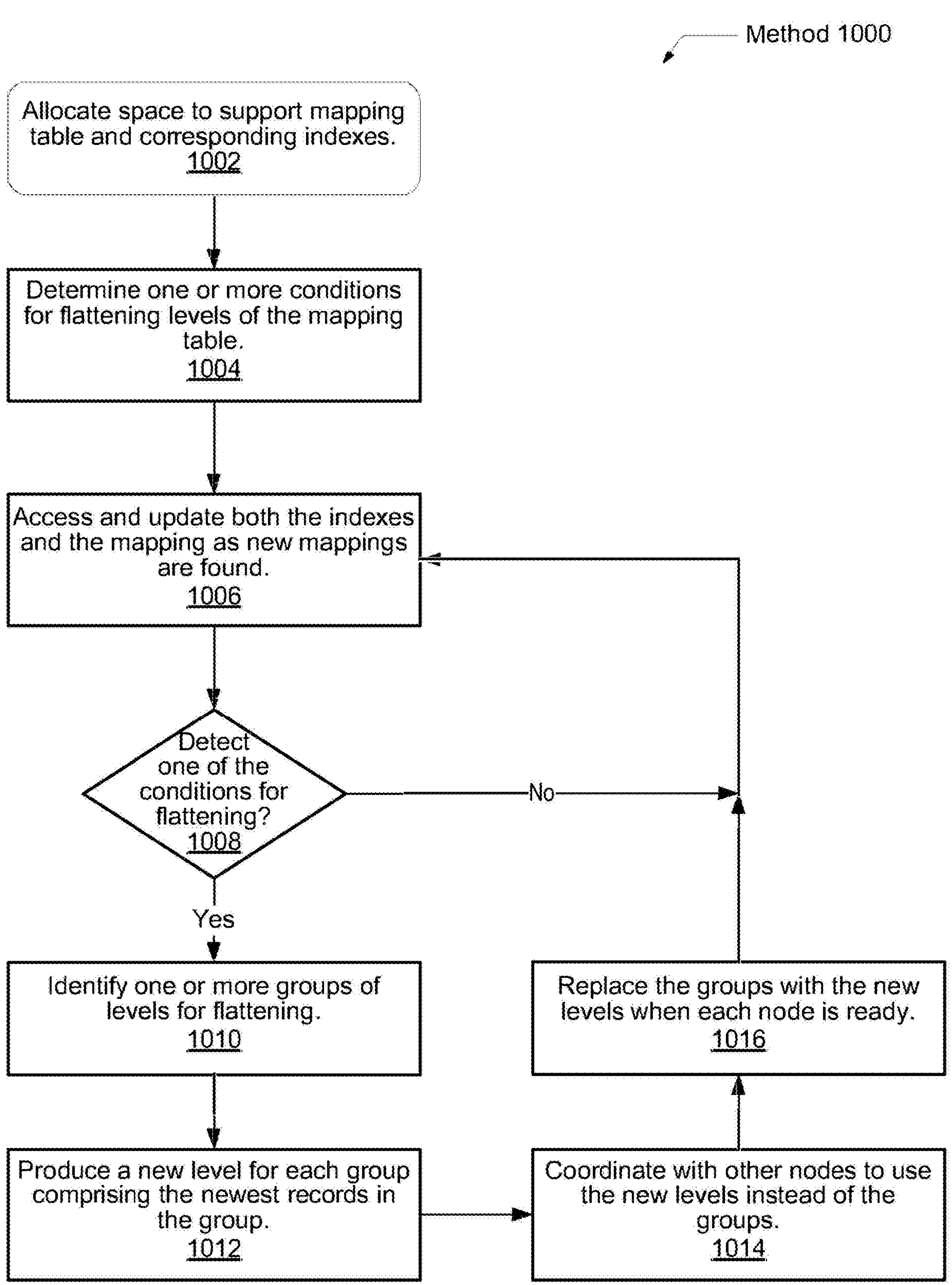
FIG. 12 is a generalized flow diagram illustrating one embodiment of a method for flattening levels within a mapping table.

Turning now to FIG. 12, one embodiment of a method 1000 for flattening levels within a mapping table is shown. The components embodied in the network architecture 100 and the mapping table 340 described above may generally operate in accordance with method 1000. For purposes of discussion, the steps in this embodiment are shown in sequential order. However, some steps may occur in a different order than shown, some steps may be performed concurrently, some steps may be combined with other steps, and some steps may be absent in another embodiment.

In block 1002, storage space is allocated for a mapping table and corresponding indexes. In block 1004, one or more conditions are determined for flattening two or more levels within the mapping table. For example, a cost of searching a current number of levels within the mapping table may be greater than a cost of performing a flattening operation. Additionally, a cost may be based on at least one of the current (or predicted) number of levels in the structure to be flattened, the number of entries in one or more levels, the number of mapping entries that would be elided or modified, and the load on the system. Cost may also include a time to perform a corresponding operation, an occupation of one or more buses, storage space used during a corresponding operation, a number of duplicate entries in a set of levels has reached some threshold, and so forth. In addition, a count of a number of records within each level may be used to estimate when a flattening operation performed on two contiguous levels may produce a new single level with a number of records equal to twice a number of records within a next previous level. These conditions taken singly or in any combination, and others, are possible and are contemplated.

In block 1006, the indexes and the mapping table are accessed and updated as data is stored and new mappings are found. A number of levels within the mapping table increases as new records are inserted into the mapping table. If a condition for flattening two or more levels within the mapping table is detected (conditional block 1008), then in block 1010, one or more groups of levels are identified for flattening. A group of levels may include two or more levels. In one embodiment, the two or more levels are contiguous levels. Although the lowest levels, or the oldest levels, may be the best candidates for flattening, a younger group may also be selected.

In block 1012, for each group a new single level comprising the newest records within a corresponding group is produced. In the earlier example, the new single Level "New F" includes the youngest records among the Level "F" and the Level "F+1". In block 1014, in a node-based cluster, an acknowledgment may be requested from each node within the cluster to indicate a respective node is ready to utilize the new levels produced by the flattening operation. When each node acknowledges that it can utilize the new levels, in block 1016, the current levels within the identified groups are replaced with the new levels. In other embodiments, synchronization across nodes is not needed. In such embodiments, some nodes may begin using a new level prior to other nodes. Further, some nodes may continue to use the original level even after newly flattened levels are available. For example, a particular node may have original level data cached and used in preference to using non-cached data of a newly flattened level. Numerous such embodiments are possible and are contemplated.

Figure 13:
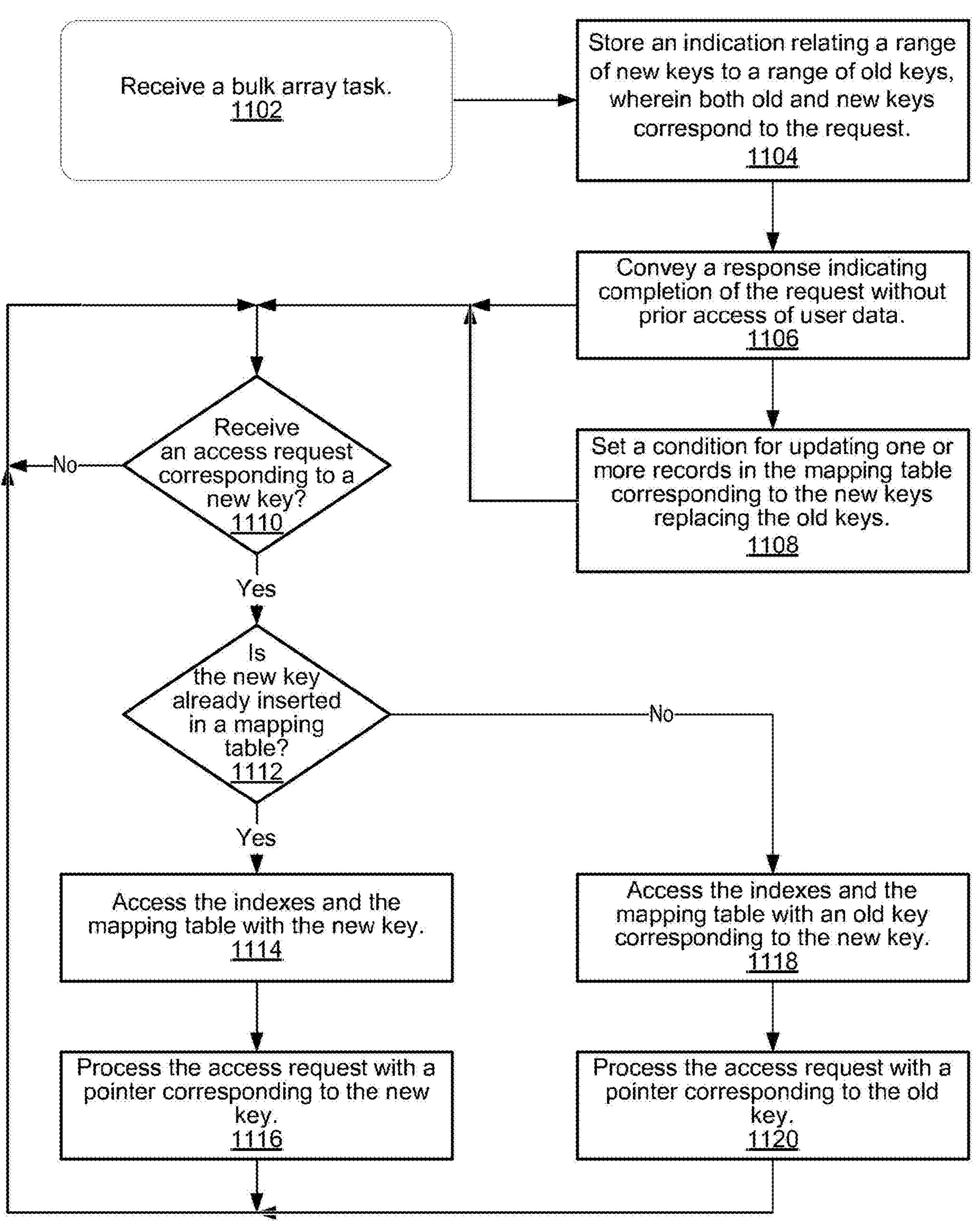
FIG. 13 is a generalized flow diagram illustrating one embodiment of a method for efficiently processing bulk array tasks within a mapping table.

Turning now to FIG. 13, one embodiment of a method 1100 for efficiently processing bulk array tasks within a mapping table is shown. Similar to the other described methods, the components embodied in the network architecture 100 and the mapping table 340 described above may generally operate in accordance with method 1100. In addition, the steps in this embodiment are shown in sequential order. However, some steps may occur in a different order than shown, some steps may be performed concurrently, some steps may be combined with other steps, and some steps may be absent in another embodiment.

Storing the information in a compressed format within the mapping table may enable fine-grained mapping, which may allow direct manipulation of mapping information within the mapping table as an alternative to common bulk array tasks. The direct map manipulation may reduce I/O network and bus traffic. As described earlier, Flash memory has a low "seek time", which allows a number of dependent read operations to occur in less time than a single operation from a spinning disk. These dependent reads may be used to perform online fine-grained mappings to integrate space-saving features like compression and deduplication. In addition, these dependent read operations may allow the storage controller 174 to perform bulk array tasks entirely within a mapping table instead of accessing (reading and writing) the user data stored within the storage devices 176*a*-176*m*.

In block 1102, a large or bulk array task is received. For example, a bulk copy or move request may correspond to a backup of a dozens or hundreds of virtual machines in addition to enterprise application data being executed and updated by the virtual machines. The amount of data associated with the received request associated with a move, branch, clone, or copy of all of this data may be as large as 16 gigabytes (GB) or larger. If the user data was accessed to process this request, a lot of processing time may be spent on the request and system performance decreases. In addition, a virtualized environment typically has less total input/output (I/O) resources than a physical environment.

In block 1104, the storage controller 174 may store an indication corresponding to the received request that relates a range of new keys to a range of old keys, wherein both the ranges of keys correspond to the received request. For example, if the received request is to copy of 16 GB of data, a start key value and an end key value corresponding to the 16 GB of data may be stored. Again, each of the start and the end key values may include a volume ID, a logical or virtual address within the received request, a snapshot ID, a sector number and so forth. In one embodiment, this information may be stored separate from the information stored in the indexes, such as the primary index 310, the secondary index 320, the tertiary index 330, and so forth. However, this information may be accessed when the indexes are accessed during the processing of later requests.

In block 1106, the data storage controller 174 may convey a response to a corresponding client of the client computer systems 110a-110c indicating completion of the received request without prior access of user data. Therefore, the storage controller 174 may process the received request with low or no downtime and with no load on processor 122.

In block 1108, the storage controller 174 may set a condition, an indication, or a flag, or buffer update operations, for updating one or more records in the mapping table corresponding to the new keys replacing the old keys in the mapping table. For both a move request and a copy request, one or more new records corresponding to the new keys may be inserted in the mapping table. The keys may be inserted in a created new highest level as described earlier. For a move request, one or more old records may be removed from the mapping table after a corresponding new record has been inserted in the mapping table. Either immediately or at a later time, the records in the mapping table are actually updated.

For a zeroing or an erase request, an indication may be stored that a range of key values now corresponds to a series of binary zeroes. Additionally, as discussed above, overlay tables may be used to identify key values which are not (or no longer) valid. The user data may not be overwritten. For an erase request, the user data may be overwritten at a later time when the "freed" storage locations are allocated with new data for subsequent store (write) requests. For an externally-directed defragmentation request, contiguous addresses may be chosen for sector reorganization, which may benefit applications executed on a client of the client computer systems 110a-110c.

If the storage controller 174 receives a data storage access request corresponding to one of the new keys (conditional block 1110), and the new key has already been inserted in the mapping table (conditional block 1112), then in block 1114, the indexes and the mapping table may be accessed with the new key. For example, either the primary index 310, the secondary index 320, or the tertiary index 330 may be accessed with the new key. When one or more pages of the mapping table are identified by the indexes, these identified pages may then be accessed. In block 1116, the storage access request may be serviced with a physical pointer value found in the mapping table that is associated with the new key.

If the storage controller 174 receives a data storage access request corresponding to one of the new keys (conditional block 1110), and the new key has not already been inserted in the mapping table (conditional block 1112), then in block 1118, the indexes and the mapping table may be accessed with a corresponding old key. The storage holding the range of old keys and the range of new keys may be accessed to determine the corresponding old key value. When one or more pages of the mapping table are identified by the indexes, these identified pages may then be accessed. In block 1120, the storage access request may be serviced with a physical pointer value found in the mapping table that is associated with the old key.

Figure 14:
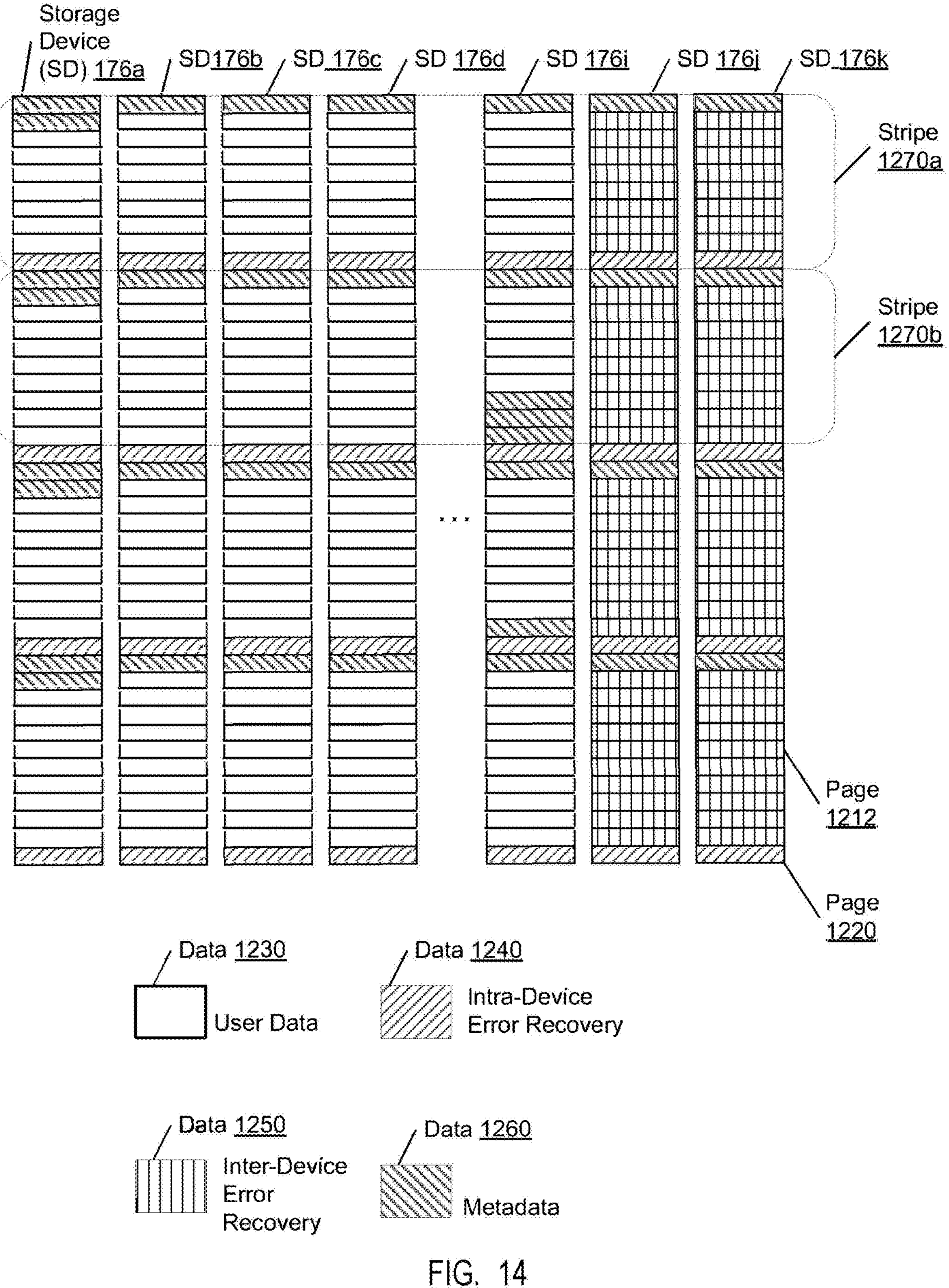
FIG. 14 is a generalized block diagram illustrating an embodiment of a data layout architecture within a storage device.

Turning now to FIG. 14, a generalized block diagram illustrating an embodiment of a data layout architecture within a storage device is shown. In one embodiment, the data storage locations within the storage devices 176a-176m may be arranged into redundant array of independent devices (RAID) arrays. As shown, different types of data may be stored in the storage devices 176a-176k according to a data layout architecture. In one embodiment, each of the storage devices 176a-176k is an SSD. An allocation unit within an SSD may include one or more erase blocks within an SSD.

The user data 1230 may be stored within one or more pages included within one or more of the storage devices 176a-176k. Within each intersection of a RAID stripe and one of the storage devices 176a-176k, the stored information may be formatted as a series of logical pages. Each logical page may in turn include a header and a checksum for the data in the page. When a read is issued it may be for one or more logical pages and the data in each page may be validated with the checksum. As each logical page may include a page header that contains a checksum for the page (which may be referred to as a "media" checksum), the actual page size for data may be smaller than one logical page. In some embodiments, for pages storing inter-device recovery data 1250, such as RAID parity information, the page header may be smaller, so that the parity page protects the page checksums in the data pages. In other embodiments, the checksum in parity pages storing inter-device recovery data 1250 may be calculated so that the checksum of the data page checksums is the same as the checksum of the parity page covering the corresponding data pages. In such embodiments, the header for a parity page need not be smaller than the header for a data page.

The inter-device ECC data 1250 may be parity information generated from one or more pages on other storage devices holding user data. For example, the inter-device ECC data 1250 may be parity information used in a RAID data layout architecture. Although the stored information is shown as contiguous logical pages in the storage devices 176a-176k, it is well known in the art the logical pages may be arranged in a random order, wherein each of the storage devices 176a-176k is an SSD.

The intra-device ECC data 1240 may include information used by an intra-device redundancy scheme. An intra-device redundancy scheme utilizes ECC information, such as parity information, within a given storage device. This intra-device redundancy scheme and its ECC information corresponds to a given device and may be maintained within a given device, but is distinct from ECC that may be internally generated and maintained by the device itself. Generally speaking, the internally generated and maintained ECC of the device is invisible to the system within which the device is included.

The intra-device ECC data 1240 may also be referred to as intra-device error recovery data 1240. The intra-device error recovery data 1240 may be used to protect a given storage device from latent sector errors (LSEs). An LSE is an error that is undetected until the given sector is accessed. Therefore, any data previously stored in the given sector may be lost. A single LSE may lead to data loss when encountered during RAID reconstruction after a storage device failure. The term "sector" typically refers to a basic unit of storage on a HDD, such as a segment within a given track on the disk. Here, the term "sector" may also refer to a basic unit of allocation on a SSD. Latent sector errors (LSEs) occur when a given sector or other storage unit within a storage device is inaccessible. A read or write operation may not be able to complete for the given sector. In addition, there may be an uncorrectable error-correction code (ECC) error.

The intra-device error recovery data 1240 included within a given storage device may be used to increase data storage reliability within the given storage device. The intra-device error recovery data 1240 is in addition to other ECC information that may be included within another storage device, such as parity information utilized in a RAID data layout architecture.

Within each storage device, the intra-device error recovery data 1240 may be stored in one or more pages. As is well known by those skilled in the art, the intra-device error recovery data 1240 may be obtained by performing a function on chosen bits of information within the user data 1230. An XOR-based operation may be used to derive parity information to store in the intra-device error recovery data 1240. Other examples of intra-device redundancy schemes include single parity check (SPC), maximum distance separable (MDS) erasure codes, interleaved parity check codes (IPC), hybrid SPC and MDS code (MDS+SPC), and column diagonal parity (CDP). The schemes vary in terms of delivered reliability and overhead depending on the manner the data 1240 is computed.

In addition to the above described error recovery information, the system may be configured to calculate a checksum value for a region on the device. For example, a checksum may be calculated when information is written to the device. This checksum is stored by the system. When the information is read back from the device, the system may calculate the checksum again and compare it to the value that was stored originally. If the two checksums differ, the information was not read properly, and the system may use other schemes to recover the data. Examples of checksum functions include cyclical redundancy check (CRC), MD5, and SHA-1.

An erase block within an SSD may comprise several pages. A page may include 4 KB of data storage space. An erase block may include 64 pages, or 256 KB. In other embodiments, an erase block may be as large as 1 megabyte (MB), and include 256 pages. An allocation unit size may be chosen in a manner to provide both sufficiently large sized units and a relatively low number of units to reduce overhead tracking of the allocation units. In one embodiment, one or more state tables may maintain a state of an allocation unit (allocated, free, erased, error), a wear level, and a count of a number of errors (correctable and/or uncorrectable) that have occurred within the allocation unit. In one embodiment, an allocation unit is relatively small compared to the total storage capacity of an SSD. Other amounts of data storage space for pages, erase blocks and other unit arrangements are possible and contemplated.

The metadata 1260 may include page header information, RAID stripe identification information, log data for one or more RAID stripes, and so forth. In various embodiments, the single metadata page at the beginning of each stripe may be rebuilt from the other stripe headers. Alternatively, this page could be at a different offset in the parity shard so the data can be protected by the inter-device parity. In one embodiment, the metadata 1260 may store or be associated with particular flag values that indicate this data is not to be deduplicated.

In addition to inter-device parity protection and intra-device parity protection, each of the pages in storage devices 176*a*-176*k* may comprise additional protection such as a checksum stored within each given page. The checksum (8 byte, 4 byte, or otherwise) may be placed inside a page after a header and before the corresponding data, which may be compressed. For yet another level of protection, data location information may be included in a checksum value. The data in each of the pages may include this information. This information may include both a virtual address and a physical address. Sector numbers, data chunk and offset numbers, track numbers, plane numbers, and so forth may be included in this information as well. This mapping information may also be used to rebuild the address translation mapping table if the content of the table is lost.

In one embodiment, each of the pages in the storage devices 176*a*-176*k* stores a particular type of data, such as the data types 1230-1260. Alternatively, pages may store more than one type of data. The page header may store information identifying the data type for a corresponding page. In one embodiment, an intra-device redundancy scheme divides a device into groups of locations for storage of user data. For example, a division may be a group of locations within a device that correspond to a stripe within a RAID layout. In the example shown, only two stripes, 1270*a* and 1270*b*, are shown for case of illustration.

In one embodiment, a RAID engine within the storage controller 174 may determine a level of protection to use for storage devices 176*a*-176*k*. For example, a RAID engine may determine to utilize RAID double parity for the storage devices 176*a*-176*k*. The inter-device redundancy data 1250 may represent the RAID double parity values generated from corresponding user data. In one embodiment, storage devices 176*j* and 176*k* may store the double parity information. It is understood other levels of RAID parity protection are possible and contemplated. In addition, in other embodiments, the storage of the double parity information may rotate between the storage devices rather than be stored within storage devices 176*j* and 176*k* for each RAID stripe. The storage of the double parity information is shown to be stored in storage devices 176*j* and 176*k* for ease of illustration and description. Although each of the storage devices 176*a*-176*k* comprises multiple pages, only page 1212 and page 1220 are labeled for case of illustration.

Figure 15A:
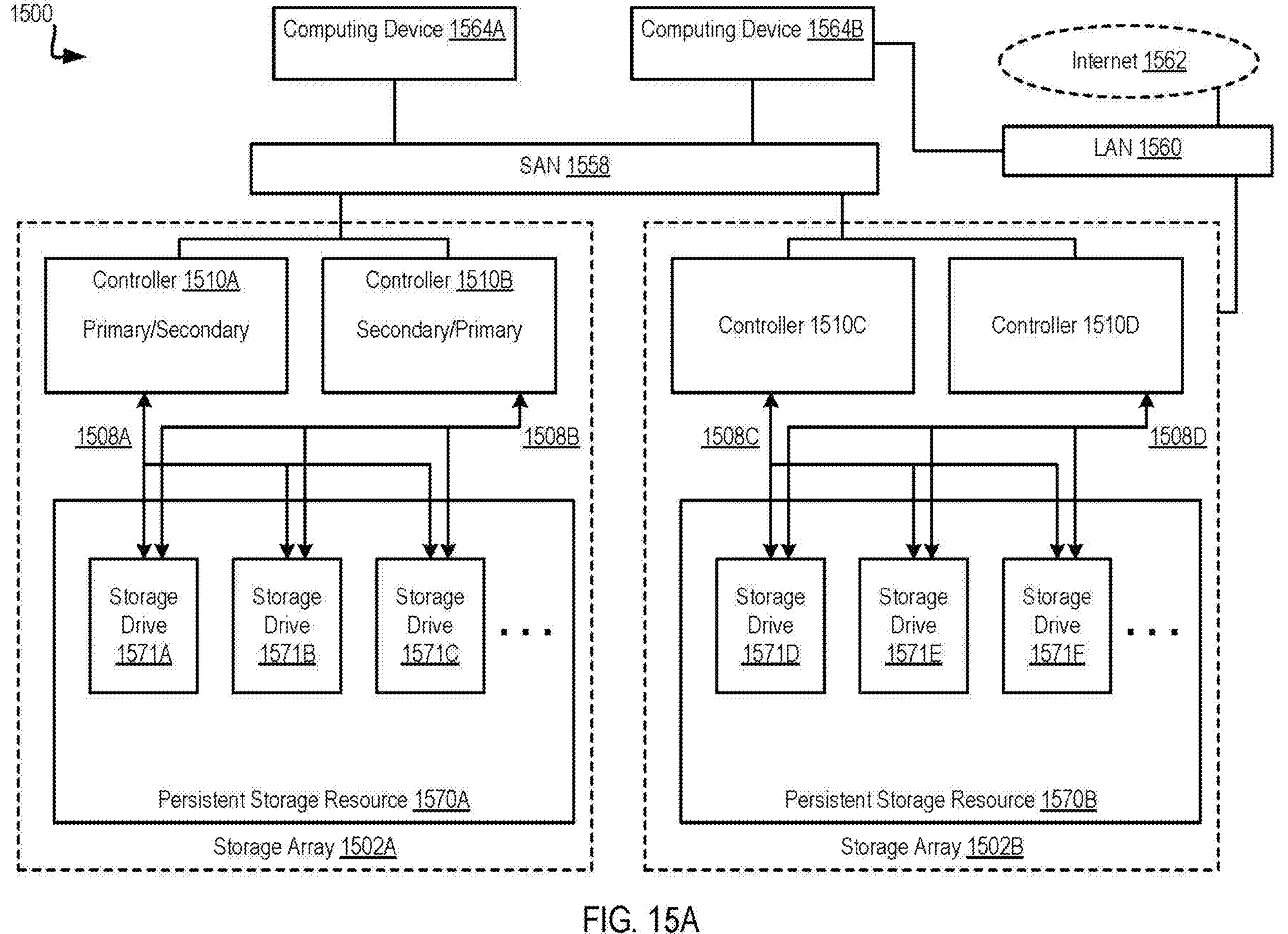
FIG. 15A illustrates a first example system for data storage.

For further explanation, FIG. 15A illustrates an example system for data storage, in accordance with some implementations. System 1500 (also referred to as "storage system" herein) includes numerous elements for purposes of illustration rather than limitation. It may be noted that system 1500 may include the same, more, or fewer elements configured in the same or different manner in other implementations.

System 1500 includes a number of computing devices 1564A-B. Computing devices (also referred to as "client devices" herein) may be embodied, for example, a server in a data center, a workstation, a personal computer, a notebook, or the like. Computing devices 1564A-B may be coupled for data communications to one or more storage arrays 1502A-B through a storage area network ('SAN') 1558 or a local area network ('LAN') 1560.

The SAN 1558 may be implemented with a variety of data communications fabrics, devices, and protocols. For example, the fabrics for SAN 1558 may include Fibre Channel, Ethernet, Infiniband, Serial Attached Small Computer System Interface ('SAS'), or the like. Data communications protocols for use with SAN 1558 may include Advanced Technology Attachment ('ATA'), Fibre Channel Protocol, Small Computer System Interface ('SCSI'), Internet Small Computer System Interface ('ISCSI'), HyperSCSI, Non-Volatile Memory Express ('NVMe') over Fabrics, or the like. It may be noted that SAN 1558 is provided for illustration, rather than limitation. Other data communication couplings may be implemented between computing devices 1564A-B and storage arrays 1502A-B.

The LAN 1560 may also be implemented with a variety of fabrics, devices, and protocols. For example, the fabrics for LAN 1560 may include Ethernet (802.3), wireless (802.11), or the like. Data communication protocols for use in LAN 1560 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like. The LAN 1560 may also connect to the Internet 1562.

Storage arrays 1502A-B may provide persistent data storage for the computing devices 1564A-B. Storage array 1502A may be contained in a chassis (not shown), and storage array 1502B may be contained in another chassis (not shown), in implementations. Storage array 1502A and 1502B may include one or more storage array controllers 1510A-D (also referred to as "controller" herein). A storage array controller 1510A-D may be embodied as a module of automated computing machinery comprising computer hardware, computer software, or a combination of computer hardware and software. In some implementations, the storage array controllers 1510A-D may be configured to carry out various storage tasks. Storage tasks may include writing data received from the computing devices 1564A-B to storage array 1502A-B, erasing data from storage array 1502A-B, retrieving data from storage array 1502A-B and providing data to computing devices 1564A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 1510A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 1510A-D may include, for example, a data communications adapter configured to support communications via the SAN 1558 or LAN 1560. In some implementations, storage array controller 1510A-D may be independently coupled to the LAN 1560. In implementations, storage array controller 1510A-D may include an I/O controller or the like that couples the storage array controller 1510A-D for data communications, through a midplane (not shown), to a persistent storage resource 1570A-B (also referred to as a "storage resource" herein). The persistent storage resource 1570A-B main include any number of storage drives 1571A-F (also referred to as "storage devices" herein) and any number of non-volatile Random Access Memory ('NVRAM') devices (not shown).

In some implementations, the NVRAM devices of a persistent storage resource 1570A-B may be configured to receive, from the storage array controller 1510A-D, data to be stored in the storage drives 1571A-F. In some examples, the data may originate from computing devices 1564A-B. In some examples, writing data to the NVRAM device may be carried out more quickly than directly writing data to the storage drive 1571A-F. In implementations, the storage array controller 1510A-D may be configured to utilize the NVRAM devices as a quickly accessible buffer for data destined to be written to the storage drives 1571A-F. Latency for write requests using NVRAM devices as a buffer may be improved relative to a system in which a storage array controller 1510A-D writes data directly to the storage drives 1571A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 1571A-F.

In implementations, storage drive 1571A-F may refer to any device configured to record data persistently, where "persistently" or "persistent" refers as to a device's ability to maintain recorded data after loss of power. In some implementations, storage drive 1571A-F may correspond to non-disk storage media. For example, the storage drive 1571A-F may be one or more solid-state drives ('SSDs'), flash memory based storage, any type of solid-state non-volatile memory, or any other type of non-mechanical storage device. In other implementations, storage drive 1571A-F may include mechanical or spinning hard disk, such as hard-disk drives ('HDD').

In some implementations, the storage array controllers 1510A-D may be configured for offloading device management responsibilities from storage drive 1571A-F in storage array 1502A-B. For example, storage array controllers 1510A-D may manage control information that may describe the state of one or more memory blocks in the storage drives 1571A-F. The control information may indicate, for example, that a particular memory block has failed and should no longer be written to, that a particular memory block contains boot code for a storage array controller 1510A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 1571A-F may be stored in one or more particular memory blocks of the storage drives 1571A-F that are selected by the storage array controller 1510A-D. The selected memory blocks may be tagged with an identifier indicating that the selected memory block contains control information. The identifier may be utilized by the storage array controllers 1510A-D in conjunction with storage drives 1571A-F to quickly identify the memory blocks that contain control information. For example, the storage controllers 1510A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 1571A-F.

In implementations, storage array controllers 1510A-D may offload device management responsibilities from storage drives 1571A-F of storage array 1502A-B by retrieving, from the storage drives 1571A-F, control information describing the state of one or more memory blocks in the storage drives 1571A-F. Retrieving the control information from the storage drives 1571A-F may be carried out, for example, by the storage array controller 1510A-D querying the storage drives 1571A-F for the location of control information for a particular storage drive 1571A-F. The storage drives 1571A-F may be configured to execute instructions that enable the storage drive 1571A-F to identify the location of the control information. The instructions may be executed by a controller (not shown) associated with or otherwise located on the storage drive 1571A-F and may cause the storage drive 1571A-F to scan a portion of each memory block to identify the memory blocks that store control information for the storage drives 1571A-F. The storage drives 1571A-F may respond by sending a response message to the storage array controller 1510A-D that includes the location of control information for the storage drive 1571A-F. Responsive to receiving the response message, storage array controllers 1510A-D may issue a request to read data stored at the address associated with the location of control information for the storage drives 1571A-F.

In other implementations, the storage array controllers 1510A-D may further offload device management responsibilities from storage drives 1571A-F by performing, in response to receiving the control information, a storage drive management operation. A storage drive management operation may include, for example, an operation that is typically performed by the storage drive 1571A-F (e.g., the controller (not shown) associated with a particular storage drive 1571A-F). A storage drive management operation may include, for example, ensuring that data is not written to failed memory blocks within the storage drive 1571A-F, ensuring that data is written to memory blocks within the storage drive 1571A-F in such a way that adequate wear leveling is achieved, and so forth.

In implementations, storage array 1502A-B may implement two or more storage array controllers 1510A-D. For example, storage array 1502A may include storage array controllers 1510A and storage array controllers 1510B. At a given instance, a single storage array controller 1510A-D (e.g., storage array controller 1510A) of a storage system 1500 may be designated with primary status (also referred to as "primary controller" herein), and other storage array controllers 1510A-D (e.g., storage array controller 1510A) may be designated with secondary status (also referred to as "secondary controller" herein). The primary controller may have particular rights, such as permission to alter data in persistent storage resource 1570A-B (e.g., writing data to persistent storage resource 1570A-B). At least some of the rights of the primary controller may supersede the rights of the secondary controller. For instance, the secondary controller may not have permission to alter data in persistent storage resource 1570A-B when the primary controller has the right. The status of storage array controllers 1510A-D may change. For example, storage array controller 1510A may be designated with secondary status, and storage array controller 1510B may be designated with primary status.

In some implementations, a primary controller, such as storage array controller 1510A, may serve as the primary controller for one or more storage arrays 1502A-B, and a second controller, such as storage array controller 1510B, may serve as the secondary controller for the one or more storage arrays 1502A-B. For example, storage array controller 1510A may be the primary controller for storage array 1502A and storage array 1502B, and storage array controller 1510B may be the secondary controller for storage array 1502A and 1502B. In some implementations, storage array controllers 1510C and 1510D (also referred to as "storage processing modules") may neither have primary or secondary status. Storage array controllers 1510C and 1510D, implemented as storage processing modules, may act as a communication interface between the primary and secondary controllers (e.g., storage array controllers 1510A and 1510B, respectively) and storage array 1502B. For example, storage array controller 1510A of storage array 1502A may send a write request, via SAN 1558, to storage array 1502B. The write request may be received by both storage array controllers 1510C and 1510D of storage array 1502B. Storage array controllers 1510C and 1510D facilitate the communication, e.g., send the write request to the appropriate storage drive 1571A-F. It may be noted that in some implementations storage processing modules may be used to increase the number of storage drives controlled by the primary and secondary controllers.

In implementations, storage array controllers 1510A-D are communicatively coupled, via a midplane (not shown), to one or more storage drives 1571A-F and to one or more NVRAM devices (not shown) that are included as part of a storage array 1502A-B. The storage array controllers 1510A-D may be coupled to the midplane via one or more data communication links and the midplane may be coupled to the storage drives 1571A-F and the NVRAM devices via one or more data communications links. The data communications links described herein are collectively illustrated by data communications links 1508A-D and may include a Peripheral Component Interconnect Express ('PCIe') bus, for example.

Figure 15B:
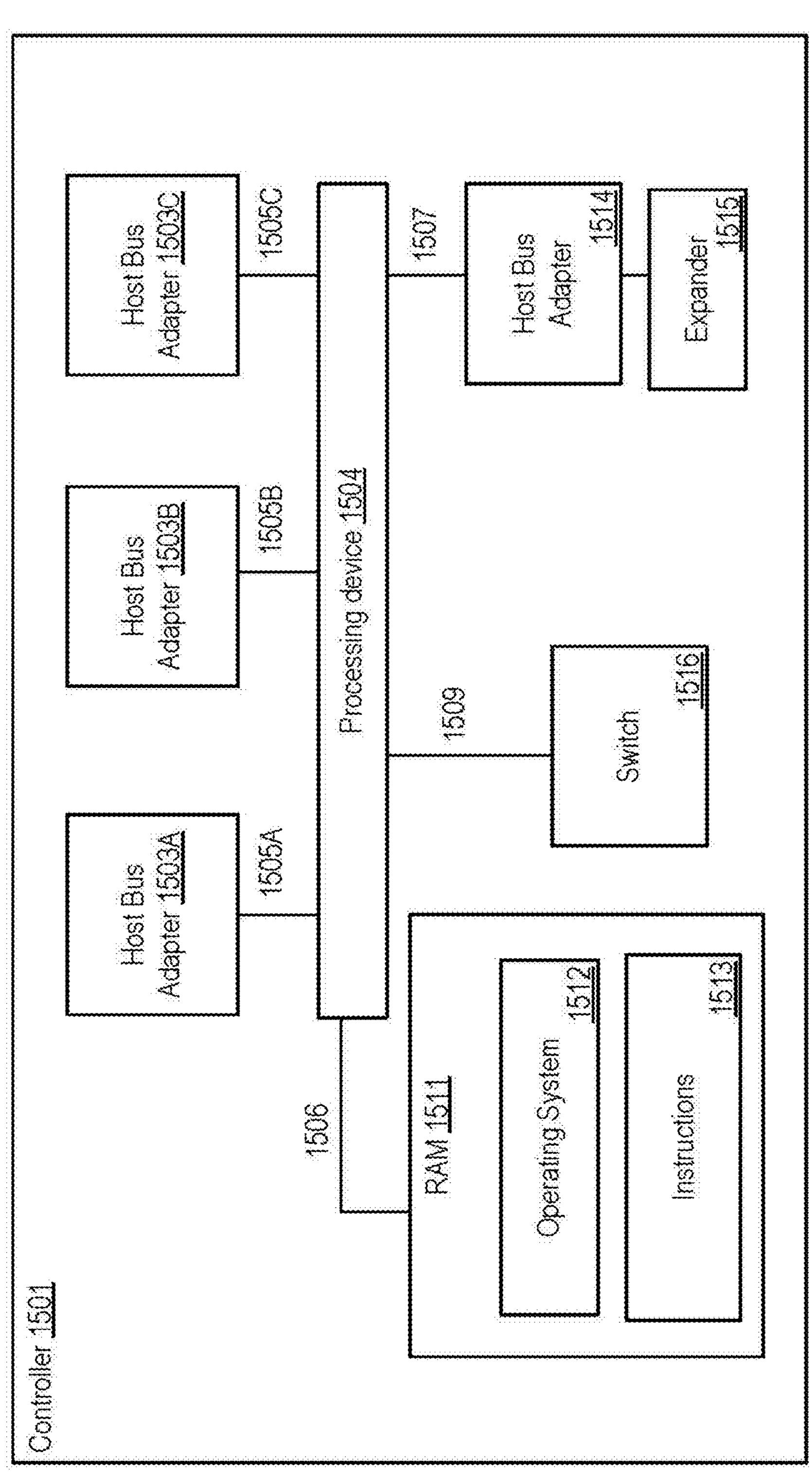
FIG. 15B illustrates a second example system for data storage.

FIG. 15B illustrates an example system for data storage, in accordance with some implementations. Storage array controller 1501 illustrated in FIG. 15B may be similar to the storage array controllers 1510A-D described with respect to FIG. 15A. In one example, storage array controller 1501 may be similar to storage array controller 1510A or storage array controller 1510B. Storage array controller 1501 includes numerous elements for purposes of illustration rather than limitation. It may be noted that storage array controller 1501 may include the same, more, or fewer elements configured in the same or different manner in other implementations. It may be noted that elements of FIG. 15A may be included below to help illustrate features of storage array controller 1501.

Storage array controller 1501 may include one or more processing devices 1504 and random access memory ('RAM') 1511. Processing device 1504 (or controller 1501) represents one or more general-purpose processing devices such as a microprocessor, central processing unit, or the like. More particularly, the processing device 1504 (or controller 1501) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 1504 (or controller 1501) may also be one or more special-purpose processing devices such as an ASIC, an FPGA, a digital signal processor ('DSP'), network processor, or the like.

The processing device 1504 may be connected to the RAM 1511 via a data communications link 1506, which may be embodied as a high speed memory bus such as a Double-Data Rate 4 ('DDR4') bus. Stored in RAM 1511 is an operating system 1512. In some implementations, instructions 1513 are stored in RAM 1511. Instructions 1513 may include computer program instructions for performing operations in a direct-mapped flash storage system. In one embodiment, a direct-mapped flash storage system is one that addresses data blocks within flash drives directly and without an address translation performed by the storage controllers of the flash drives.

In implementations, storage array controller 1501 includes one or more host bus adapters 1503A-C that are coupled to the processing device 1504 via a data communications link 1505A-C. In implementations, host bus adapters 1503A-C may be computer hardware that connects a host system (e.g., the storage array controller) to other network and storage arrays. In some examples, host bus adapters 1503A-C may be a Fibre Channel adapter that enables the storage array controller 1501 to connect to a SAN, an Ethernet adapter that enables the storage array controller 1501 to connect to a LAN, or the like. Host bus adapters 1503A-C may be coupled to the processing device 1504 via a data communications link 1505A-C such as, for example, a PCIe bus.

In implementations, storage array controller 1501 may include a host bus adapter 1514 that is coupled to an expander 1515. The expander 1515 may be used to attach a host system to a larger number of storage drives. The expander 1515 may, for example, be a SAS expander utilized to enable the host bus adapter 1514 to attach to storage drives in an implementation where the host bus adapter 1514 is embodied as a SAS controller.

In implementations, storage array controller 1501 may include a switch 1516 coupled to the processing device 1504 via a data communications link 1509. The switch 1516 may be a computer hardware device that can create multiple endpoints out of a single endpoint, thereby enabling multiple devices to share a single endpoint. The switch 1516 may, for example, be a PCIe switch that is coupled to a PCIe bus (e.g., data communications link 1509) and presents multiple PCIe connection points to the midplane.

In implementations, storage array controller 1501 includes a data communications link 1507 for coupling the storage array controller 1501 to other storage array controllers. In some examples, data communications link 1507 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

In implementations, storage drive 1571A-F may be one or more zoned storage devices. In some implementations, the one or more zoned storage devices may be a shingled HDD. In implementations, the one or more storage devices may be a flash-based SSD. In a zoned storage device, a zoned namespace on the zoned storage device can be addressed by groups of blocks that are grouped and aligned by a natural size, forming a number of addressable zones. In implementations utilizing an SSD, the natural size may be based on the erase block size of the SSD. In some implementations, the zones of the zoned storage device may be defined during initialization of the zoned storage device. In implementations, the zones may be defined dynamically as data is written to the zoned storage device.

In some implementations, zones may be heterogeneous, with some zones each being a page group and other zones being multiple page groups. In implementations, some zones may correspond to an erase block and other zones may correspond to multiple erase blocks. In an implementation, zones may be any combination of differing numbers of pages in page groups and/or erase blocks, for heterogeneous mixes of programming modes, manufacturers, product types and/or product generations of storage devices, as applied to heterogeneous assemblies, upgrades, distributed storages, etc. In some implementations, zones may be defined as having usage characteristics, such as a property of supporting data with particular kinds of longevity (very short lived or very long lived, for example). These properties could be used by a zoned storage device to determine how the zone will be managed over the zone's expected lifetime.

It should be appreciated that a zone is a virtual construct. Any particular zone may not have a fixed location at a storage device. Until allocated, a zone may not have any location at a storage device. A zone may correspond to a number representing a chunk of virtually allocatable space that is the size of an erase block or other block size in various implementations. When the system allocates or opens a zone, zones get allocated to flash or other solid-state storage memory and, as the system writes to the zone, pages are written to that mapped flash or other solid-state storage memory of the zoned storage device. When the system closes the zone, the associated erase block(s) or other sized block(s) are completed. At some point in the future, the system may delete a zone which will free up the zone's allocated space. During its lifetime, a zone may be moved around to different locations of the zoned storage device, e.g., as the zoned storage device does internal maintenance.

In implementations, the zones of the zoned storage device may be in different states. A zone may be in an empty state in which data has not been stored at the zone. An empty zone may be opened explicitly, or implicitly by writing data to the zone. This is the initial state for zones on a fresh zoned storage device, but may also be the result of a zone reset. In some implementations, an empty zone may have a designated location within the flash memory of the zoned storage device. In an implementation, the location of the empty zone may be chosen when the zone is first opened or first written to (or later if writes are buffered into memory). A zone may be in an open state either implicitly or explicitly, where a zone that is in an open state may be written to store data with write or append commands. In an implementation, a zone that is in an open state may also be written to using a copy command that copies data from a different zone. In some implementations, a zoned storage device may have a limit on the number of open zones at a particular time.

A zone in a closed state is a zone that has been partially written to, but has entered a closed state after issuing an explicit close operation. A zone in a closed state may be left available for future writes, but may reduce some of the run-time overhead consumed by keeping the zone in an open state. In implementations, a zoned storage device may have a limit on the number of closed zones at a particular time. A zone in a full state is a zone that is storing data and can no longer be written to. A zone may be in a full state either after writes have written data to the entirety of the zone or as a result of a zone finish operation. Prior to a finish operation, a zone may or may not have been completely written. After a finish operation, however, the zone may not be opened a written to further without first performing a zone reset operation.

The mapping from a zone to an erase block (or to a shingled track in an HDD) may be arbitrary, dynamic, and hidden from view. The process of opening a zone may be an operation that allows a new zone to be dynamically mapped to underlying storage of the zoned storage device, and then allows data to be written through appending writes into the zone until the zone reaches capacity. The zone can be finished at any point, after which further data may not be written into the zone. When the data stored at the zone is no longer needed, the zone can be reset which effectively deletes the zone's content from the zoned storage device, making the physical storage held by that zone available for the subsequent storage of data. Once a zone has been written and finished, the zoned storage device ensures that the data stored at the zone is not lost until the zone is reset. In the time between writing the data to the zone and the resetting of the zone, the zone may be moved around between shingle tracks or erase blocks as part of maintenance operations within the zoned storage device, such as by copying data to keep the data refreshed or to handle memory cell aging in an SSD.

In implementations utilizing an HDD, the resetting of the zone may allow the shingle tracks to be allocated to a new, opened zone that may be opened at some point in the future. In implementations utilizing an SSD, the resetting of the zone may cause the associated physical erase block(s) of the zone to be erased and subsequently reused for the storage of data. In some implementations, the zoned storage device may have a limit on the number of open zones at a point in time to reduce the amount of overhead dedicated to keeping zones open.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is in contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 15C:
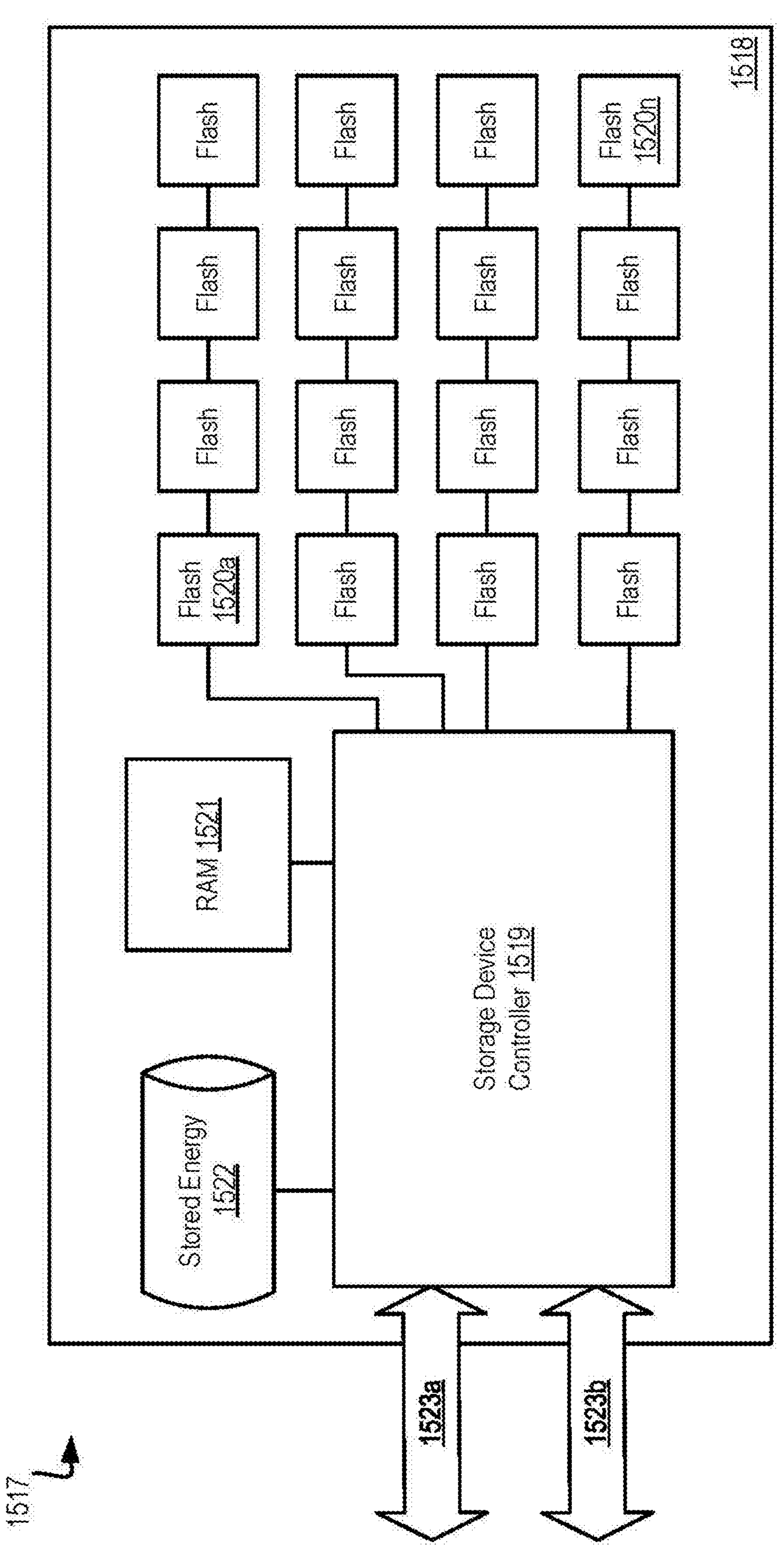
FIG. 15C illustrates a third example system for data storage.

FIG. 15C illustrates a third example system 1517 for data storage in accordance with some implementations. System 1517 (also referred to as "storage system" herein) includes numerous elements for purposes of illustration rather than limitation. It may be noted that system 1517 may include the same, more, or fewer elements configured in the same or different manner in other implementations.

In one embodiment, system 1517 includes a dual Peripheral Component Interconnect ('PCI') flash storage device 1518 with separately addressable fast write storage. System 1517 may include a storage device controller 1519. In one embodiment, storage device controller 1519A-D may be a CPU, ASIC, FPGA, or any other circuitry that may implement control structures necessary according to the present disclosure. In one embodiment, system 1517 includes flash memory devices (e.g., including flash memory devices 1520*a*-*n*), operatively coupled to various channels of the storage device controller 1519. Flash memory devices 1520*a*-*n* may be presented to the controller 1519A-D as an addressable collection of Flash pages, erase blocks, and/or control elements sufficient to allow the storage device controller 1519A-D to program and retrieve various aspects of the Flash. In one embodiment, storage device controller 1519A-D may perform operations on flash memory devices 1520*a*-*n* including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 1517 may include RAM 1521 to store separately addressable fast-write data. In one embodiment, RAM 1521 may be one or more separate discrete devices. In another embodiment, RAM 1521 may be integrated into storage device controller 1519A-D or multiple storage device controllers. The RAM 1521 may be utilized for other purposes as well, such as temporary program memory for a processing device (e.g., a CPU) in the storage device controller 1519.

In one embodiment, system 1517 may include a stored energy device 1522, such as a rechargeable battery or a capacitor. Stored energy device 1522 may store energy sufficient to power the storage device controller 1519, some amount of the RAM (e.g., RAM 1521), and some amount of Flash memory (e.g., Flash memory 1520*a*-1520*n*) for sufficient time to write the contents of RAM to Flash memory. In one embodiment, storage device controller 1519A-D may write the contents of RAM to Flash Memory if the storage device controller detects loss of external power.

In one embodiment, system 1517 includes two data communications links 1523*a*, 1523*b*. In one embodiment, data communications links 1523*a*, 1523*b* may be PCI interfaces. In another embodiment, data communications links 1523*a*, 1523*b* may be based on other communications standards (e.g., HyperTransport, InfiniBand, etc.). Data communications links 1523*a*, 1523*b* may be based on non-volatile memory express ('NVMe') or NVMe over fabrics ('NVMf') specifications that allow external connection to the storage device controller 1519A-D from other components in the storage system 1517. It should be noted that data communications links may be interchangeably referred to herein as PCI buses for convenience.

System 1517 may also include an external power source (not shown), which may be provided over one or both data communications links 1523*a*, 1523*b*, or which may be provided separately. An alternative embodiment includes a separate Flash memory (not shown) dedicated for use in storing the content of RAM 1521. The storage device controller 1519A-D may present a logical device over a PCI bus which may include an addressable fast-write logical device, or a distinct part of the logical address space of the storage device 1518, which may be presented as PCI memory or as persistent storage. In one embodiment, operations to store into the device are directed into the RAM 1521. On power failure, the storage device controller 1519A-D may write stored content associated with the addressable fast-write logical storage to Flash memory (e.g., Flash memory 1520*a-n*) for long-term persistent storage.

In one embodiment, the logical device may include some presentation of some or all of the content of the Flash memory devices 1520*a-n*, where that presentation allows a storage system including a storage device 1518 (e.g., storage system 1517) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 1522 may be sufficient to ensure completion of in-progress operations to the Flash memory devices 1520*a*-1520*n* stored energy device 1522 may power storage device controller 1519A-D and associated Flash memory devices (e.g., 1520*a-n*) for those operations, as well as for the storing of fast-write RAM to Flash memory. Stored energy device 1522 may be used to store accumulated statistics and other parameters kept and tracked by the Flash memory devices 1520*a-n* and/or the storage device controller 1519. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the stored energy device 1522 to measure corresponding discharge characteristics, etc. If the available energy decreases over time, the effective available capacity of the addressable fast-write storage may be decreased to ensure that it can be written safely based on the currently available stored energy.

Figure 15D:
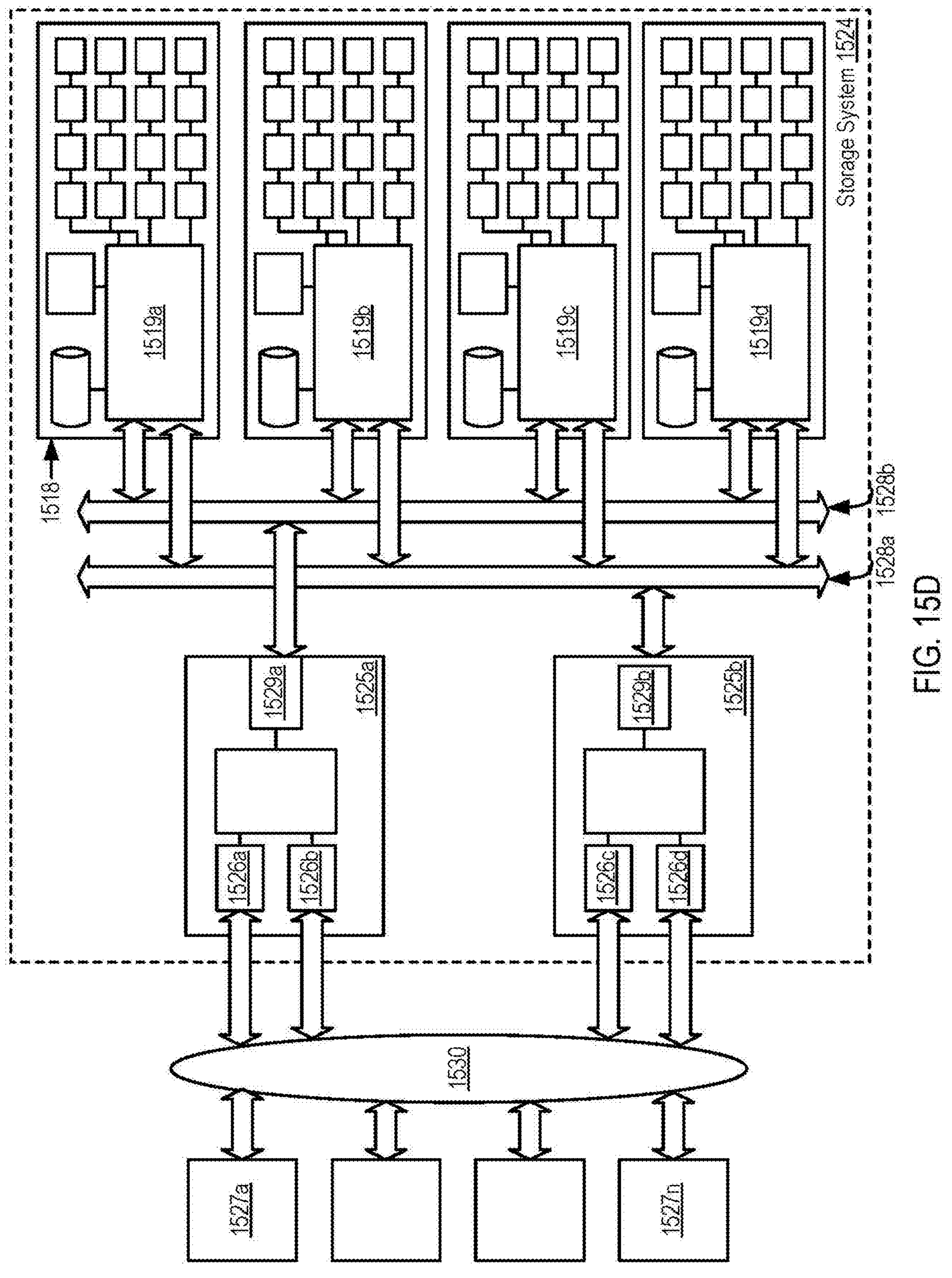
FIG. 15D illustrates a fourth example system for data storage.

FIG. 15D illustrates a third example storage system 1524 for data storage in accordance with some implementations. In one embodiment, storage system 1524 includes storage controllers 1525*a*, 1525*b*. In one embodiment, storage controllers 1525*a*, 1525*b* are operatively coupled to Dual PCI storage devices. Storage controllers 1525*a*, 1525*b* may be operatively coupled (e.g., via a storage network 1530) to some number of host computers 1527*a-n*.

In one embodiment, two storage controllers (e.g., 1525*a* and 1525*b*) provide storage services, such as a SCS block storage array, a file server, an object server, a database or data analytics service, etc. The storage controllers 1525*a*, 1525*b* may provide services through some number of network interfaces (e.g., 1526*a-d*) to host computers 1527*a-n* outside of the storage system 1524. Storage controllers 1525*a*, 1525*b* may provide integrated services or an application entirely within the storage system 1524, forming a converged storage and compute system. The storage controllers 1525*a*, 1525*b* may utilize the fast write memory within or across storage devices 1519*a-d* to journal in progress operations to ensure the operations are not lost on a power failure, storage controller removal, storage controller or storage system shutdown, or some fault of one or more software or hardware components within the storage system 1524.

In one embodiment, storage controllers 1525*a*, 1525*b* operate as PCI masters to one or the other PCI buses 1528*a*, 1528*b*. In another embodiment, 1528*a* and 1528*b* may be based on other communications standards (e.g., HyperTransport, InfiniBand, etc.). Other storage system embodiments may operate storage controllers 1525*a*, 1525*b* as multi-masters for both PCI buses 1528*a*, 1528*b*. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 1519*a* may be operable under direction from a storage controller 1525*a* to synthesize and transfer data to be stored into Flash memory devices from data that has been stored in RAM (e.g., RAM 1521 of FIG. 15C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 1528*a*, 1528*b*) from the storage controllers 1525*a*, 1525*b*. In one embodiment, a recalculation may include compressing data, attaching indexing or other metadata, combining multiple data segments together, performing erasure code calculations, etc.

In one embodiment, under direction from a storage controller 1525*a*, 1525*b*, a storage device controller 1519*a*, 1519*b* may be operable to calculate and transfer data to other storage devices from data stored in RAM (e.g., RAM 1521 of FIG. 15C) without involvement of the storage controllers 1525*a*, 1525*b*. This operation may be used to mirror data stored in one storage controller 1525*a* to another storage controller 1525*b*, or it could be used to offload compression, data aggregation, and/or erasure coding calculations and transfers to storage devices to reduce load on storage controllers or the storage controller interface 1529*a*, 1529*b* to the PCI bus 1528*a*, 1528*b*.

A storage device controller 1519A-D may include mechanisms for implementing high availability primitives for use by other parts of a storage system external to the Dual PCI storage device 1518. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one or more storage devices.

In one embodiment, the storage controllers 1525*a*, 1525*b* may initiate the use of erase blocks within and across storage devices (e.g., 1518) in accordance with an age and expected remaining lifespan of the storage devices, or based on other statistics. The storage controllers 1525*a*, 1525*b* may initiate garbage collection and data migration between storage devices in accordance with pages that are no longer needed as well as to manage Flash page and erase block lifespans and to manage overall system performance.

In one embodiment, the storage system 1524 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 16A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail herein allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed herein.

Figure 16A:
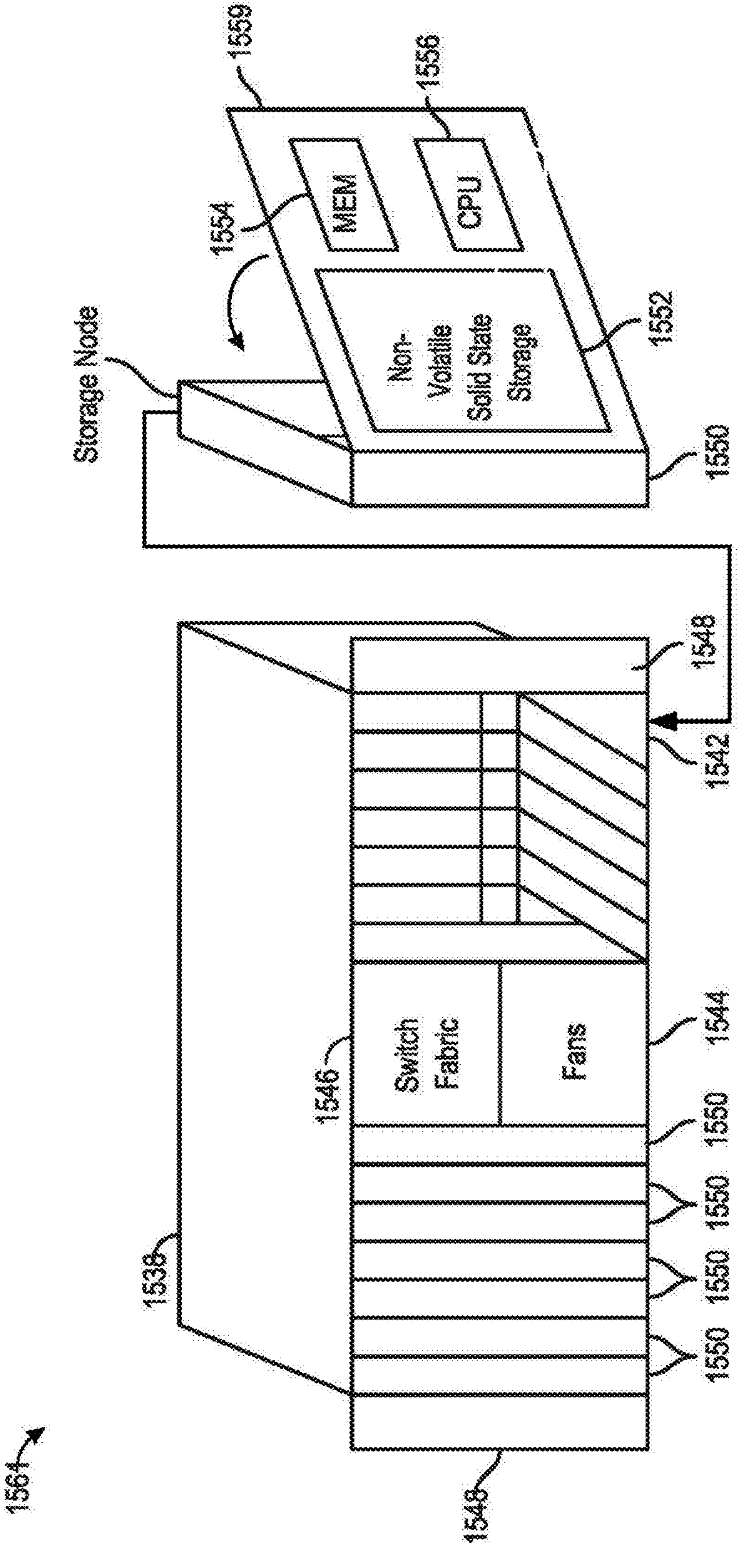
FIG. 16A is a perspective view of a storage cluster with multiple storage nodes and internal storage coupled to each storage node to provide network attached storage.

FIG. 16A is a perspective view of a storage cluster 1561, with multiple storage nodes 1550 and internal solid-state memory coupled to each storage node to provide network attached storage or storage area network, in accordance with some embodiments. A network attached storage, storage area network, or a storage cluster, or other storage memory, could include one or more storage clusters 1561, each having one or more storage nodes 1550, in a flexible and reconfigurable arrangement of both the physical components and the amount of storage memory provided thereby. The storage cluster 1561 is designed to fit in a rack, and one or more racks can be set up and populated as desired for the storage memory. The storage cluster 1561 has a chassis 1538 having multiple slots 1542. It should be appreciated that chassis 1538 may be referred to as a housing, enclosure, or rack unit. In one embodiment, the chassis 1538 has fourteen slots 1542, although other numbers of slots are readily devised. For example, some embodiments have four slots, eight slots, sixteen slots, thirty-two slots, or other suitable number of slots. Each slot 1542 can accommodate one storage node 1550 in some embodiments. Chassis 1538 includes flaps 1548 that can be utilized to mount the chassis 1538 on a rack. Fans 1544 provides air circulation for cooling of the storage nodes 1550 and components thereof, although other cooling components could be used, or an embodiment could be devised without cooling components. A switch fabric 1546 couples storage nodes 1550 within chassis 1538 together and to a network for communication to the memory. In an embodiment depicted in herein, the slots 1542 to the left of the switch fabric 1546 and fans 1544 are shown occupied by storage nodes 1550, while the slots 1542 to the right of the switch fabric 1546 and fans 1544 are empty and available for insertion of storage node 1550 for illustrative purposes. This configuration is one example, and one or more storage nodes 1550 could occupy the slots 1542 in various further arrangements. The storage node arrangements need not be sequential or adjacent in some embodiments. Storage nodes 1550 are hot pluggable, meaning that a storage node 1550 can be inserted into a slot 1542 in the chassis 1538, or removed from a slot 1542, without stopping or powering down the system. Upon insertion or removal of storage node 1550 from slot 1542, the system automatically reconfigures in order to recognize and adapt to the change. Reconfiguration, in some embodiments, includes restoring redundancy and/or rebalancing data or load.

Each storage node 1550 can have multiple components. In the embodiment shown here, the storage node 1550 includes a printed circuit board 1559 populated by a CPU 1556, i.e., processor, a memory 1554 coupled to the CPU 1556, and a non-volatile solid state storage 1552 coupled to the CPU 1556, although other mountings and/or components could be used in further embodiments. The memory 1554 has instructions which are executed by the CPU 1556 and/or data operated on by the CPU 1556. As further explained herein, the non-volatile solid state storage 1552 includes flash or, in further embodiments, other types of solid-state memory.

Referring to FIG. 16A, storage cluster 1561 is scalable, meaning that storage capacity with non-uniform storage sizes is readily added, as described above. One or more storage nodes 1550 can be plugged into or removed from each chassis and the storage cluster self-configures in some embodiments. Plug-in storage nodes 1550, whether installed in a chassis as delivered or later added, can have different sizes. For example, in one embodiment a storage node 1550 can have any multiple of 4 TB, e.g., 8 TB, 12 TB, 16 TB, 32 TB, etc. In further embodiments, a storage node 1550 could have any multiple of other storage amounts or capacities. Storage capacity of each storage node 1550 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage 1552 units or storage nodes 1550 within the chassis.

Figure 16B:
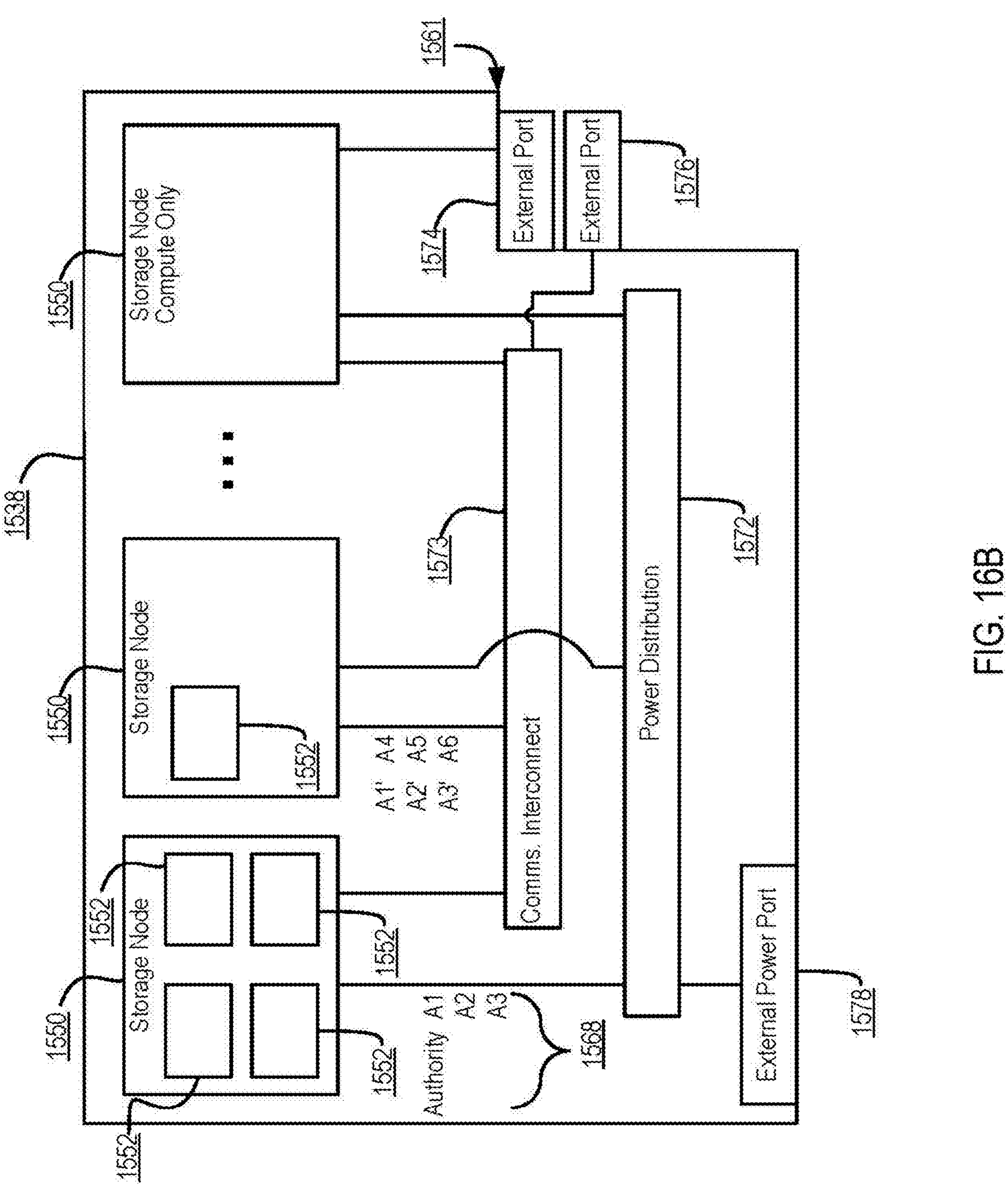
FIG. 16B is a block diagram showing an interconnect switch coupling multiple storage nodes in accordance with some embodiments.

FIG. 16B is a block diagram showing a communications interconnect 1573 and power distribution bus 1572 coupling multiple storage nodes 1550. Referring back to FIG. 16A, the communications interconnect 1573 can be included in or implemented with the switch fabric 1546 in some embodiments. Where multiple storage clusters 1561 occupy a rack, the communications interconnect 1573 can be included in or implemented with a top of rack switch, in some embodiments. As illustrated in FIG. 16B, storage cluster 1561 is enclosed within a single chassis 1538. External port 1576 is coupled to storage nodes 1550 through communications interconnect 1573, while external port 1574 is coupled directly to a storage node. External power port 1578 is coupled to power distribution bus 1572. Storage nodes 1550 may include varying amounts and differing capacities of non-volatile solid state storage 1552 as described with reference to FIG. 16A. In addition, one or more storage nodes 1550 may be a compute only storage node as illustrated in FIG. 16B. Authorities 1568 are implemented on the non-volatile solid state storage 1552, for example as lists or other data structures stored in memory. In some embodiments the authorities are stored within the non-volatile solid state storage 1552 and supported by software executing on a controller or other processor of the non-volatile solid state storage 1552. In a further embodiment, authorities 1568 are implemented on the storage nodes 1550, for example as lists or other data structures stored in the memory 1554 and supported by software executing on the CPU 1556 of the storage node 1550. Authorities 1568 control how and where data is stored in the non-volatile solid state storage 1552 in some embodiments. This control assists in determining which type of erasure coding scheme is applied to the data, and which storage nodes 1550 have which portions of the data. Each authority 1568 may be assigned to a non-volatile solid state storage 1552. Each authority may control a range of inode numbers, segment numbers, or other data identifiers which are assigned to data by a file system, by the storage nodes 1550, or by the non-volatile solid state storage 1552, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 1568. Authorities 1568 have a relationship to storage nodes 1550 and non-volatile solid state storage 1552 in some embodiments. Each authority 1568, covering a range of data segment numbers or other identifiers of the data, may be assigned to a specific non-volatile solid state storage 1552. In some embodiments the authorities 1568 for all of such ranges are distributed over the non-volatile solid state storage 1552 of a storage cluster. Each storage node 1550 has a network port that provides access to the non-volatile solid state storage(s) 1552 of that storage node 1550. Data can be stored in a segment, which is associated with a segment number and that segment number is an indirection for a configuration of a RAID (redundant array of independent disks) stripe in some embodiments. The assignment and use of the authorities 1568 thus establishes an indirection to data. Indirection may be referred to as the ability to reference data indirectly, in this case via an authority 1568, in accordance with some embodiments. A segment identifies a set of non-volatile solid state storage 1552 and a local identifier into the set of non-volatile solid state storage 1552 that may contain data. In some embodiments, the local identifier is an offset into the device and may be reused sequentially by multiple segments. In other embodiments the local identifier is unique for a specific segment and never reused. The offsets in the non-volatile solid state storage 1552 are applied to locating data for writing to or reading from the non-volatile solid state storage 1552 (in the form of a RAID stripe). Data is striped across multiple units of non-volatile solid state storage 1552, which may include or be different from the non-volatile solid state storage 1552 having the authority 1568 for a particular data segment.

If there is a change in where a particular segment of data is located, e.g., during a data move or a data reconstruction, the authority 1568 for that data segment should be consulted, at that non-volatile solid state storage 1552 or storage node 1550 having that authority 1568. In order to locate a particular piece of data, embodiments calculate a hash value for a data segment or apply an inode number or a data segment number. The output of this operation points to a non-volatile solid state storage 1552 having the authority 1568 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 1552, which may be done through an explicit mapping. The operation is repeatable, so that when the calculation is performed, the result of the calculation repeatably and reliably points to a particular non-volatile solid state storage 1552 having that authority 1568. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 1552 for an authority in the presence of a set of non-volatile solid state storage 1552 that are reachable and constitute the same cluster. The calculation also determines an ordered set of peer non-volatile solid state storage 1552 that will also record the authority to non-volatile solid state storage mapping so that the authority may be determined even if the assigned non-volatile solid state storage is unreachable. A duplicate or substitute authority 1568 may be consulted if a specific authority 1568 is unavailable in some embodiments.

With reference to FIGS. 16A and 16B, two of the many tasks of the CPU 1556 on a storage node 1550 are to break up write data, and reassemble read data. When the system has determined that data is to be written, the authority 1568 for that data is located as above. When the segment ID for data is already determined the request to write is forwarded to the non-volatile solid state storage 1552 currently determined to be the host of the authority 1568 determined from the segment. The host CPU 1556 of the storage node 1550, on which the non-volatile solid state storage 1552 and corresponding authority 1568 reside, then breaks up or shards the data and transmits the data out to various non-volatile solid state storage 1552. The transmitted data is written as a data stripe in accordance with an erasure coding scheme. In some embodiments, data is requested to be pulled, and in other embodiments, data is pushed. In reverse, when data is read, the authority 1568 for the segment ID containing the data is located as described above. The host CPU 1556 of the storage node 1550 on which the non-volatile solid state storage 1552 and corresponding authority 1568 reside requests the data from the non-volatile solid state storage and corresponding storage nodes pointed to by the authority. In some embodiments the data is read from flash storage as a data stripe. The host CPU 1556 of storage node 1550 then reassembles the read data, correcting any errors (if present) according to the appropriate erasure coding scheme, and forwards the reassembled data to the network. In further embodiments, some or all of these tasks can be handled in the non-volatile solid state storage 1552. In some embodiments, the segment host requests the data be sent to storage node 1550 by requesting pages from storage and then sending the data to the storage node making the original request.

In embodiments, authorities 1568 operate to determine how operations will proceed against particular logical elements. Each of the logical elements may be operated on through a particular authority across a plurality of storage controllers of a storage system. The authorities 1568 may communicate with the plurality of storage controllers so that the plurality of storage controllers collectively perform operations against those particular logical elements.

In embodiments, logical elements could be, for example, files, directories, object buckets, individual objects, delineated parts of files or objects, other forms of key-value pair databases, or tables. In embodiments, performing an operation can involve, for example, ensuring consistency, structural integrity, and/or recoverability with other operations against the same logical element, reading metadata and data associated with that logical element, determining what data should be written durably into the storage system to persist any changes for the operation, or where metadata and data can be determined to be stored across modular storage devices attached to a plurality of the storage controllers in the storage system.

In some embodiments the operations are token based transactions to efficiently communicate within a distributed system. Each transaction may be accompanied by or associated with a token, which gives permission to execute the transaction. The authorities 1568 are able to maintain a pre-transaction state of the system until completion of the operation in some embodiments. The token based communication may be accomplished without a global lock across the system, and also enables restart of an operation in case of a disruption or other failure.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 1552 coupled to the host CPUs 1556 (See FIGS. 16E and 16G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage 1552 unit may be assigned a range of address space. Within this assigned range, the non-volatile solid state storage 1552 is able to allocate addresses without synchronization with other non-volatile solid state storage 1552.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 16C:
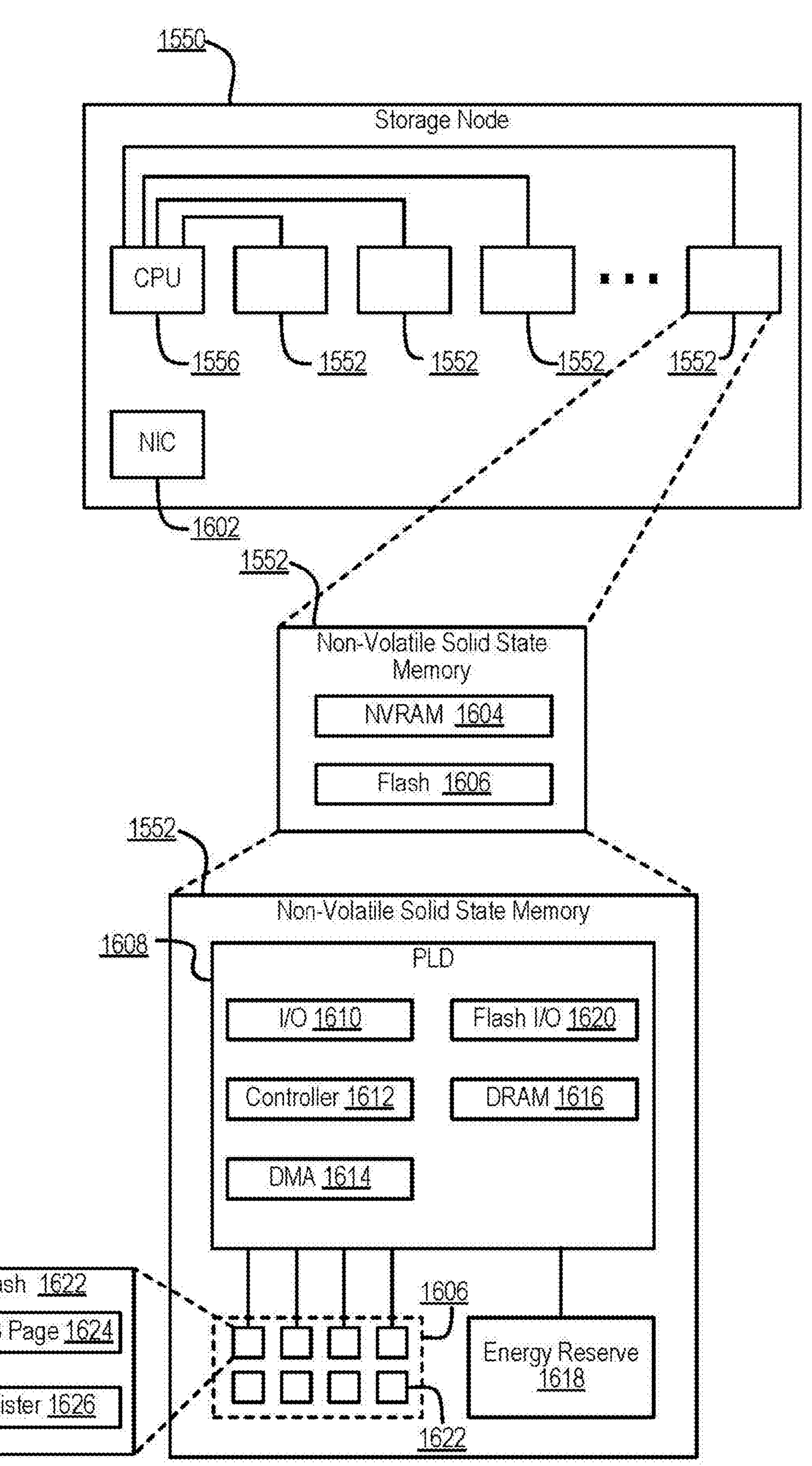
FIG. 16C is a multiple level block diagram, showing contents of a storage node and contents of one of the non-volatile solid state storage units.

FIG. 16C is a multiple level block diagram, showing contents of a storage node 1550 and contents of a non-volatile solid state storage 1552 of the storage node 1550. Data is communicated to and from the storage node 1550 by a network interface controller ('NIC') 1602 in some embodiments. Each storage node 1550 has a CPU 1556, and one or more non-volatile solid state storage 1552, as discussed above. Moving down one level in FIG. 16C, each non-volatile solid state storage 1552 has a relatively fast non-volatile solid state memory, such as nonvolatile random access memory ('NVRAM') 1604, and flash memory 1606. In some embodiments, NVRAM 1604 may be a component that does not require program/erase cycles (DRAM, MRAM, PCM), and can be a memory that can support being written vastly more often than the memory is read from. Moving down another level in FIG. 16C, the NVRAM 1604 is implemented in one embodiment as high speed volatile memory, such as dynamic random access memory (DRAM) 1616, backed up by energy reserve 1618. Energy reserve 1618 provides sufficient electrical power to keep the DRAM 1616 powered long enough for contents to be transferred to the flash memory 1606 in the event of power failure. In some embodiments, energy reserve 1618 is a capacitor, super-capacitor, battery, or other device, that supplies a suitable supply of energy sufficient to enable the transfer of the contents of DRAM 1616 to a stable storage medium in the case of power loss. The flash memory 1606 is implemented as multiple flash dies 1622, which may be referred to as packages of flash dies 1622 or an array of flash dies 1622. It should be appreciated that the flash dies 1622 could be packaged in any number of ways, with a single die per package, multiple dies per package (i.e., multichip packages), in hybrid packages, as bare dies on a printed circuit board or other substrate, as encapsulated dies, etc. In the embodiment shown, the non-volatile solid state storage 1552 has a controller 1612 or other processor, and an input output (I/O) port 1610 coupled to the controller 1612. I/O port 1610 is coupled to the CPU 1556 and/or the network interface controller 1602 of the flash storage node 1550. Flash input output (I/O) port 1620 is coupled to the flash dies 1622, and a direct memory access unit (DMA) 1614 is coupled to the controller 1612, the DRAM 1616 and the flash dies 1622. In the embodiment shown, the I/O port 1610, controller 1612, DMA unit 1614 and flash I/O port 1620 are implemented on a programmable logic device ('PLD') 1608, e.g., an FPGA. In this embodiment, each flash die 1622 has pages, organized as sixteen kB (kilobyte) pages 1624, and a register 1626 through which data can be written to or read from the flash die 1622. In further embodiments, other types of solid-state memory are used in place of, or in addition to flash memory illustrated within flash die 1622.

Storage clusters 1561, in various embodiments as disclosed herein, can be contrasted with storage arrays in general. The storage nodes 1550 are part of a collection that creates the storage cluster 1561. Each storage node 1550 owns a slice of data and computing required to provide the data. Multiple storage nodes 1550 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The non-volatile solid state storage 1552 units described herein have multiple interfaces active simultaneously and serving multiple purposes. In some embodiments, some of the functionality of a storage node 1550 is shifted into a storage unit 1552, transforming the storage unit 1552 into a combination of storage unit 1552 and storage node 1550. Placing computing (relative to storage data) into the storage unit 1552 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 1561, as described herein, multiple controllers in multiple non-volatile solid state storage 1552 units and/or storage nodes 1550 cooperate in various ways (e.g., for erasure coding, data sharding, metadata communication and redundancy, storage capacity expansion or contraction, data recovery, and so on).

Figure 16D:
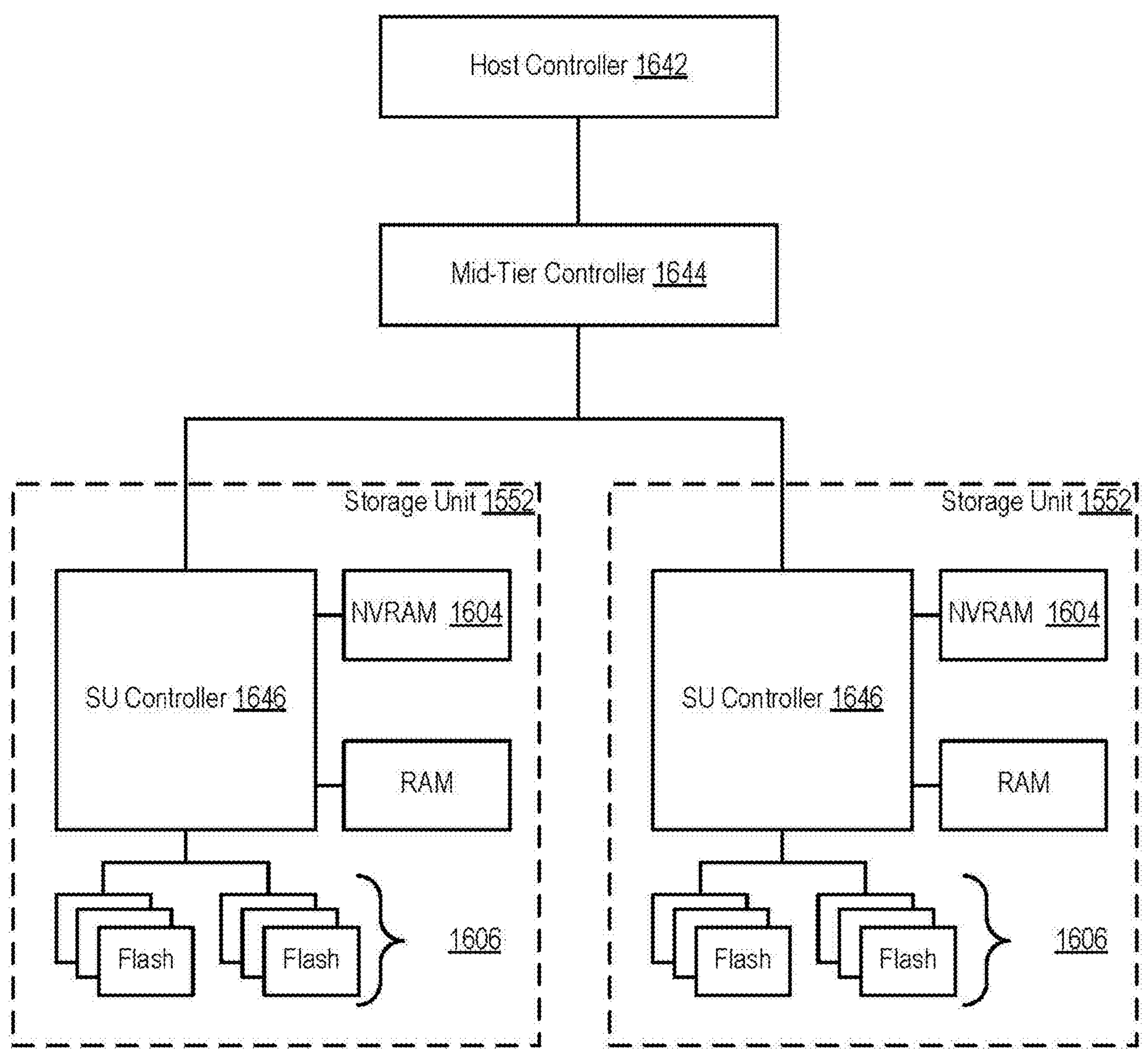
FIG. 16D shows a storage server environment, which uses embodiments of the storage nodes and storage units of some previous figures in accordance with some embodiments.

FIG. 16D shows a storage server environment, which uses embodiments of the storage nodes 1550 and storage 1552 units of FIGS. 16A-C. In this version, each non-volatile solid state storage 1552 unit has a processor such as controller 1612 (see FIG. 16C), an FPGA, flash memory 1606, and NVRAM 1604 (which is super-capacitor backed DRAM 1616, see FIGS. 16B and 16C) on a PCIe (peripheral component interconnect express) board in a chassis 1538 (see FIG. 16A). The non-volatile solid state storage 1552 unit may be implemented as a single board containing storage, and may be the largest tolerable failure domain inside the chassis. In some embodiments, up to two non-volatile solid state storage 1552 units may fail and the device will continue with no data loss.

The physical storage is divided into named regions based on application usage in some embodiments. The NVRAM 1604 is a contiguous block of reserved memory in the non-volatile solid state storage 1552 DRAM 1616, and is backed by NAND flash. NVRAM 1604 is logically divided into multiple memory regions written for two as spool (e.g., spool_region). Space within the NVRAM 1604 spools is managed by each authority 1568 independently. Each device provides an amount of storage space to each authority 1568. That authority 1568 further manages lifetimes and allocations within that space. Examples of a spool include distributed transactions or notions. When the primary power to a non-volatile solid state storage 1552 unit fails, onboard super-capacitors provide a short duration of power hold up. During this holdup interval, the contents of the NVRAM 1604 are flushed to flash memory 1606. On the next power-on, the contents of the NVRAM 1604 are recovered from the flash memory 1606.

As for the storage unit controller, the responsibility of the logical "controller" is distributed across each of the blades containing authorities 1568. This distribution of logical control is shown in FIG. 16D as a host controller 1642, mid-tier controller 1644 and storage unit controller(s) 1646. Management of the control plane and the storage plane are treated independently, although parts may be physically co-located on the same blade. Each authority 1568 effectively serves as an independent controller. Each authority 1568 provides its own data and metadata structures, its own background workers, and maintains its own lifecycle.

Figure 16E:
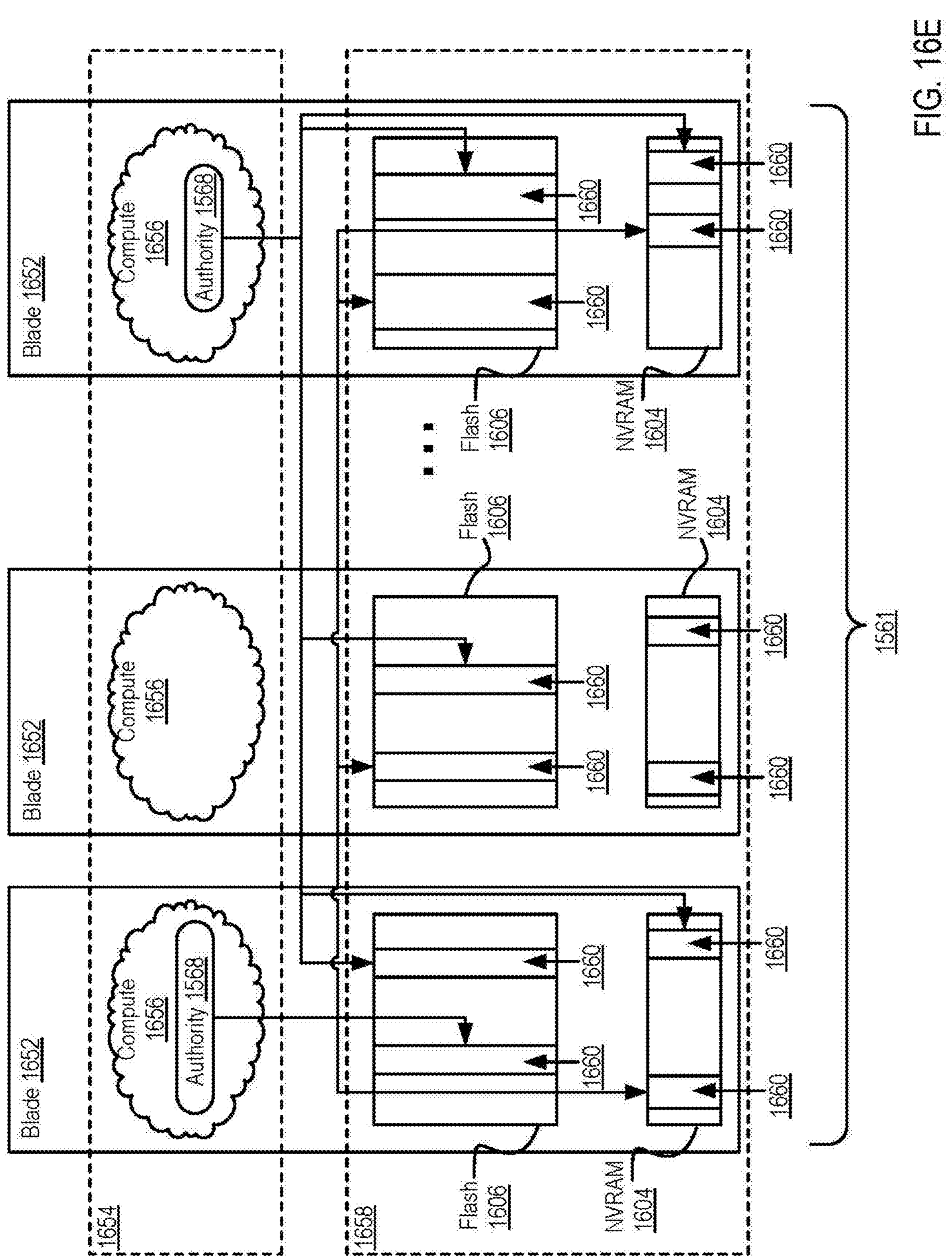
FIG. 16E is a blade hardware block diagram, showing a control plane, compute and storage planes, and authorities interacting with underlying physical resources.

FIG. 16E is a blade 1652 hardware block diagram, showing a control plane 1654, compute and storage planes 1656, 1658, and authorities 1568 interacting with underlying physical resources, using embodiments of the storage nodes 1550 and storage units 1552 of FIGS. 16A-C in the storage server environment of FIG. 16D. The control plane 1654 is partitioned into a number of authorities 1568 which can use the compute resources in the compute plane 1656 to run on any of the blades 1652. The storage plane 1658 is partitioned into a set of devices, each of which provides access to flash 1606 and NVRAM 1604 resources. In one embodiment, the compute plane 1656 may perform the operations of a storage array controller, as described herein, on one or more devices of the storage plane 1658 (e.g., a storage array).

In the compute and storage planes 1656, 1658 of FIG. 16E, the authorities 1568 interact with the underlying physical resources (i.e., devices). From the point of view of an authority 1568, its resources are striped over all of the physical devices. From the point of view of a device, it provides resources to all authorities 1568, irrespective of where the authorities happen to run. Each authority 1568 has allocated or has been allocated one or more partitions 1660 of storage memory in the storage units 1552, e.g., partitions 1660 in flash memory 1606 and NVRAM 1604. Each authority 1568 uses those allocated partitions 1660 that belong to it, for writing or reading user data. Authorities can be associated with differing amounts of physical storage of the system. For example, one authority 1568 could have a larger number of partitions 1660 or larger sized partitions 1660 in one or more storage units 1552 than one or more other authorities 1568.

Figure 16F:
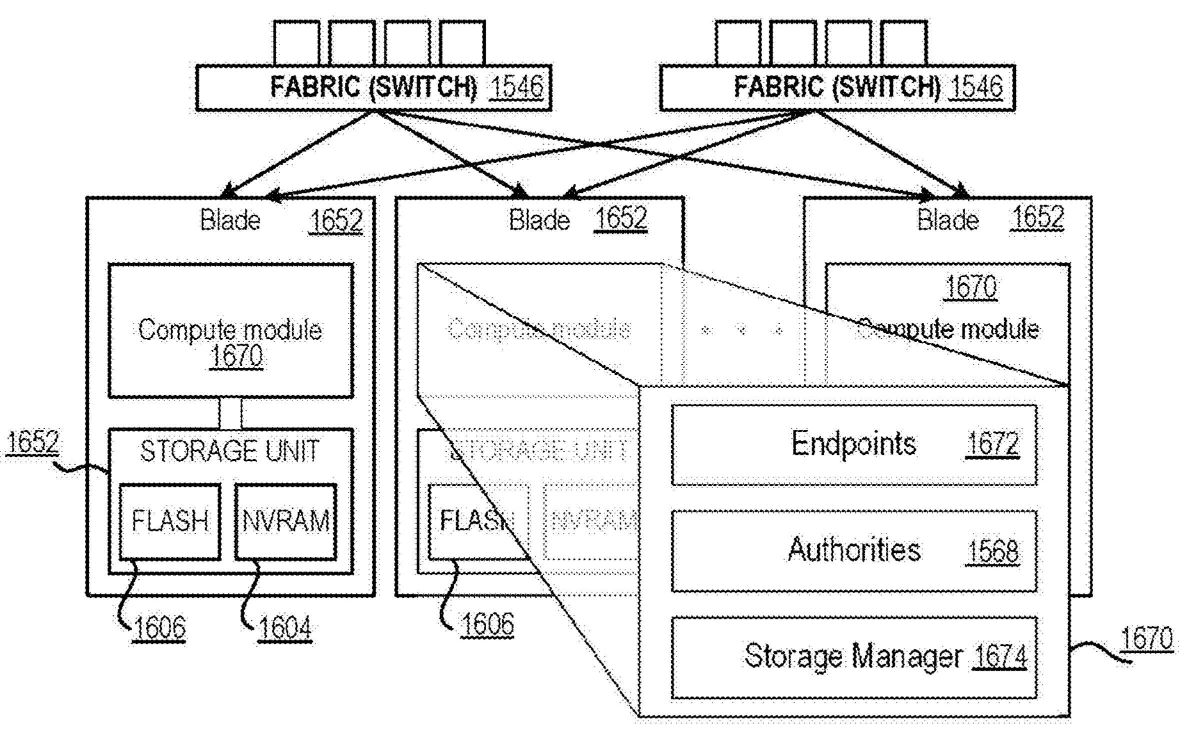
FIG. 16F depicts elasticity software layers in blades of a storage cluster.

FIG. 16F depicts elasticity software layers in blades 1652 of a storage cluster, in accordance with some embodiments. In the elasticity structure, elasticity software is symmetric, i.e., each blade's compute module 1670 runs the three identical layers of processes depicted in FIG. 16F. Storage managers 1674 execute read and write requests from other blades 1652 for data and metadata stored in local storage unit 1552 NVRAM 1604 and flash 1606. Authorities 1568 fulfill client requests by issuing the necessary reads and writes to the blades 1652 on whose storage units 1552 the corresponding data or metadata resides. Endpoints 1672 parse client connection requests received from switch fabric 1546 supervisory software, relay the client connection requests to the authorities 1568 responsible for fulfillment, and relay the authorities' 1568 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 16F, authorities 1568 running in the compute modules 1670 of a blade 1652 perform the internal operations required to fulfill client requests. One feature of elasticity is that authorities 1568 are stateless, i.e., they cache active data and metadata in their own blades' 1652 DRAMs for fast access, but the authorities store every update in their NVRAM 1604 partitions on three separate blades 1652 until the update has been written to flash 1606. All the storage system writes to NVRAM 1604 are in triplicate to partitions on three separate blades 1652 in some embodiments. With triple-mirrored NVRAM 1604 and persistent storage protected by parity and Reed-Solomon RAID checksums, the storage system can survive concurrent failure of two blades 1652 with no loss of data, metadata, or access to either.

Because authorities 1568 are stateless, they can migrate between blades 1652. Each authority 1568 has a unique identifier. NVRAM 1604 and flash 1606 partitions are associated with authorities' 1568 identifiers, not with the blades 1652 on which they are running in some. Thus, when an authority 1568 migrates, the authority 1568 continues to manage the same storage partitions from its new location. When a new blade 1652 is installed in an embodiment of the storage cluster, the system automatically rebalances load by: partitioning the new blade's 1652 storage for use by the system's authorities 1568, migrating selected authorities 1568 to the new blade 1652, starting endpoints 1672 on the new blade 1652 and including them in the switch fabric's 1546 client connection distribution algorithm.

From their new locations, migrated authorities 1568 persist the contents of their NVRAM 1604 partitions on flash 1606, process read and write requests from other authorities 1568, and fulfill the client requests that endpoints 1672 direct to them. Similarly, if a blade 1652 fails or is removed, the system redistributes its authorities 1568 among the system's remaining blades 1652. The redistributed authorities 1568 continue to perform their original functions from their new locations.

Figure 16G:
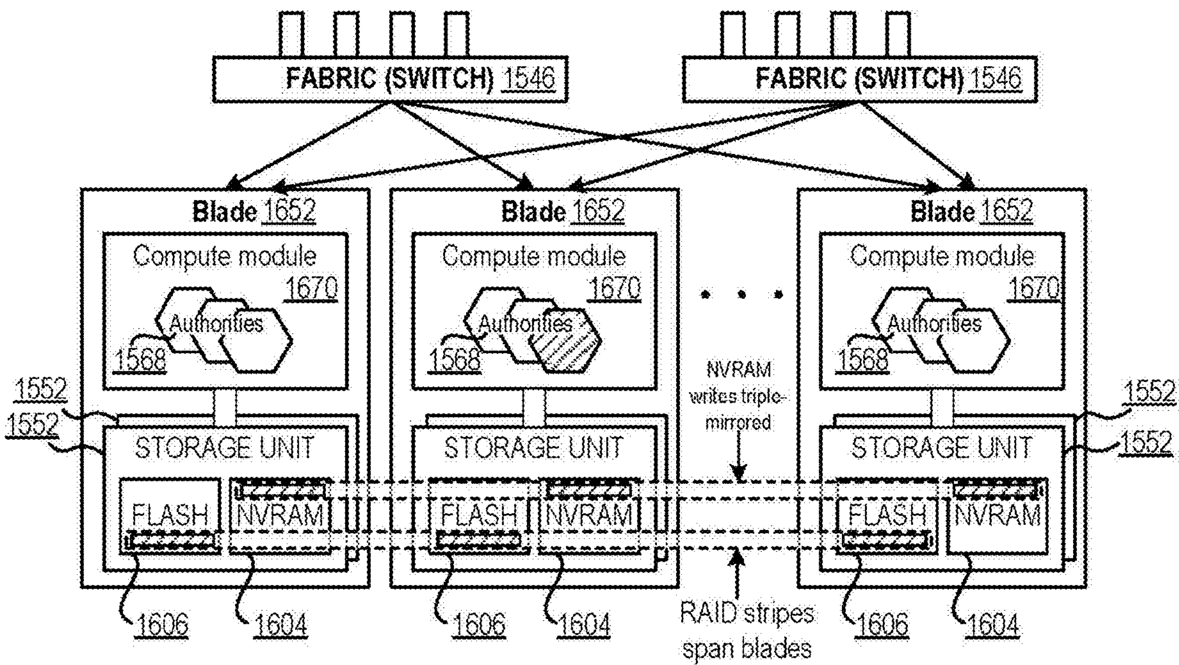
FIG. 16G depicts authorities and storage resources in blades of a storage cluster.

FIG. 16G depicts authorities 1568 and storage resources in blades 1652 of a storage cluster, in accordance with some embodiments. Each authority 1568 is exclusively responsible for a partition of the flash 1606 and NVRAM 1604 on each blade 1652. The authority 1568 manages the content and integrity of its partitions independently of other authorities 1568. Authorities 1568 compress incoming data and preserve it temporarily in their NVRAM 1604 partitions, and then consolidate, RAID-protect, and persist the data in segments of the storage in their flash 1606 partitions. As the authorities 1568 write data to flash 1606, storage managers 1674 perform the necessary flash translation to optimize write performance and maximize media longevity. In the background, authorities 1568 "garbage collect," or reclaim space occupied by data that clients have made obsolete by overwriting the data. It should be appreciated that since authorities' 1568 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 17A:
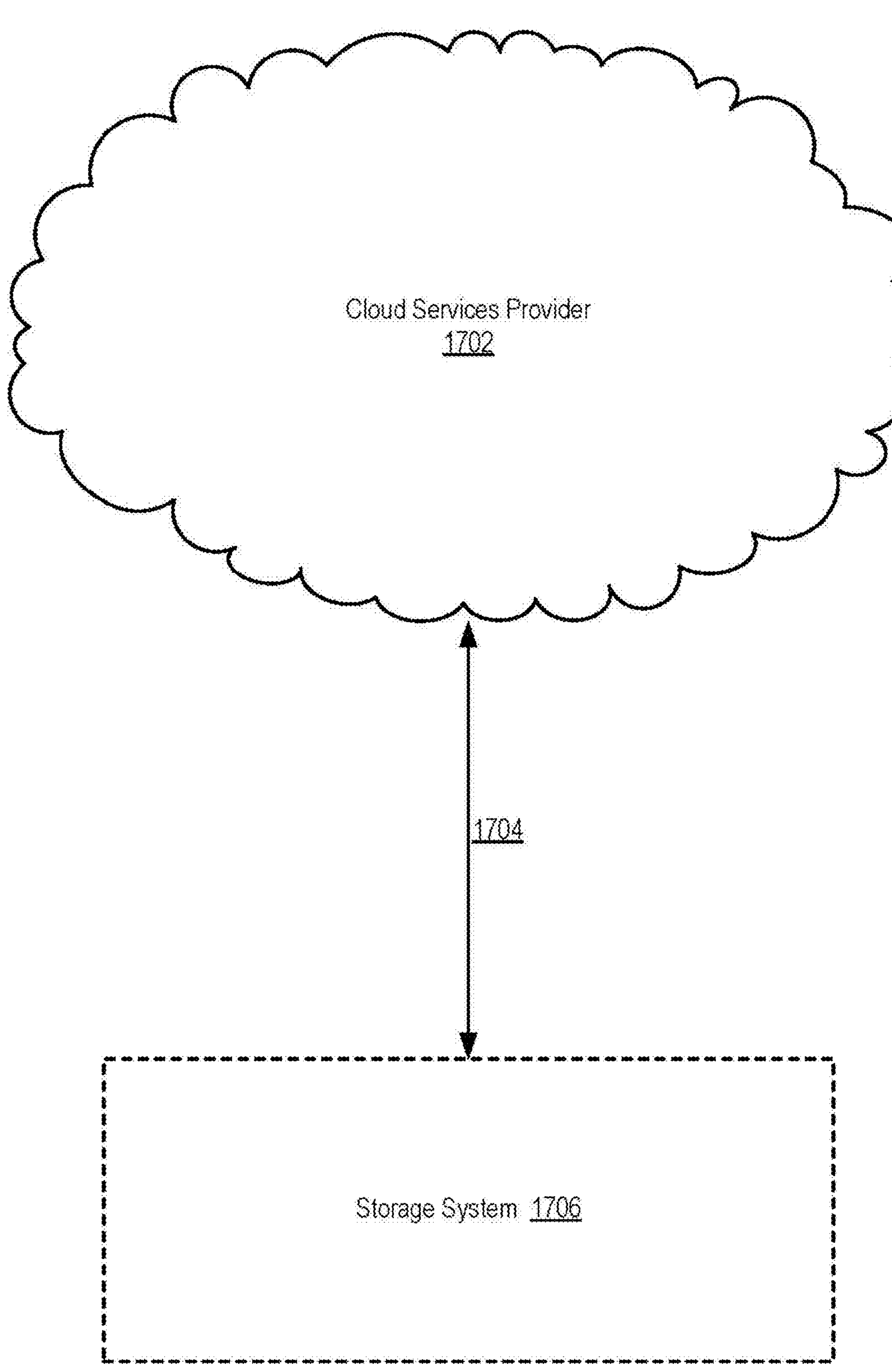
FIG. 17A sets forth a diagram of a storage system that is coupled for data communications with a cloud services provider.

FIG. 17A sets forth a diagram of a storage system 1706 that is coupled for data communications with a cloud services provider 1702 in accordance with some embodiments of the present disclosure. Although depicted in less detail, the storage system 1706 depicted in FIG. 17A may be similar to the storage systems described above with reference to FIGS. 15A-ID and FIGS. 16A-16G. In some embodiments, the storage system 1706 depicted in FIG. 17A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 17A, the storage system 1706 is coupled to the cloud services provider 1702 via a data communications link 1704. The data communications link 1704 may be embodied as a dedicated data communications link, as a data communications pathway that is provided through the use of one or more data communications networks such as a wide area network ('WAN') or LAN, or as some other mechanism capable of transporting digital information between the storage system 1706 and the cloud services provider 1702. Such a data communications link 1704 may be fully wired, fully wireless, or some aggregation of wired and wireless data communications pathways. In such an example, digital information may be exchanged between the storage system 1706 and the cloud services provider 1702 via the data communications link 1704 using one or more data communications protocols. For example, digital information may be exchanged between the storage system 1706 and the cloud services provider 1702 via the data communications link 1704 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 1702 depicted in FIG. 17A may be embodied, for example, as a system and computing environment that provides a vast array of services to users of the cloud services provider 1702 through the sharing of computing resources via the data communications link 1704. The cloud services provider 1702 may provide on-demand access to a shared pool of configurable computing resources such as computer networks, servers, storage, applications and services, and so on. The shared pool of configurable resources may be rapidly provisioned and released to a user of the cloud services provider 1702 with minimal management effort. Generally, the user of the cloud services provider 1702 is unaware of the exact computing resources utilized by the cloud services provider 1702 to provide the services. Although in many cases such a cloud services provider 1702 may be accessible via the Internet, readers of skill in the art will recognize that any system that abstracts the use of shared resources to provide services to a user through any data communications link may be considered a cloud services provider 1702.

In the example depicted in FIG. 17A, the cloud services provider 1702 may be configured to provide a variety of services to the storage system 1706 and users of the storage system 1706 through the implementation of various service models. For example, the cloud services provider 1702 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 1702 offers access to its storage infrastructure for use by the storage system 1706 and users of the storage system 1706, and so on. Readers will appreciate that the cloud services provider 1702 may be configured to provide additional services to the storage system 1706 and users of the storage system 1706 through the implementation of additional service models, as the service models described above are included only for explanatory purposes and in no way represent a limitation of the services that may be offered by the cloud services provider 1702 or a limitation as to the service models that may be implemented by the cloud services provider 1702.

In the example depicted in FIG. 17A, the cloud services provider 1702 may be embodied, for example, as a private cloud, as a public cloud, or as a combination of a private cloud and public cloud. In an embodiment in which the cloud services provider 1702 is embodied as a private cloud, the cloud services provider 1702 may be dedicated to providing services to a single organization rather than providing services to multiple organizations. In an embodiment where the cloud services provider 1702 is embodied as a public cloud, the cloud services provider 1702 may provide services to multiple organizations. In still alternative embodiments, the cloud services provider 1702 may be embodied as a mix of a private and public cloud services with a hybrid cloud deployment.

Although not explicitly depicted in FIG. 17A, readers will appreciate that a vast amount of additional hardware components and additional software components may be necessary to facilitate the delivery of cloud services to the storage system 1706 and users of the storage system 1706. For example, the storage system 1706 may be coupled to (or even include) a cloud storage gateway. Such a cloud storage gateway may be embodied, for example, as hardware-based or software-based appliance that is located on premises with the storage system 1706. Such a cloud storage gateway may operate as a bridge between local applications that are executing on the storage system 1706 and remote, cloud-based storage that is utilized by the storage system 1706. Through the use of a cloud storage gateway, organizations may move primary iSCSI or NAS to the cloud services provider 1702, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 1702.

In order to enable the storage system 1706 and users of the storage system 1706 to make use of the services provided by the cloud services provider 1702, a cloud migration process may take place during which data, applications, or other elements from an organization's local systems (or even from another cloud environment) are moved to the cloud services provider 1702. In order to successfully migrate data, applications, or other elements to the cloud services provider's 1702 environment, middleware such as a cloud migration tool may be utilized to bridge gaps between the cloud services provider's 1702 environment and an organization's environment. Such cloud migration tools may also be configured to address potentially high network costs and long transfer times associated with migrating large volumes of data to the cloud services provider 1702, as well as addressing security concerns associated with sensitive data to the cloud services provider 1702 over data communications networks. In order to further enable the storage system 1706 and users of the storage system 1706 to make use of the services provided by the cloud services provider 1702, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 17A, and as described briefly above, the cloud services provider 1702 may be configured to provide services to the storage system 1706 and users of the storage system 1706 through the usage of a SaaS service model, eliminating the need to install and run the application on local computers, which may simplify maintenance and support of the application. Such applications may take many forms in accordance with various embodiments of the present disclosure. For example, the cloud services provider 1702 may be configured to provide access to data analytics applications to the storage system 1706 and users of the storage system 1706. Such data analytics applications may be configured, for example, to receive vast amounts of telemetry data phoned home by the storage system 1706. Such telemetry data may describe various operating characteristics of the storage system 1706 and may be analyzed for a vast array of purposes including, for example, to determine the health of the storage system 1706, to identify workloads that are executing on the storage system 1706, to predict when the storage system 1706 will run out of various resources, to recommend configuration changes, hardware or software upgrades, workflow migrations, or other actions that may improve the operation of the storage system 1706.

The cloud services provider 1702 may also be configured to provide access to virtualized computing environments to the storage system 1706 and users of the storage system 1706. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Although the example depicted in FIG. 17A illustrates the storage system 1706 being coupled for data communications with the cloud services provider 1702, in other embodiments the storage system 1706 may be part of a hybrid cloud deployment in which private cloud elements (e.g., private cloud services, on-premises infrastructure, and so on) and public cloud elements (e.g., public cloud services, infrastructure, and so on that may be provided by one or more cloud services providers) are combined to form a single solution, with orchestration among the various platforms. Such a hybrid cloud deployment may leverage hybrid cloud management software such as, for example, Azure™ Arc from Microsoft™, that centralize the management of the hybrid cloud deployment to any infrastructure and enable the deployment of services anywhere. In such an example, the hybrid cloud management software may be configured to create, update, and delete resources (both physical and virtual) that form the hybrid cloud deployment, to allocate compute and storage to specific workloads, to monitor workloads and resources for performance, policy compliance, updates and patches, security status, or to perform a variety of other tasks.

Readers will appreciate that by pairing the storage systems described herein with one or more cloud services providers, various offerings may be enabled. For example, disaster recovery as a service ('DRaaS') may be provided where cloud resources are utilized to protect applications and data from disruption caused by disaster, including in embodiments where the storage systems may serve as the primary data store. In such embodiments, a total system backup may be taken that allows for business continuity in the event of system failure. In such embodiments, cloud data backup techniques (by themselves or as part of a larger DraaS solution) may also be integrated into an overall solution that includes the storage systems and cloud services providers described herein.

The storage systems described herein, as well as the cloud services providers, may be utilized to provide a wide array of security features. For example, the storage systems may encrypt data at rest (and data may be sent to and from the storage systems encrypted) and may make use of Key Management-as-a-Service ('KmaaS') to manage encryption keys, keys for locking and unlocking storage devices, and so on. Likewise, cloud data security gateways or similar mechanisms may be utilized to ensure that data stored within the storage systems does not improperly end up being stored in the cloud as part of a cloud data backup operation. Furthermore, microsegmentation or identity-based-segmentation may be utilized in a data center that includes the storage systems or within the cloud services provider, to create secure zones in data centers and cloud deployments that enables the isolation of workloads from one another.

Figure 17B:
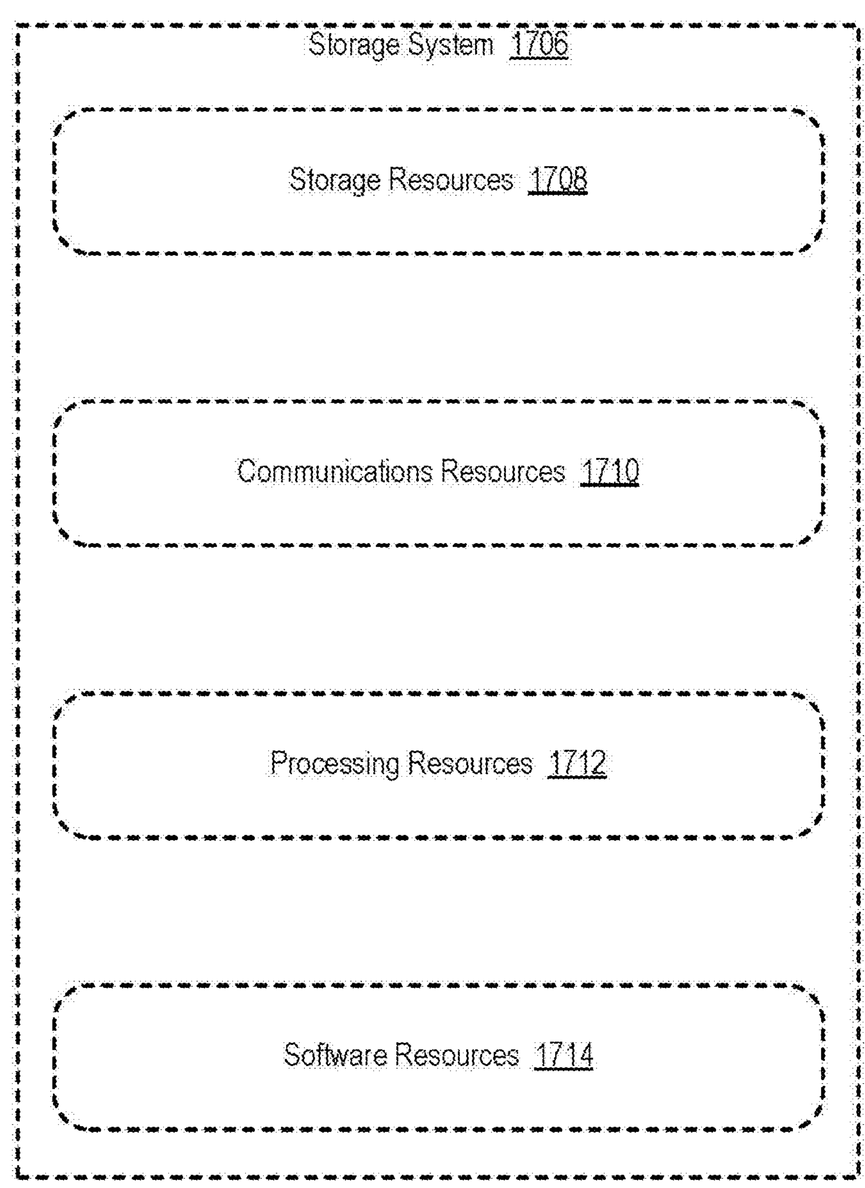
FIG. 17B sets forth a diagram of a storage system.

For further explanation, FIG. 17B sets forth a diagram of a storage system 1706 in accordance with some embodiments of the present disclosure. Although depicted in less detail, the storage system 1706 depicted in FIG. 17B may be similar to the storage systems described above with reference to FIGS. 15A-1D and FIGS. 16A-16G as the storage system may include many of the components described above.

The storage system 1706 depicted in FIG. 17B may include a vast amount of storage resources 1708, which may be embodied in many forms. For example, the storage resources 1708 can include nano-RAM or another form of nonvolatile random access memory that utilizes carbon nanotubes deposited on a substrate, 17D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 1708 may include non-volatile magnetoresistive random-access memory ('MRAM'), including spin transfer torque ('STT') MRAM. The example storage resources 1708 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 1708 depicted in FIG. 17A may be embodied in a variety of form factors, including but not limited to, dual in-line memory modules ('DIMMs'), non-volatile dual in-line memory modules ('NVDIMMs'), M.2, U.2, and others.

The storage resources 1708 depicted in FIG. 17B may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D Xpoint, Intel Memory Drive Technology, Samsung's Z-SSD, and others.

The storage resources 1708 depicted in FIG. 17B may also include racetrack memory (also referred to as domain-wall memory). Such racetrack memory may be embodied as a form of non-volatile, solid-state memory that relies on the intrinsic strength and orientation of the magnetic field created by an electron as it spins in addition to its electronic charge, in solid-state devices. Through the use of spin-coherent electric current to move magnetic domains along a nanoscopic permalloy wire, the domains may pass by magnetic read/write heads positioned near the wire as current is passed through the wire, which alter the domains to record patterns of bits. In order to create a racetrack memory device, many such wires and read/write elements may be packaged together.

The example storage system 1706 depicted in FIG. 17B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 1706 depicted in FIG. 17B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The example storage system 1706 depicted in FIG. 17B may leverage the storage resources described above in a variety of different ways. For example, some portion of the storage resources may be utilized to serve as a write cache, storage resources within the storage system may be utilized as a read cache, or tiering may be achieved within the storage systems by placing data within the storage system in accordance with one or more tiering policies.

The storage system 1706 depicted in FIG. 17B also includes communications resources 1710 that may be useful in facilitating data communications between components within the storage system 1706, as well as data communications between the storage system 1706 and computing devices that are outside of the storage system 1706, including embodiments where those resources are separated by a relatively vast expanse. The communications resources 1710 may be configured to utilize a variety of different protocols and data communication fabrics to facilitate data communications between components within the storage systems as well as computing devices that are outside of the storage system. For example, the communications resources 1710 can include fibre channel ('FC') technologies such as FC fabrics and FC protocols that can transport SCSI commands over FC network, FC over ethernet ('FcoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 1710 can also include mechanisms for accessing storage resources 1708 within the storage system 1706 utilizing serial attached SCSI ('SAS'), serial ATA ('SATA') bus interfaces for connecting storage resources 1708 within the storage system 1706 to host bus adapters within the storage system 1706, internet small computer systems interface ('iSCSI') technologies to provide block-level access to storage resources 1708 within the storage system 1706, and other communications resources that may be useful in facilitating data communications between components within the storage system 1706, as well as data communications between the storage system 1706 and computing devices that are outside of the storage system 1706.

The storage system 1706 depicted in FIG. 17B also includes processing resources 1712 that may be useful in executing computer program instructions and performing other computational tasks within the storage system 1706. The processing resources 1712 may include one or more ASICs that are customized for some particular purpose as well as one or more CPUs. The processing resources 1712 may also include one or more DSPs, one or more FPGAs, one or more systems on a chip ('SoCs'), or other form of processing resources 1712. The storage system 1706 may utilize the storage resources 1712 to perform a variety of tasks including, but not limited to, supporting the execution of software resources 1714 that will be described in greater detail herein.

The storage system 1706 depicted in FIG. 17B also includes software resources 1714 that, when executed by processing resources 1712 within the storage system 1706, may perform a vast array of tasks. The software resources 1714 may include, for example, one or more modules of computer program instructions that when executed by processing resources 1712 within the storage system 1706 are useful in carrying out various data protection techniques. Such data protection techniques may be carried out, for example, by system software executing on computer hardware within the storage system, by a cloud services provider, or in other ways. Such data protection techniques can include data archiving, data backup, data replication, data snapshotting, data and database cloning, and other data protection techniques.

The software resources 1714 may also include software that is useful in implementing software-defined storage ('SDS'). In such an example, the software resources 1714 may include one or more modules of computer program instructions that, when executed, are useful in policy-based provisioning and management of data storage that is independent of the underlying hardware. Such software resources 1714 may be useful in implementing storage virtualization to separate the storage hardware from the software that manages the storage hardware.

The software resources 1714 may also include software that is useful in facilitating and optimizing I/O operations that are directed to the storage system 1706. For example, the software resources 1714 may include software modules that perform various data reduction techniques such as, for example, data compression, data deduplication, and others. The software resources 1714 may include software modules that intelligently group together I/O operations to facilitate better usage of the underlying storage resource 1708, software modules that perform data migration operations to migrate from within a storage system, as well as software modules that perform other functions. Such software resources 1714 may be embodied as one or more software containers or in many other ways.

Figure 17C:
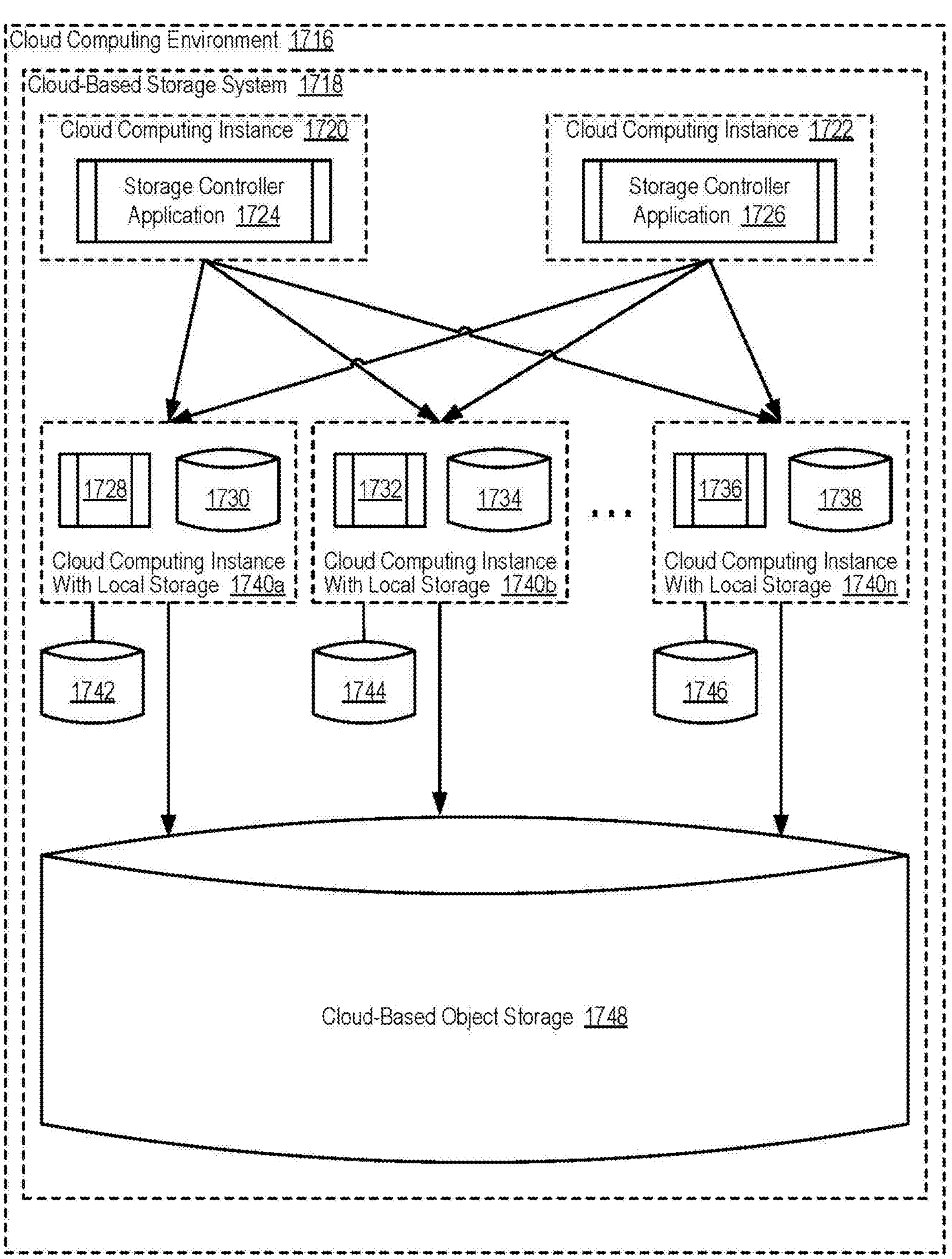
FIG. 17C sets forth an example of a cloud-based storage system.

For further explanation, FIG. 17C sets forth an example of a cloud-based storage system 1718 in accordance with some embodiments of the present disclosure. In the example depicted in FIG. 17C, the cloud-based storage system 1718 is created entirely in a cloud computing environment 1716 such as, for example, Amazon Web Services ('AWS')™, Microsoft Azure™, Google Cloud Platform™, IBM Cloud™, Oracle Cloud™, and others. The cloud-based storage system 1718 may be used to provide services similar to the services that may be provided by the storage systems described above.

The cloud-based storage system 1718 depicted in FIG. 17C includes two cloud computing instances 1720, 1722 that each are used to support the execution of a storage controller application 1724, 1726. The cloud computing instances 1720, 1722 may be embodied, for example, as instances of cloud computing resources (e.g., virtual machines) that may be provided by the cloud computing environment 1716 to support the execution of software applications such as the storage controller application 1724, 1726. For example, each of the cloud computing instances 1720, 1722 may execute on an Azure VM, where each Azure VM may include high speed temporary storage that may be leveraged as a cache (e.g., as a read cache). In one embodiment, the cloud computing instances 1720, 1722 may be embodied as Amazon Elastic Compute Cloud ('EC2') instances. In such an example, an Amazon Machine Image ('AMI') that includes the storage controller application 1724, 1726 may be booted to create and configure a virtual machine that may execute the storage controller application 1724, 1726.

In the example method depicted in FIG. 17C, the storage controller application 1724, 1726 may be embodied as a module of computer program instructions that, when executed, carries out various storage tasks. For example, the storage controller application 1724, 1726 may be embodied as a module of computer program instructions that, when executed, carries out the same tasks as the controllers 1510A, 1510B in FIG. 15A described above such as writing data to the cloud-based storage system 1718, erasing data from the cloud-based storage system 1718, retrieving data from the cloud-based storage system 1718, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 1720, 1722 that each include the storage controller application 1724, 1726, in some embodiments one cloud computing instance 1720 may operate as the primary controller as described above while the other cloud computing instance 1722 may operate as the secondary controller as described above. Readers will appreciate that the storage controller application 1724, 1726 depicted in FIG. 17C may include identical source code that is executed within different cloud computing instances 1720, 1722 such as distinct EC2 instances.

Readers will appreciate that other embodiments that do not include a primary and secondary controller are within the scope of the present disclosure. For example, each cloud computing instance 1720, 1722 may operate as a primary controller for some portion of the address space supported by the cloud-based storage system 1718, each cloud computing instance 1720, 1722 may operate as a primary controller where the servicing of I/O operations directed to the cloud-based storage system 1718 are divided in some other way, and so on. In fact, in other embodiments where costs savings may be prioritized over performance demands, only a single cloud computing instance may exist that contains the storage controller application.

The cloud-based storage system 1718 depicted in FIG. 17C includes cloud computing instances 1740*a*, 1740*b*, 1740*n* with local storage 1730, 1734, 1738. The cloud computing instances 1740*a*, 1740*b*, 1740*n* may be embodied, for example, as instances of cloud computing resources that may be provided by the cloud computing environment 1716 to support the execution of software applications. The cloud computing instances 1740*a*, 1740*b*, 1740*n* of FIG. 17C may differ from the cloud computing instances 1720, 1722 described above as the cloud computing instances 1740*a*, 1740*b*, 1740*n* of FIG. 17C have local storage 1730, 1734, 1738 resources whereas the cloud computing instances 1720, 1722 that support the execution of the storage controller application 1724, 1726 need not have local storage resources. The cloud computing instances 1740*a*, 1740*b*, 1740*n* with local storage 1730, 1734, 1738 may be embodied, for example, as EC2 M5 instances that include one or more SSDs, as EC2 R5 instances that include one or more SSDs, as EC2 I3 instances that include one or more SSDs, and so on. In some embodiments, the local storage 1730, 1734, 1738 must be embodied as solid-state storage (e.g., SSDs) rather than storage that makes use of hard disk drives.

In the example depicted in FIG. 17C, each of the cloud computing instances 1740*a*, 1740*b*, 1740*n* with local storage 1730, 1734, 1738 can include a software daemon 1728, 1732, 1736 that, when executed by a cloud computing instance 1740*a*, 1740*b*, 1740*n* can present itself to the storage controller applications 1724, 1726 as if the cloud computing instance 1740*a*, 1740*b*, 1740*n* were a physical storage device (e.g., one or more SSDs). In such an example, the software daemon 1728, 1732, 1736 may include computer program instructions similar to those that would normally be contained on a storage device such that the storage controller applications 1724, 1726 can send and receive the same commands that a storage controller would send to storage devices. In such a way, the storage controller applications 1724, 1726 may include code that is identical to (or substantially identical to) the code that would be executed by the controllers in the storage systems described above. In these and similar embodiments, communications between the storage controller applications 1724, 1726 and the cloud computing instances 1740*a*, 1740*b*, 1740*n* with local storage 1730, 1734, 1738 may utilize iSCSI, NVMe over TCP, messaging, a custom protocol, or in some other mechanism.

In the example depicted in FIG. 17C, each of the cloud computing instances 1740*a*, 1740*b*, 1740*n* with local storage 1730, 1734, 1738 may also be coupled to block storage 1742, 1744, 1746 that is offered by the cloud computing environment 1716 such as, for example, as Amazon Elastic Block Store ('EBS') volumes. In such an example, the block storage 1742, 1744, 1746 that is offered by the cloud computing environment 1716 may be utilized in a manner that is similar to how the NVRAM devices described above are utilized, as the software daemon 1728, 1732, 1736 (or some other module) that is executing within a particular cloud computing instance 1740*a*, 1740*b*, 1740*n* may, upon receiving a request to write data, initiate a write of the data to its attached EBS volume as well as a write of the data to its local storage 1730, 1734, 1738 resources. In some alternative embodiments, data may only be written to the local storage 1730, 1734, 1738 resources within a particular cloud computing instance 1740*a*, 1740*b*, 1740*n*. In an alternative embodiment, rather than using the block storage 1742, 1744, 1746 that is offered by the cloud computing environment 1716 as NVRAM, actual RAM on each of the cloud computing instances 1740*a*, 1740*b*, 1740*n* with local storage 1730, 1734, 1738 may be used as NVRAM, thereby decreasing network utilization costs that would be associated with using an EBS volume as the NVRAM. In yet another embodiment, high performance block storage resources such as one or more Azure Ultra Disks may be utilized as the NVRAM.

The storage controller applications 1724, 1726 may be used to perform various tasks such as deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 1740*a*, 1740*b*, 1740*n* with local storage 1730, 1734, 1738. Either cloud computing instance 1720, 1722, in some embodiments, may receive a request to read data from the cloud-based storage system 1718 and may ultimately send a request to read data to one or more of the cloud computing instances 1740*a*, 1740*b*, 1740*n* with local storage 1730, 1734, 1738.

When a request to write data is received by a particular cloud computing instance 1740*a*, 1740*b*, 1740*n* with local storage 1730, 1734, 1738, the software daemon 1728, 1732, 1736 may be configured to not only write the data to its own local storage 1730, 1734, 1738 resources and any appropriate block storage 1742, 1744, 1746 resources, but the software daemon 1728, 1732, 1736 may also be configured to write the data to cloud-based object storage 1748 that is attached to the particular cloud computing instance 1740*a*, 1740*b*, 1740*n*. The cloud-based object storage 1748 that is attached to the particular cloud computing instance 1740*a*, 1740*b*, 1740*n* may be embodied, for example, as Amazon Simple Storage Service ('S3'). In other embodiments, the cloud computing instances 1720, 1722 that each include the storage controller application 1724, 1726 may initiate the storage of the data in the local storage 1730, 1734, 1738 of the cloud computing instances 1740*a*, 1740*b*, 1740*n* and the cloud-based object storage 1748. In other embodiments, rather than using both the cloud computing instances 1740*a*, 1740*b*, 1740*n* with local storage 1730, 1734, 1738 (also referred to herein as 'virtual drives') and the cloud-based object storage 1748 to store data, a persistent storage layer may be implemented in other ways. For example, one or more Azure Ultra disks may be used to persistently store data (e.g., after the data has been written to the NVRAM layer).

While the local storage 1730, 1734, 1738 resources and the block storage 1742, 1744, 1746 resources that are utilized by the cloud computing instances 1740*a*, 1740*b*, 1740*n* may support block-level access, the cloud-based object storage 1748 that is attached to the particular cloud computing instance 1740*a*, 1740*b*, 1740*n* supports only object-based access. The software daemon 1728, 1732, 1736 may therefore be configured to take blocks of data, package those blocks into objects, and write the objects to the cloud-based object storage 1748 that is attached to the particular cloud computing instance 1740*a*, 1740*b*, 1740*n*.

Consider an example in which data is written to the local storage 1730, 1734, 1738 resources and the block storage 1742, 1744, 1746 resources that are utilized by the cloud computing instances 1740*a*, 1740*b*, 1740*n* in 1 MB blocks. In such an example, assume that a user of the cloud-based storage system 1718 issues a request to write data that, after being compressed and deduplicated by the storage controller application 1724, 1726 results in the need to write 5 MB of data. In such an example, writing the data to the local storage 1730, 1734, 1738 resources and the block storage 1742, 1744, 1746 resources that are utilized by the cloud computing instances 1740*a*, 1740*b*, 1740*n* is relatively straightforward as 5 blocks that are 1 MB in size are written to the local storage 1730, 1734, 1738 resources and the block storage 1742, 1744, 1746 resources that are utilized by the cloud computing instances 1740*a*, 1740*b*, 1740*n*. In such an example, the software daemon 1728, 1732, 1736 may also be configured to create five objects containing distinct 1 MB chunks of the data. As such, in some embodiments, each object that is written to the cloud-based object storage 1748 may be identical (or nearly identical) in size. Readers will appreciate that in such an example, metadata that is associated with the data itself may be included in each object (e.g., the first 1 MB of the object is data and the remaining portion is metadata associated with the data). Readers will appreciate that the cloud-based object storage 1748 may be incorporated into the cloud-based storage system 1718 to increase the durability of the cloud-based storage system 1718.

In some embodiments, all data that is stored by the cloud-based storage system 1718 may be stored in both: 1) the cloud-based object storage 1748, and 2) at least one of the local storage 1730, 1734, 1738 resources or block storage 1742, 1744, 1746 resources that are utilized by the cloud computing instances 1740*a*, 1740*b*, 1740*n*. In such embodiments, the local storage 1730, 1734, 1738 resources and block storage 1742, 1744, 1746 resources that are utilized by the cloud computing instances 1740*a*, 1740*b*, 1740*n* may effectively operate as cache that generally includes all data that is also stored in S3, such that all reads of data may be serviced by the cloud computing instances 1740*a*, 1740*b*, 1740*n* without requiring the cloud computing instances 1740*a*, 1740*b*, 1740*n* to access the cloud-based object storage 1748. Readers will appreciate that in other embodiments, however, all data that is stored by the cloud-based storage system 1718 may be stored in the cloud-based object storage 1748, but less than all data that is stored by the cloud-based storage system 1718 may be stored in at least one of the local storage 1730, 1734, 1738 resources or block storage 1742, 1744, 1746 resources that are utilized by the cloud computing instances 1740*a*, 1740*b*, 1740*n*. In such an example, various policies may be utilized to determine which subset of the data that is stored by the cloud-based storage system 1718 should reside in both: 1) the cloud-based object storage 1748, and 2) at least one of the local storage 1730, 1734, 1738 resources or block storage 1742, 1744, 1746 resources that are utilized by the cloud computing instances 1740*a*, 1740*b*, 1740*n*.

One or more modules of computer program instructions that are executing within the cloud-based storage system 1718 (e.g., a monitoring module that is executing on its own EC2 instance) may be designed to handle the failure of one or more of the cloud computing instances 1740*a*, 1740*b*, 1740*n* with local storage 1730, 1734, 1738. In such an example, the monitoring module may handle the failure of one or more of the cloud computing instances 1740*a*, 1740*b*, 1740*n* with local storage 1730, 1734, 1738 by creating one or more new cloud computing instances with local storage, retrieving data that was stored on the failed cloud computing instances 1740*a*, 1740*b*, 1740*n* from the cloud-based object storage 1748, and storing the data retrieved from the cloud-based object storage 1748 in local storage on the newly created cloud computing instances. Readers will appreciate that many variants of this process may be implemented.

Readers will appreciate that various performance aspects of the cloud-based storage system 1718 may be monitored (e.g., by a monitoring module that is executing in an EC2 instance) such that the cloud-based storage system 1718 can be scaled-up or scaled-out as needed. For example, if the cloud computing instances 1720, 1722 that are used to support the execution of a storage controller application 1724, 1726 are undersized and not sufficiently servicing the I/O requests that are issued by users of the cloud-based storage system 1718, a monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 1720, 1722 that are used to support the execution of a storage controller application 1724, 1726 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 1714 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 1714 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 1714 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described in this disclosure may be useful for supporting various types of software applications. In fact, the storage systems may be 'application aware' in the sense that the storage systems may obtain, maintain, or otherwise have access to information describing connected applications (e.g., applications that utilize the storage systems) to optimize the operation of the storage system based on intelligence about the applications and their utilization patterns. For example, the storage system may optimize data layouts, optimize caching behaviors, optimize 'QoS' levels, or perform some other optimization that is designed to improve the storage performance that is experienced by the application.

As an example of one type of application that may be supported by the storage systems described herein, the storage system 1706 may be useful in supporting artificial intelligence ('AI') applications, database applications, Xops projects (e.g., DevOps projects, DataOps projects, MLOps projects, ModelOps projects, PlatformOps projects), electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson™, Microsoft Oxford™, Google DeepMind™, Baidu Minwa™, and others.

The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks, including the development of multi-layer neural networks, have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

In order for the storage systems described above to serve as a data hub or as part of an AI deployment, in some embodiments the storage systems may be configured to provide DMA between storage devices that are included in the storage systems and one or more GPUs that are used in an AI or big data analytics pipeline. The one or more GPUs may be coupled to the storage system, for example, via NVMe-over-Fabrics ('NVMe-oF') such that bottlenecks such as the host CPU can be bypassed and the storage system (or one of the components contained therein) can directly access GPU memory. In such an example, the storage systems may leverage API hooks to the GPUs to transfer data directly to the GPUs. For example, the GPUs may be embodied as Nvidia™ GPUs and the storage systems may support GPUDirect Storage ('GDS') software, or have similar proprietary software, that enables the storage system to transfer data to the GPUs via RDMA or similar mechanism.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains and derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available-including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing-so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics, including being leveraged as part of a composable data analytics pipeline where containerized analytics architectures, for example, make analytics capabilities more composable. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution of intelligent personal assistant applications such as, for example, Amazon's Alexa™, Apple Siri™, Google Voice™, Samsung Bixby™, Microsoft Cortana™, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to 2^n different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming through the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

The storage systems described above may also be configured to implement NVMe Zoned Namespaces. Through the use of NVMe Zoned Namespaces, the logical address space of a namespace is divided into zones. Each zone provides a logical block address range that must be written sequentially and explicitly reset before rewriting, thereby enabling the creation of namespaces that expose the natural boundaries of the device and offload management of internal mapping tables to the host. In order to implement NVMe Zoned Name Spaces ('ZNS'), ZNS SSDs or some other form of zoned block devices may be utilized that expose a namespace logical address space using zones. With the zones aligned to the internal physical properties of the device, several inefficiencies in the placement of data can be eliminated. In such embodiments, each zone may be mapped, for example, to a separate application such that functions like wear levelling and garbage collection could be performed on a per-zone or per-application basis rather than across the entire device. In order to support ZNS, the storage controllers described herein may be configured with to interact with zoned block devices through the usage of, for example, the Linux™ kernel zoned block device interface or other tools.

The storage systems described above may also be configured to implement zoned storage in other ways such as, for example, through the usage of shingled magnetic recording (SMR) storage devices. In examples where zoned storage is used, device-managed embodiments may be deployed where the storage devices hide this complexity by managing it in the firmware, presenting an interface like any other storage device. Alternatively, zoned storage may be implemented via a host-managed embodiment that depends on the operating system to know how to handle the drive, and only write sequentially to certain regions of the drive. Zoned storage may similarly be implemented using a host-aware embodiment in which a combination of a drive managed and host managed implementation is deployed.

The storage systems described herein may be used to form a data lake. A data lake may operate as the first place that an organization's data flows to, where such data may be in a raw format. Metadata tagging may be implemented to facilitate searches of data elements in the data lake, especially in embodiments where the data lake contains multiple stores of data, in formats not easily accessible or readable (e.g., unstructured data, semi-structured data, structured data). From the data lake, data may go downstream to a data warehouse where data may be stored in a more processed, packaged, and consumable format. The storage systems described above may also be used to implement such a data warehouse. In addition, a data mart or data hub may allow for data that is even more easily consumed, where the storage systems described above may also be used to provide the underlying storage resources necessary for a data mart or data hub. In embodiments, queries the data lake may require a schema-on-read approach, where data is applied to a plan or schema as it is pulled out of a stored location, rather than as it goes into the stored location.

The storage systems described herein may also be configured to implement a recovery point objective ('RPO'), which may be establish by a user, established by an administrator, established as a system default, established as part of a storage class or service that the storage system is participating in the delivery of, or in some other way. A "recovery point objective" is a goal for the maximum time difference between the last update to a source dataset and the last recoverable replicated dataset update that would be correctly recoverable, given a reason to do so, from a continuously or frequently updated copy of the source dataset. An update is correctly recoverable if it properly takes into account all updates that were processed on the source dataset prior to the last recoverable replicated dataset update.

In synchronous replication, the RPO would be zero, meaning that under normal operation, all completed updates on the source dataset should be present and correctly recoverable on the copy dataset. In best effort nearly synchronous replication, the RPO can be as low as a few seconds. In snapshot-based replication, the RPO can be roughly calculated as the interval between snapshots plus the time to transfer the modifications between a previous already transferred snapshot and the most recent to-be-replicated snapshot.

If updates accumulate faster than they are replicated, then an RPO can be missed. If more data to be replicated accumulates between two snapshots, for snapshot-based replication, than can be replicated between taking the snapshot and replicating that snapshot's cumulative updates to the copy, then the RPO can be missed. If, again in snapshot-based replication, data to be replicated accumulates at a faster rate than could be transferred in the time between subsequent snapshots, then replication can start to fall further behind which can extend the miss between the expected recovery point objective and the actual recovery point that is represented by the last correctly replicated update.

The storage systems described above may also be part of a shared nothing storage cluster. In a shared nothing storage cluster, each node of the cluster has local storage and communicates with other nodes in the cluster through networks, where the storage used by the cluster is (in general) provided only by the storage connected to each individual node. A collection of nodes that are synchronously replicating a dataset may be one example of a shared nothing storage cluster, as each storage system has local storage and communicates to other storage systems through a network, where those storage systems do not (in general) use storage from somewhere else that they share access to through some kind of interconnect. In contrast, some of the storage systems described above are themselves built as a shared-storage cluster, since there are drive shelves that are shared by the paired controllers. Other storage systems described above, however, are built as a shared nothing storage cluster, as all storage is local to a particular node (e.g., a blade) and all communication is through networks that link the compute nodes together.

In other embodiments, other forms of a shared nothing storage cluster can include embodiments where any node in the cluster has a local copy of all storage they need, and where data is mirrored through a synchronous style of replication to other nodes in the cluster either to ensure that the data isn't lost or because other nodes are also using that storage. In such an embodiment, if a new cluster node needs some data, that data can be copied to the new node from other nodes that have copies of the data.

In some embodiments, mirror-copy-based shared storage clusters may store multiple copies of all the cluster's stored data, with each subset of data replicated to a particular set of nodes, and different subsets of data replicated to different sets of nodes. In some variations, embodiments may store all of the cluster's stored data in all nodes, whereas in other variations nodes may be divided up such that a first set of nodes will all store the same set of data and a second, different set of nodes will all store a different set of data.

Readers will appreciate that RAFT-based databases (e.g., etcd) may operate like shared-nothing storage clusters where all RAFT nodes store all data. The amount of data stored in a RAFT cluster, however, may be limited so that extra copies don't consume too much storage. A container server cluster might also be able to replicate all data to all cluster nodes, presuming the containers don't tend to be too large and their bulk data (the data manipulated by the applications that run in the containers) is stored elsewhere such as in an S3 cluster or an external file server. In such an example, the container storage may be provided by the cluster directly through its shared-nothing storage model, with those containers providing the images that form the execution environment for parts of an application or service.

Figure 17D:
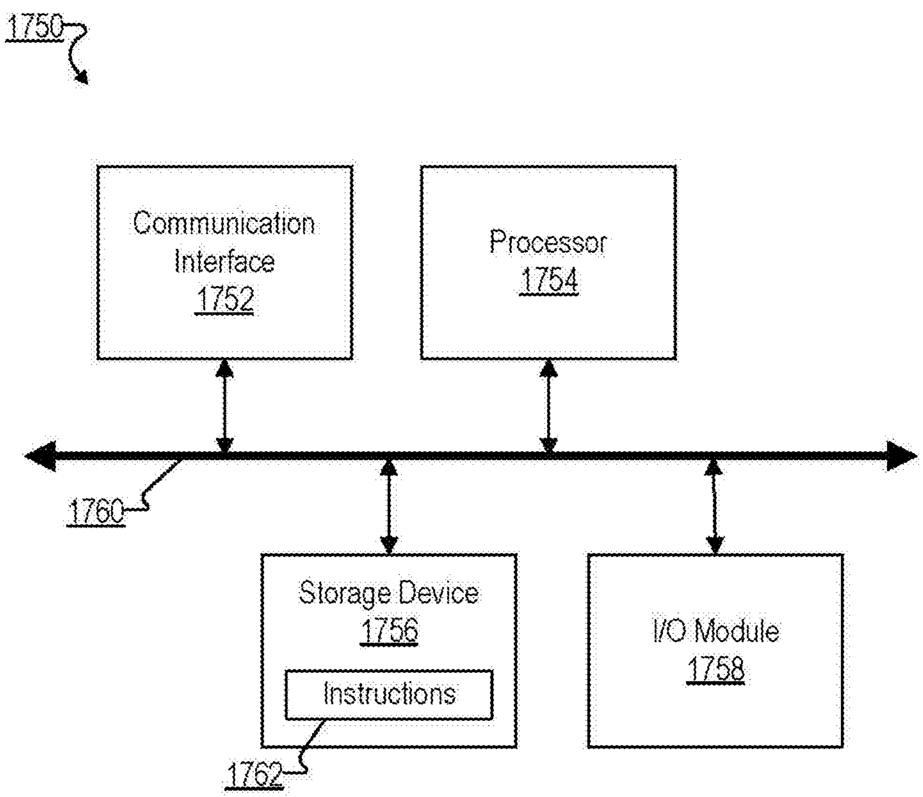
FIG. 17D illustrates an exemplary computing device that may be specifically configured to perform one or more of the processes described herein.

For further explanation, FIG. 17D illustrates an exemplary computing device 1750 that may be specifically configured to perform one or more of the processes described herein. As shown in FIG. 17D, computing device 1750 may include a communication interface 1752, a processor 1754, a storage device 1756, and an input/output ("I/O") module 1758 communicatively connected one to another via a communication infrastructure 1760. While an exemplary computing device 1750 is shown in FIG. 17D, the components illustrated in FIG. 17D are not intended to be limiting. Additional or alternative components may be used in other embodiments. Components of computing device 1750 shown in FIG. 17D will now be described in additional detail.

Communication interface 1752 may be configured to communicate with one or more computing devices. Examples of communication interface 1752 include, without limitation, a wired network interface (such as a network interface card), a wireless network interface (such as a wireless network interface card), a modem, an audio/video connection, and any other suitable interface.

Processor 1754 generally represents any type or form of processing unit capable of processing data and/or interpreting, executing, and/or directing execution of one or more of the instructions, processes, and/or operations described herein. Processor 1754 may perform operations by executing computer-executable instructions 1762 (e.g., an application, software, code, and/or other executable data instance) stored in storage device 1756.

Storage device 1756 may include one or more data storage media, devices, or configurations and may employ any type, form, and combination of data storage media and/or device. For example, storage device 1756 may include, but is not limited to, any combination of the non-volatile media and/or volatile media described herein. Electronic data, including data described herein, may be temporarily and/or permanently stored in storage device 1756. For example, data representative of computer-executable instructions 1762 configured to direct processor 1754 to perform any of the operations described herein may be stored within storage device 1756. In some examples, data may be arranged in one or more databases residing within storage device 1756.

I/O module 1758 may include one or more I/O modules configured to receive user input and provide user output. I/O module 1758 may include any hardware, firmware, software, or combination thereof supportive of input and output capabilities. For example, I/O module 1758 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1758 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1758 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 1750.

Figure 17E:
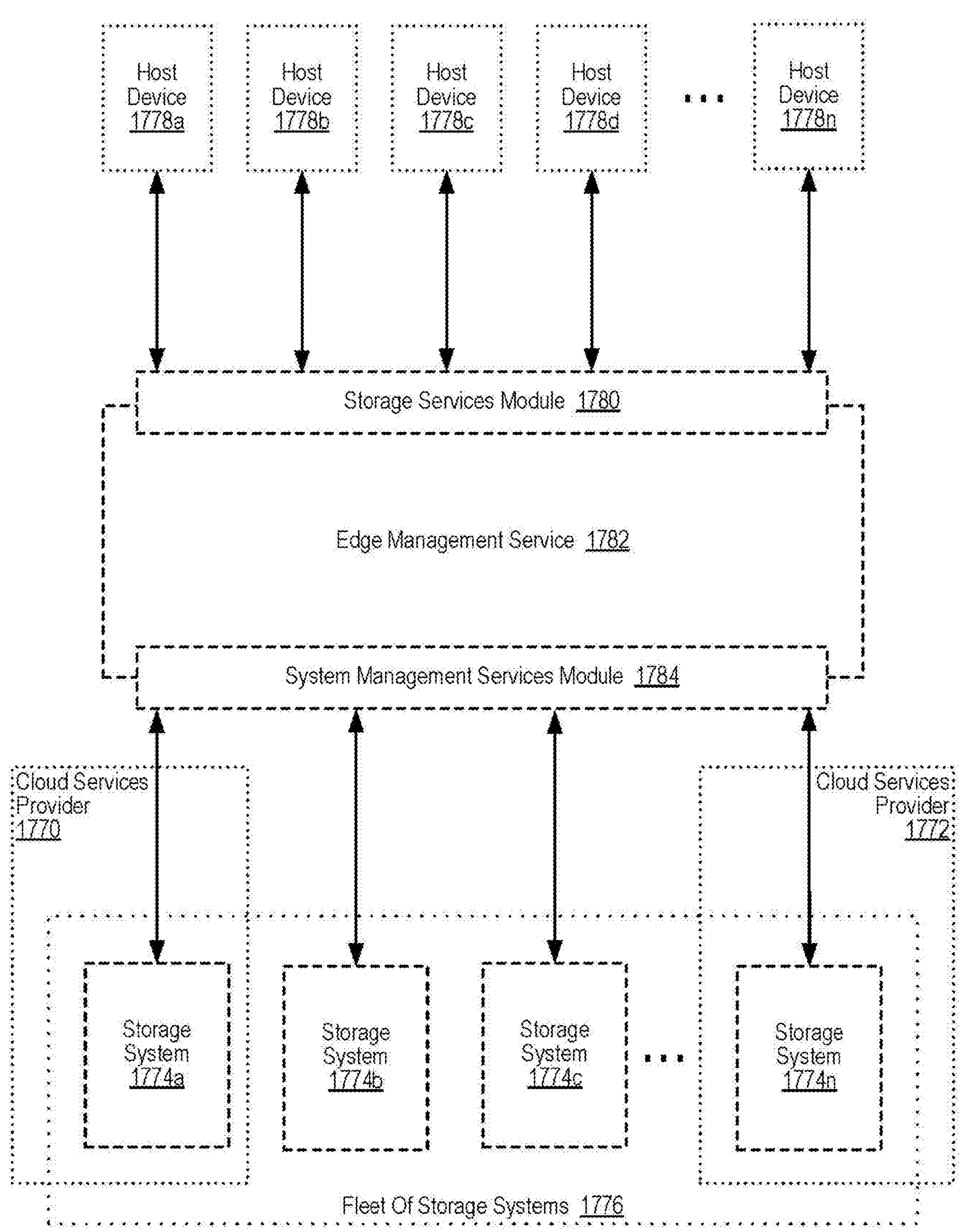
FIG. 17E illustrates an example of a fleet of storage systems for providing storage services.

For further explanation, FIG. 17E illustrates an example of a fleet of storage systems 1776 for providing storage services (also referred to herein as 'data services'). The fleet of storage systems 1776 depicted in FIG. 17 includes a plurality of storage systems 1774*a*, 1774*b*, 1774*c*, 1774*d*, 1774*n* that may each be similar to the storage systems described herein. The storage systems 1774*a*, 1774*b*, 1774*c*,

1774*d*, 1774*n* in the fleet of storage systems 1776 may be embodied as identical storage systems or as different types of storage systems. For example, two of the storage systems 1774*a*, 1774*n* depicted in FIG. 17E are depicted as being cloud-based storage systems, as the resources that collectively form each of the storage systems 1774*a*, 1774*n* are provided by distinct cloud services providers 1770, 1772. For example, the first cloud services provider 1770 may be Amazon AWS™ whereas the second cloud services provider 1772 is Microsoft Azure™, although in other embodiments one or more public clouds, private clouds, or combinations thereof may be used to provide the underlying resources that are used to form a particular storage system in the fleet of storage systems 1776.

The example depicted in FIG. 17E includes an edge management service 1782 for delivering storage services in accordance with some embodiments of the present disclosure. The storage services (also referred to herein as 'data services') that are delivered may include, for example, services to provide a certain amount of storage to a consumer, services to provide storage to a consumer in accordance with a predetermined service level agreement, services to provide storage to a consumer in accordance with predetermined regulatory requirements, and many others.

The edge management service 1782 depicted in FIG. 17E may be embodied, for example, as one or more modules of computer program instructions executing on computer hardware such as one or more computer processors. Alternatively, the edge management service 1782 may be embodied as one or more modules of computer program instructions executing on a virtualized execution environment such as one or more virtual machines, in one or more containers, or in some other way. In other embodiments, the edge management service 1782 may be embodied as a combination of the embodiments described above, including embodiments where the one or more modules of computer program instructions that are included in the edge management service 1782 are distributed across multiple physical or virtual execution environments.

The edge management service 1782 may operate as a gateway for providing storage services to storage consumers, where the storage services leverage storage offered by one or more storage systems 1774*a*, 1774*b*, 1774*c*, 1774*d*, 1774*n*. For example, the edge management service 1782 may be configured to provide storage services to host devices 1778*a*, 1778*b*, 1778*c*, 1778*d*, 1778*n* that are executing one or more applications that consume the storage services. In such an example, the edge management service 1782 may operate as a gateway between the host devices 1778*a*, 1778*b*, 1778*c*, 1778*d*, 1778*n* and the storage systems 1774*a*, 1774*b*, 1774*c*, 1774*d*, 1774*n*, rather than requiring that the host devices 1778*a*, 1778*b*, 1778*c*, 1778*d*, 1778*n* directly access the storage systems 1774*a*, 1774*b*, 1774*c*, 1774*d*, 1774*n*.

The edge management service 1782 of FIG. 17E exposes a storage services module 1780 to the host devices 1778*a*, 1778*b*, 1778*c*, 1778*d*, 1778*n* of FIG. 17E, although in other embodiments the edge management service 1782 may expose the storage services module 1780 to other consumers of the various storage services. The various storage services may be presented to consumers via one or more user interfaces, via one or more APIs, or through some other mechanism provided by the storage services module 1780. As such, the storage services module 1780 depicted in FIG. 17E may be embodied as one or more modules of computer program instructions executing on physical hardware, on a virtualized execution environment, or combinations thereof, where executing such modules causes enables a consumer of storage services to be offered, select, and access the various storage services.

The edge management service 1782 of FIG. 17E also includes a system management services module 1784. The system management services module 1784 of FIG. 17E includes one or more modules of computer program instructions that, when executed, perform various operations in coordination with the storage systems 1774*a*, 1774*b*, 1774*c*, 1774*d*, 1774*n* to provide storage services to the host devices 1778*a*, 1778*b*, 1778*c*, 1778*d*, 1778*n*. The system management services module 1784 may be configured, for example, to perform tasks such as provisioning storage resources from the storage systems 1774*a*, 1774*b*, 1774*c*, 1774*d*, 1774*n* via one or more APIs exposed by the storage systems 1774*a*, 1774*b*, 1774*c*, 1774*d*, 1774*n*, migrating datasets or workloads amongst the storage systems 1774*a*, 1774*b*, 1774*c*, 1774*d*, 1774*n* via one or more APIs exposed by the storage systems 1774*a*, 1774*b*, 1774*c*, 1774*d*, 1774*n*, setting one or more tunable parameters (i.e., one or more configurable settings) on the storage systems 1774*a*, 1774*b*, 1774*c*, 1774*d*, 1774*n* via one or more APIs exposed by the storage systems 1774*a*, 1774*b*, 1774*c*, 1774*d*, 1774*n*, and so on. For example, many of the services described herein relate to embodiments where the storage systems 1774*a*, 1774*b*, 1774*c*, 1774*d*, 1774*n* are configured to operate in some way. In such examples, the system management services module 1784 may be responsible for using APIs (or some other mechanism) provided by the storage systems 1774*a*, 1774*b*, 1774*c*, 1774*d*, 1774*n* to configure the storage systems 1774*a*, 1774*b*, 1774*c*, 1774*d*, 1774*n* to operate in the ways described herein.

In addition to configuring the storage systems 1774*a*, 1774*b*, 1774*c*, 1774*d*, 1774*n*, the edge management service 1782 itself may be configured to perform various tasks required to provide the various storage services. Consider an example in which the storage service includes a service that, when selected and applied, causes personally identifiable information ('PII') contained in a dataset to be obfuscated when the dataset is accessed. In such an example, the storage systems 1774*a*, 1774*b*, 1774*c*, 1774*d*, 1774*n* may be configured to obfuscate PII when servicing read requests directed to the dataset. Alternatively, the storage systems 1774*a*, 1774*b*, 1774*c*, 1774*d*, 1774*n* may service reads by returning data that includes the PII, but the edge management service 1782 itself may obfuscate the PII as the data is passed through the edge management service 1782 on its way from the storage systems 1774*a*, 1774*b*, 1774*c*, 1774*d*, 1774*n* to the host devices 1778*a*, 1778*b*, 1778*c*, 1778*d*, 1778*n*.

The storage systems 1774*a*, 1774*b*, 1774*c*, 1774*d*, 1774*n* depicted in FIG. 17E may be embodied as one or more of the storage systems described above with reference to FIGS. 15A-3D, including variations thereof. In fact, the storage systems 1774*a*, 1774*b*, 1774*c*, 1774*d*, 1774*n* may serve as a pool of storage resources where the individual components in that pool have different performance characteristics, different storage characteristics, and so on. For example, one of the storage systems 1774*a* may be a cloud-based storage system, another storage system 1774*b* may be a storage system that provides block storage, another storage system 1774*c* may be a storage system that provides file storage, another storage system 1774*d* may be a relatively high-performance storage system while another storage system 1774*n* may be a relatively low-performance storage system, and so on. In alternative embodiments, only a single storage system may be present.

The storage systems 1774a, 1774b, 1774c, 1774d, 1774n depicted in FIG. 17E may also be organized into different failure domains so that the failure of one storage system 1774a should be totally unrelated to the failure of another storage system 1774b. For example, each of the storage systems may receive power from independent power systems, each of the storage systems may be coupled for data communications over independent data communications networks, and so on. Furthermore, the storage systems in a first failure domain may be accessed via a first gateway whereas storage systems in a second failure domain may be accessed via a second gateway. For example, the first gateway may be a first instance of the edge management service 1782 and the second gateway may be a second instance of the edge management service 1782, including embodiments where each instance is distinct, or each instance is part of a distributed edge management service 1782.

As an illustrative example of available storage services, storage services may be presented to a user that are associated with different levels of data protection. For example, storage services may be presented to the user that, when selected and enforced, guarantee the user that data associated with that user will be protected such that various recovery point objectives ('RPO') can be guaranteed. A first available storage service may ensure, for example, that some dataset associated with the user will be protected such that any data that is more than 5 seconds old can be recovered in the event of a failure of the primary data store whereas a second available storage service may ensure that the dataset that is associated with the user will be protected such that any data that is more than 5 minutes old can be recovered in the event of a failure of the primary data store.

An additional example of storage services that may be presented to a user, selected by a user, and ultimately applied to a dataset associated with the user can include one or more data compliance services. Such data compliance services may be embodied, for example, as services that may be provided to consumers (i.e., a user) the data compliance services to ensure that the user's datasets are managed in a way to adhere to various regulatory requirements. For example, one or more data compliance services may be offered to a user to ensure that the user's datasets are managed in a way so as to adhere to the General Data Protection Regulation ('GDPR'), one or more data compliance services may be offered to a user to ensure that the user's datasets are managed in a way so as to adhere to the Sarbanes-Oxley Act of 2002 ('SOX'), or one or more data compliance services may be offered to a user to ensure that the user's datasets are managed in a way so as to adhere to some other regulatory act. In addition, the one or more data compliance services may be offered to a user to ensure that the user's datasets are managed in a way so as to adhere to some non-governmental guidance (e.g., to adhere to best practices for auditing purposes), the one or more data compliance services may be offered to a user to ensure that the user's datasets are managed in a way so as to adhere to a particular clients or organizations requirements, and so on.

Consider an example in which a particular data compliance service is designed to ensure that a user's datasets are managed in a way so as to adhere to the requirements set forth in the GDPR. While a listing of all requirements of the GDPR can be found in the regulation itself, for the purposes of illustration, an example requirement set forth in the GDPR requires that pseudonymization processes must be applied to stored data in order to transform personal data in such a way that the resulting data cannot be attributed to a specific data subject without the use of additional information. For example, data encryption techniques can be applied to render the original data unintelligible, and such data encryption techniques cannot be reversed without access to the correct decryption key. As such, the GDPR may require that the decryption key be kept separately from the pseudonymised data. One particular data compliance service may be offered to ensure adherence to the requirements set forth in this paragraph.

In order to provide this particular data compliance service, the data compliance service may be presented to a user (e.g., via a GUI) and selected by the user. In response to receiving the selection of the particular data compliance service, one or more storage services policies may be applied to a dataset associated with the user to carry out the particular data compliance service. For example, a storage services policy may be applied requiring that the dataset be encrypted prior to being stored in a storage system, prior to being stored in a cloud environment, or prior to being stored elsewhere. In order to enforce this policy, a requirement may be enforced not only requiring that the dataset be encrypted when stored, but a requirement may be put in place requiring that the dataset be encrypted prior to transmitting the dataset (e.g., sending the dataset to another party). In such an example, a storage services policy may also be put in place requiring that any encryption keys used to encrypt the dataset are not stored on the same system that stores the dataset itself. Readers will appreciate that many other forms of data compliance services may be offered and implemented in accordance with embodiments of the present disclosure.

The storage systems 1774a, 1774b, 1774c, 1774d, 1774n in the fleet of storage systems 1776 may be managed collectively, for example, by one or more fleet management modules. The fleet management modules may be part of or separate from the system management services module 1784 depicted in FIG. 17E. The fleet management modules may perform tasks such as monitoring the health of each storage system in the fleet, initiating updates or upgrades on one or more storage systems in the fleet, migrating workloads for loading balancing or other performance purposes, and many other tasks. As such, and for many other reasons, the storage systems 1774a, 1774b, 1774c, 1774d, 1774n may be coupled to each other via one or more data communications links in order to exchange data between the storage systems 1774a, 1774b, 1774c, 1774d, 1774n.

The storage systems described herein may support various forms of data replication. For example, two or more of the storage systems may synchronously replicate a dataset between each other. In synchronous replication, distinct copies of a particular dataset may be maintained by multiple storage systems, but all accesses (e.g., a read) of the dataset should yield consistent results regardless of which storage system the access was directed to. For example, a read directed to any of the storage systems that are synchronously replicating the dataset should return identical results. As such, while updates to the version of the dataset need not occur at exactly the same time, precautions must be taken to ensure consistent accesses to the dataset. For example, if an update (e.g., a write) that is directed to the dataset is received by a first storage system, the update may only be acknowledged as being completed if all storage systems that are synchronously replicating the dataset have applied the update to their copies of the dataset. In such an example, synchronous replication may be carried out through the use of I/O forwarding (e.g., a write received at a first storage system is forwarded to a second storage system), communications between the storage systems (e.g., each storage system indicating that it has completed the update), or in other ways.

In other embodiments, a dataset may be replicated through the use of checkpoints. In checkpoint-based replication (also referred to as 'nearly synchronous replication'), a set of updates to a dataset (e.g., one or more write operations directed to the dataset) may occur between different checkpoints, such that a dataset has been updated to a specific checkpoint only if all updates to the dataset prior to the specific checkpoint have been completed. Consider an example in which a first storage system stores a live copy of a dataset that is being accessed by users of the dataset. In this example, assume that the dataset is being replicated from the first storage system to a second storage system using checkpoint-based replication. For example, the first storage system may send a first checkpoint (at time t=0) to the second storage system, followed by a first set of updates to the dataset, followed by a second checkpoint (at time t=1), followed by a second set of updates to the dataset, followed by a third checkpoint (at time t=2). In such an example, if the second storage system has performed all updates in the first set of updates but has not yet performed all updates in the second set of updates, the copy of the dataset that is stored on the second storage system may be up-to-date until the second checkpoint. Alternatively, if the second storage system has performed all updates in both the first set of updates and the second set of updates, the copy of the dataset that is stored on the second storage system may be up-to-date until the third checkpoint. Readers will appreciate that various types of checkpoints may be used (e.g., metadata only checkpoints), checkpoints may be spread out based on a variety of factors (e.g., time, number of operations, an RPO setting), and so on.

In other embodiments, a dataset may be replicated through snapshot-based replication (also referred to as 'asynchronous replication'). In snapshot-based replication, snapshots of a dataset may be sent from a replication source such as a first storage system to a replication target such as a second storage system. In such an embodiment, each snapshot may include the entire dataset or a subset of the dataset such as, for example, only the portions of the dataset that have changed since the last snapshot was sent from the replication source to the replication target. Readers will appreciate that snapshots may be sent on-demand, based on a policy that takes a variety of factors into consideration (e.g., time, number of operations, an RPO setting), or in some other way.

The storage systems described above may, either alone or in combination, by configured to serve as a continuous data protection store. A continuous data protection store is a feature of a storage system that records updates to a dataset in such a way that consistent images of prior contents of the dataset can be accessed with a low time granularity (often on the order of seconds, or even less), and stretching back for a reasonable period of time (often hours or days). These allow access to very recent consistent points in time for the dataset, and also allow access to points in time for a dataset that might have just preceded some event that, for example, caused parts of the dataset to be corrupted or otherwise lost, while retaining close to the maximum number of updates that preceded that event. Conceptually, they are like a sequence of snapshots of a dataset taken very frequently and kept for a long period of time, though continuous data protection stores are often implemented quite differently from snapshots. A storage system implementing a data continuous data protection store may further provide a means of accessing these points in time, accessing one or more of these points in time as snapshots or as cloned copies, or reverting the dataset back to one of those recorded points in time.

Over time, to reduce overhead, some points in the time held in a continuous data protection store can be merged with other nearby points in time, essentially deleting some of these points in time from the store. This can reduce the capacity needed to store updates. It may also be possible to convert a limited number of these points in time into longer duration snapshots. For example, such a store might keep a low granularity sequence of points in time stretching back a few hours from the present, with some points in time merged or deleted to reduce overhead for up to an additional day. Stretching back in the past further than that, some of these points in time could be converted to snapshots representing consistent point-in-time images from only every few hours.

Although some embodiments are described largely in the context of a storage system, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated. Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:

querying a cached portion of relationship information that relates representations of one or more data portions to physical locations of the one or more data portions, including bypassing searching of non-cached portions of the relationship information; and based on a determination that the cached portion returns a query result, performing a request to access a data portion associated with the query result.

2. The method of claim 1 wherein querying the cached portion of relationship information further comprises:

using a generated hash value associated with a request to read data to query one or more deduplication data structures that correspond to the hash value; and searching only a cached portion of a deduplication data structure of the one or more deduplication data structures, wherein the deduplication data structure also includes a non-cached portion that is not searched.

3. The method of claim 1 wherein querying the cached portion of relationship information further comprises using a generated hash value associated with a request to read data.

4. The method of claim 1 wherein querying the cached portion of relationship information further comprises:

selecting, based on a query value, from a plurality of levels within a mapping table, a youngest level associated with the query value; and searching the selected youngest level for an entry that maps the query value to a value corresponding to a location within a storage system.

5. The method of claim 1 further comprising:

receiving a request to write data to a storage system;

generating, based on the request to write data, a hash value associated with the request to write data;

determining whether the generated hash value matches an entry in a deduplication data structure; and responsive to determining that the generated hash value matches an entry in a deduplication data structure:

discarding the data; and updating the entry in the deduplication data structure.

6. The method of claim 1 further comprising:

receiving a request to write data to a storage system;

generating, based on the request to write data, a hash value associated with the request to write data;

determining whether the generated hash value matches an entry in a deduplication data structure;

responsive to determining that the generated hash value does not match an entry in the deduplication data structure:

writing the data to the storage system; and adding a new entry to the deduplication data structure that includes the generated hash value.

7. The method of claim 5 wherein updating the entry in the deduplication data structure includes moving the entry to a highest level in the deduplication data structure.

8. The method of claim 5 wherein determining whether the generated hash value matches the entry in the deduplication data structure includes searching only a cached portion of the deduplication data structure, wherein the deduplication data structure also includes a non-cached portion that is not searched.

9. The method of claim 6 further comprising:

responsive to determining that the generated hash value does not match the entry in the deduplication data structure, adding the new entry to a cached portion of the deduplication data structure.

10. A system comprising:

a memory; and a processing device, operatively coupled to the memory, the processing device configured to:

query a cached portion of relationship information that relates representations of one or more data portions to physical locations of the one or more data portions, including bypassing searching of non-cached portions of the relationship information; and based on a determination that the cached portion returns a query result, perform a request to access a data portion associated with the query result.

11. The system of claim 10 wherein, to query the cached portion of the relationship information, the processing device is further configured to:

using a generated hash value associated with a request to read data, one or more deduplication data structures that correspond to the hash value; and search only a cached portion of a deduplication data structure of the one or more deduplication data structures, wherein the deduplication data structure also includes a non-cached portion that is not searched.

12. The system of claim 10 wherein, to query the cached portion of the relationship information, the processing device is further configured to use a generated hash value associated with a request to read data.

13. The system of claim 10 wherein, to query the cached portion of the relationship information, the processing device is further configured to:

select, based on a query value, from a plurality of levels within a mapping table, a youngest level associated with the query value; and search the selected youngest level for an entry that maps the query value to a value corresponding to a location within a storage system.

14. The system of claim 10 wherein the processing device is further configured to:

receive a request to write data to a storage system;

generate, based on the request to write data, a hash value associated with the request to write data;

determine whether the generated hash value matches an entry in a deduplication data structure; and responsive to determining that the generated hash value matches the entry in the deduplication data structure:

discard the data; and update the entry in the deduplication data structure.

15. The system of claim 10 wherein the processing device is further configured to:

receive a request to write data to a storage system;

generate, based on the request to write data, a hash value associated with the request to write data;

determine whether the generated hash value matches an entry in a deduplication data structure;

responsive to determining that the generated hash value does not match the entry in the deduplication data structure:

write the data to the storage system; and add a new entry to the deduplication data structure that includes the generated hash value.

16. The system of claim 14 wherein, to update the entry in the deduplication data structure, the processing device is further configured to move the entry to a highest level in the deduplication data structure.

17. The system of claim 14 wherein, to determine whether the generated hash value matches the entry in the deduplication data structure, the processing device is further configured to includes search only a cached portion of the deduplication data structure, wherein the deduplication data structure also includes a non-cached portion that is not searched.

18. A non-transitory computer readable storage medium storing instructions which, when executed, cause a processing device to:

query a cached portion of relationship information that relates representations of one or more data portions to physical locations of the one or more data portions, including bypassing searching of non-cached portions of the relationship information; and based on a determination that the cached portion returns a query result, perform a request to access a data portion associated with the query result.

19. The computer readable storage medium of claim 18 wherein, to query the cached portion of the relationship information, the instructions, when executed, further cause the processing device to:

use a generated hash value associated with a request to read data to query one or more deduplication data structures that correspond to the hash value; and search only a cached portion of a deduplication data structure of the one or more deduplication data structures, wherein the deduplication data structure also includes a non-cached portion that is not searched.

20. The computer readable storage medium of claim 18 wherein, to query the cached portion of the relationship information, the instructions, when executed, further cause the processing device to use a generated hash value associated with a request to read data.

* * * * *